(12) United States Patent
Abe et al.

(10) Patent No.: US 8,167,063 B2
(45) Date of Patent: May 1, 2012

(54) POWER PLANT

(75) Inventors: Noriyuki Abe, Saitama-ken (JP); Shigemitsu Akutsu, Saitama-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 422 days.

(21) Appl. No.: 12/448,530

(22) PCT Filed: Dec. 27, 2007

(86) PCT No.: PCT/JP2007/075183
§ 371 (c)(1),
(2), (4) Date: Jun. 24, 2009

(87) PCT Pub. No.: WO2008/078817
PCT Pub. Date: Jul. 3, 2008

(65) Prior Publication Data
US 2010/0025128 A1    Feb. 4, 2010

(30) Foreign Application Priority Data

Dec. 27, 2006 (JP) .................................. 2006-352502
Dec. 5, 2007 (JP) .................................. 2007-314253

(51) Int. Cl.
*B60K 6/26* (2007.10)
*B60K 6/448* (2007.10)
(52) U.S. Cl. .................. 180/65.24; 180/65.25; 903/906
(58) Field of Classification Search .............. 180/65.21, 180/65.22, 65.24, 65.225, 65.25, 65.285; 310/112, 114, 118, 122, 126; 903/906
See application file for complete search history.

(56) References Cited

U.S. PATENT DOCUMENTS

| 3,683,249 A | * | 8/1972 | Shibata et al. ................ 318/730 |
| 5,675,203 A | * | 10/1997 | Schulze et al. ................ 310/113 |
| 5,917,248 A | * | 6/1999 | Seguchi et al. ................ 290/31 |
| 6,297,575 B1 | * | 10/2001 | Yang ............................ 310/266 |
| 6,380,653 B1 | | 4/2002 | Seguchi |
| 6,455,969 B1 | * | 9/2002 | Chen ............................ 310/114 |
| 6,903,471 B2 | * | 6/2005 | Arimitsu et al. ............... 310/59 |
| 7,781,930 B2 | * | 8/2010 | Abe et al. ...................... 310/103 |
| 2003/0224892 A1 | * | 12/2003 | Yamauchi et al. ............... 475/5 |
| 2007/0096574 A1 | * | 5/2007 | Romagny et al. ............. 310/112 |
| 2009/0247341 A1 | * | 10/2009 | Abe et al. ......................... 475/5 |

FOREIGN PATENT DOCUMENTS

| DE | 3025756 A1 | 7/1980 |
| DE | 10310777 A1 | 9/2004 |
| FR | 2865867 A1 | 8/2005 |
| JP | 50-85019 | 7/1975 |
| JP | 2000-197324 | 7/2000 |
| JP | 2000-350309 | 12/2000 |
| WO | 97-18101 | 5/1997 |

* cited by examiner

*Primary Examiner* — Frank Vanaman
(74) *Attorney, Agent, or Firm* — Squire Sanders (US) LLP

(57) ABSTRACT

A power plant 1 for driving driven parts DW and DW includes a prime mover 3, and first and second generator-motors 20, 30. The first generator-motor 20 is comprised of a first stator 22, a first rotor 21 formed by magnets, and a second rotor 23 formed by soft magnetic material elements and disposed between the first stator 22 and the first rotor 21. The second generator-motor 30 is comprised of a second stator 32, a third rotor 31 formed by magnets, and a fourth rotor 33 formed by soft magnetic material elements and disposed between the second stator 32 and the third rotor 31. The first and fourth rotors 21, 33 are mechanically connected to the driven parts DW and DW, and the second and third rotors 23, 31 are mechanically connected to an output shaft 3a of the prime mover 3.

7 Claims, 37 Drawing Sheets

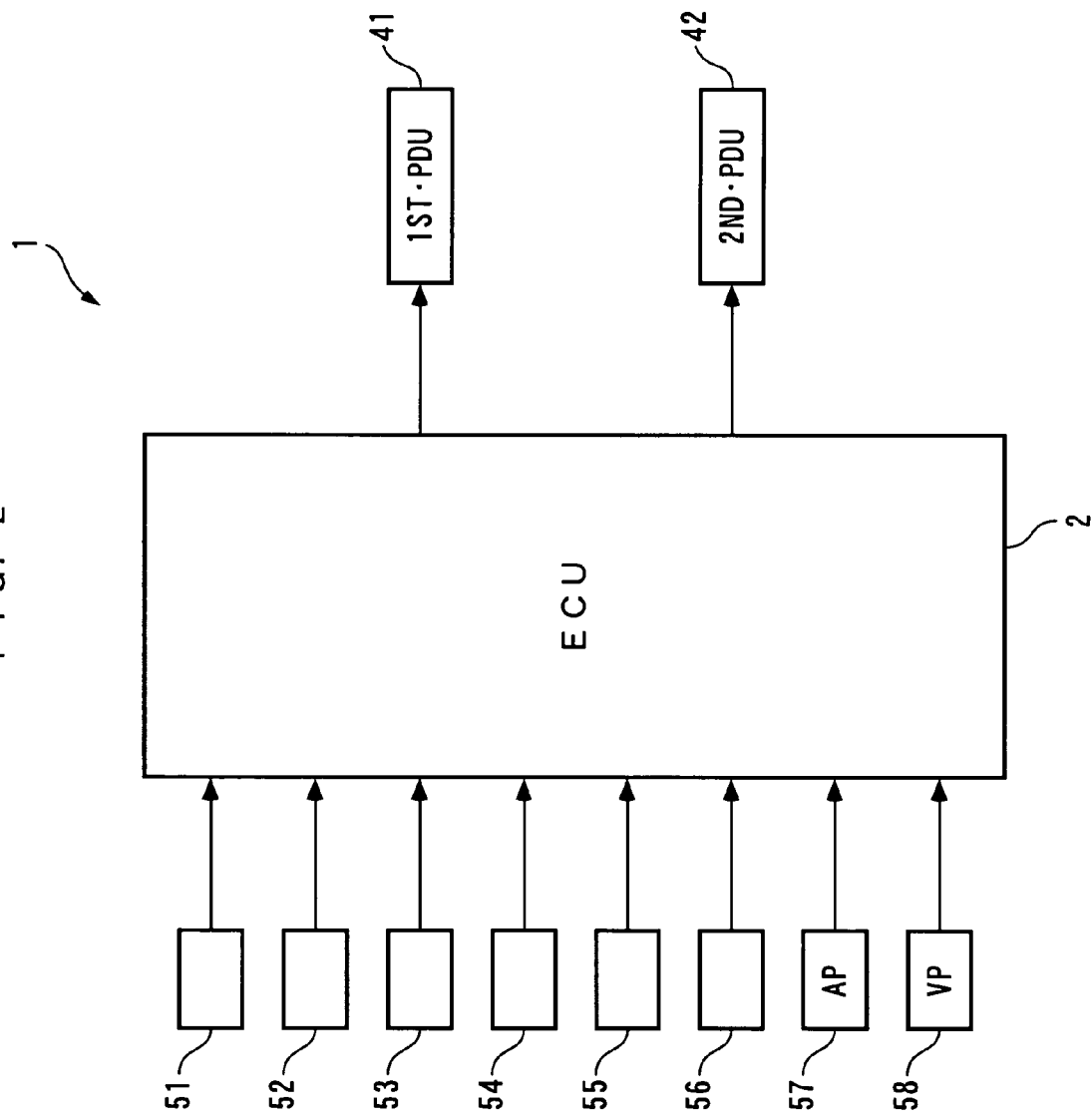

FIG. 8
(a)
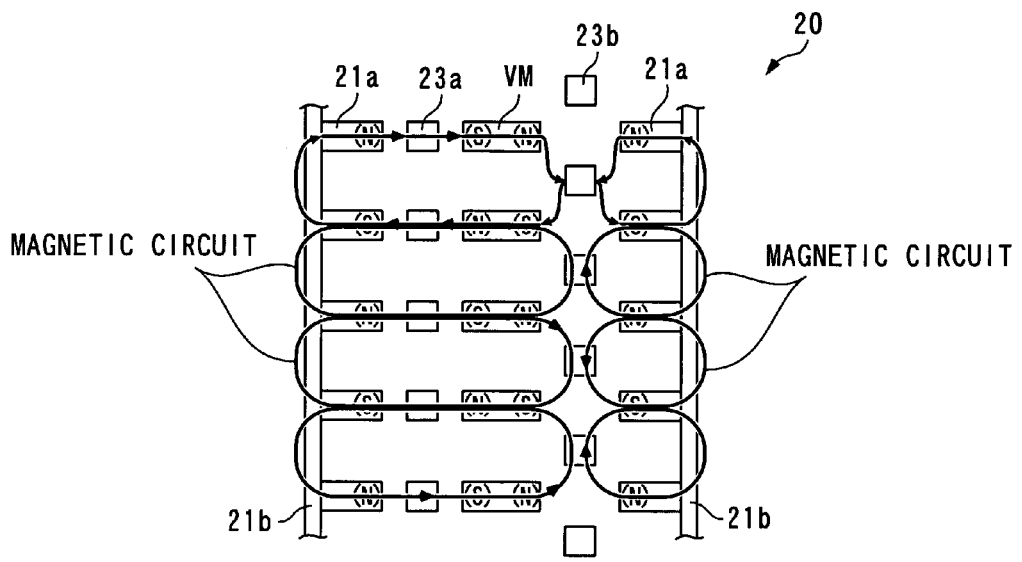
(b)
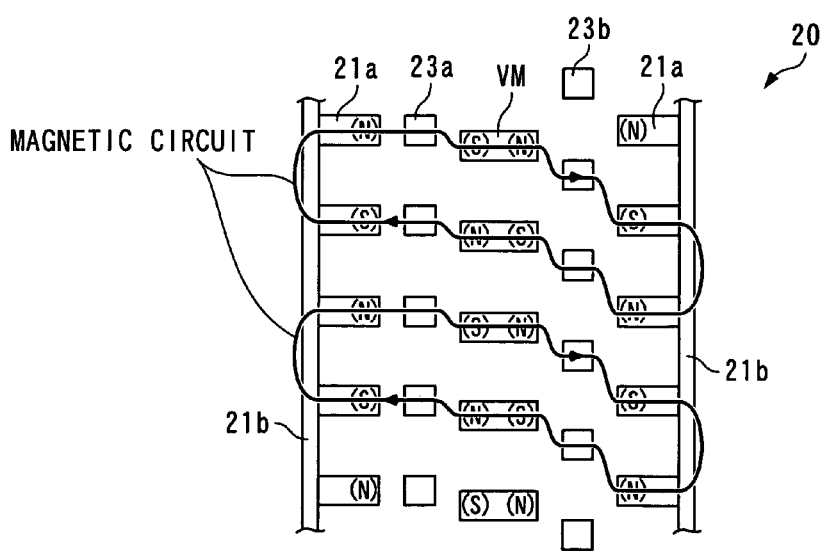

FIG. 10
(a)
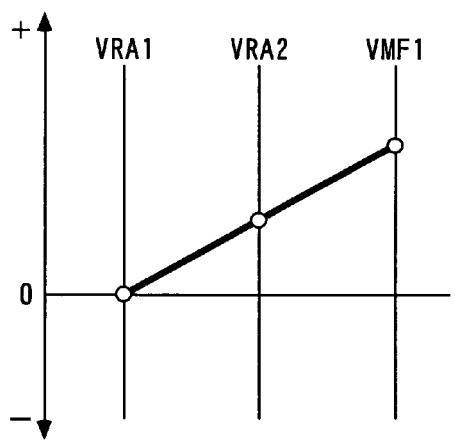
(b)
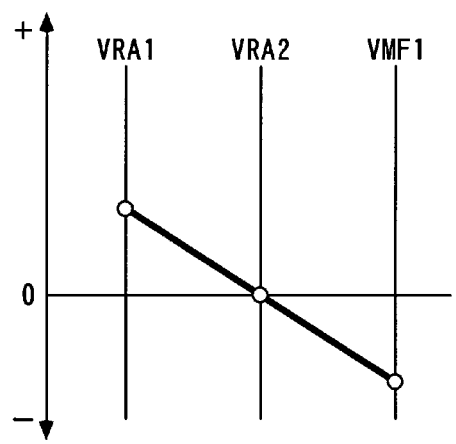
(c)
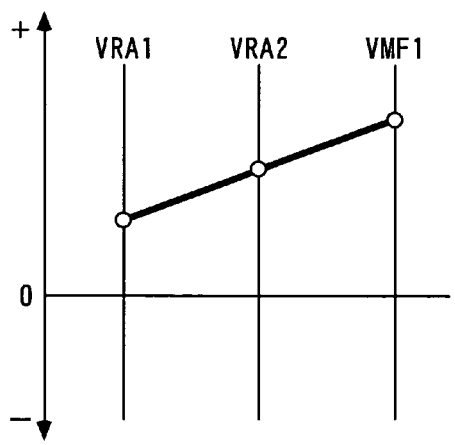
(d)
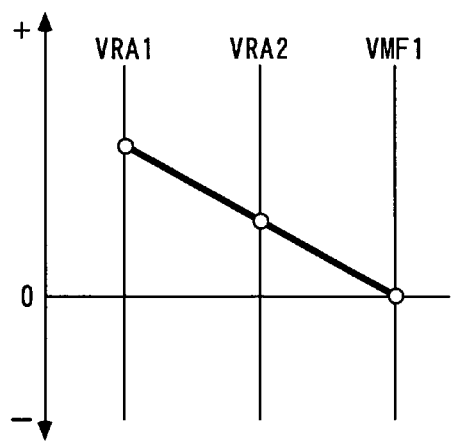

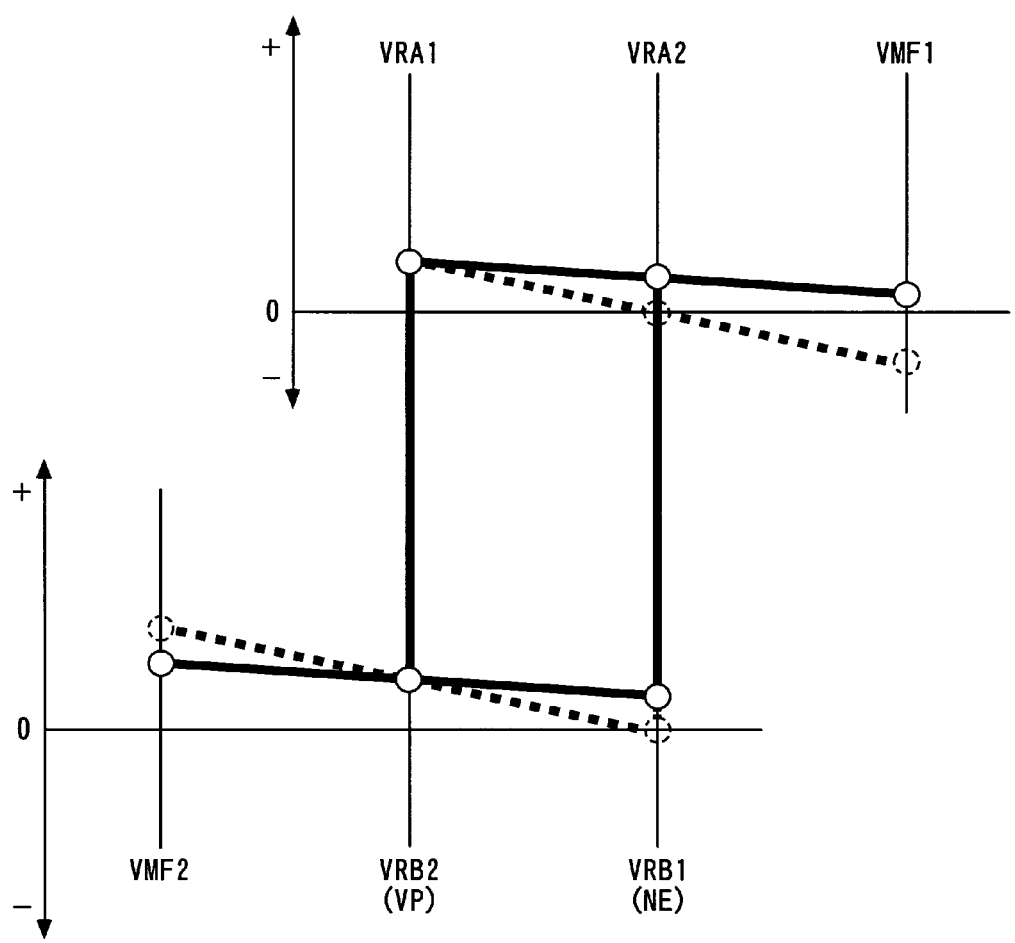
F I G. 1 7

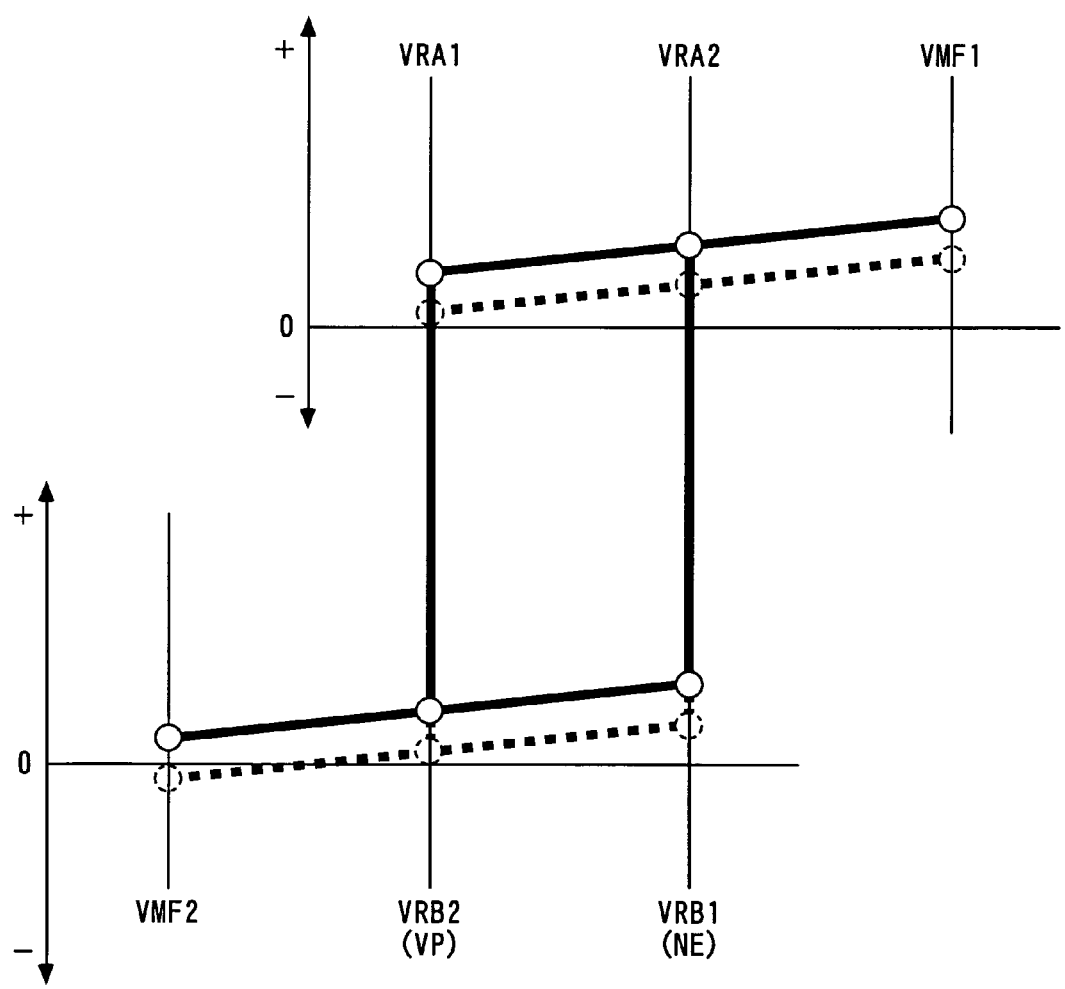
F I G. 2 8

F I G. 3 2
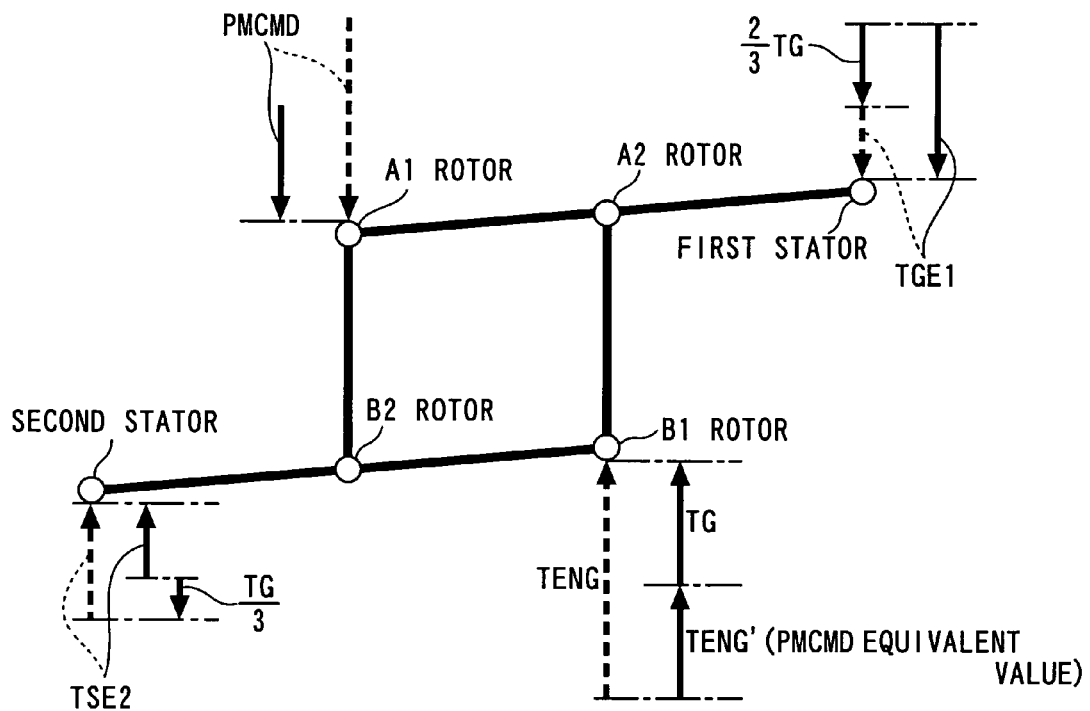

POWER PLANT

FIELD OF THE INVENTION

The present invention relates to a power unit for driving driven parts, and more particularly to a power unit including an internal combustion engine and two generator-motors.

BACKGROUND ART

Conventionally, as a power unit of this kind, one disclosed e.g. in Patent Literature 1 is known. This power unit is for driving left and right drive wheels of a vehicle, and is provided with an internal combustion engine, and first and second generator-motors. The first generator-motor has a first stator formed by a plurality of armatures, an intermediate rotor formed by an iron core and a coil, and an inner rotor formed by a permanent magnet. The first stator, the intermediate rotor, and the inner rotor are arranged in this order from the inside to the outside in a radial direction. Further, in the first generator-motor, an induction machine is formed by the first stator and the intermediate rotor, and a synchronous machine is formed by the intermediate rotor and the inner rotor. The above-mentioned second generator-motor has a second stator formed by a plurality of armatures, and a second rotor formed by a permanent magnet.

The intermediate rotor of the first generator-motor is mechanically connected to the crankshaft of the engine, and the inner rotor of the same to the second rotor of the second generator-motor, and the second rotor is mechanically connected to the drive wheels. Further, the first rotor of the first generator-motor and the second stator of the second generator-motor are electrically connected to a battery via a first controller and a second controller, each formed by e.g. an inverter.

In the conventional power unit constructed as described above, during running of a vehicle on which the power unit is installed, the power of the engine is transmitted to the drive wheels, while changing the speed thereof in the following manner: When the rotational speed of the engine is higher than that of the drive wheels, part of the power from the engine is used to generate electric power by the first generator-motor. This converts the part of the power from the engine into DC power by the first stator, whereby power generation is performed, and at the same time, the remainder of the power from the engine is electromagnetically transmitted to the inner rotor via the intermediate rotor, and then is transmitted to the drive wheels. The electric power thus generated by the first stator is supplied to the second stator via the first and second controllers, and the power thus generated by the second rotor is transmitted to the drive wheels. From the above, the power of the engine is transmitted to the drive wheels while changing the speed thereof.

As described above, in the conventional power unit, transmission of power of the engine to the drive wheels is performed via a first path formed by the intermediate rotor, magnetism, and the inner rotor, and a second path formed by the intermediate rotor, magnetism, the first stator, the first and second controllers, the second stator, magnetism, and the second rotor. In the first path, the power of the engine is transmitted by a so-called magnetic path formed by magnetism generated in the intermediate rotor, and hence it is possible to obtain a relatively high transmission efficiency. On the other hand, in the second path, the power of the engine is transmitted via a so-called electrical path in which the power is once converted to DC power, and is then converted back into power, so that conversion loss of the inverter or loss by generation of Joule heat occurs to make the transmission efficiency via this path lower.

In the conventional power unit, due to the arrangement thereof, approximately half of the power of the engine is transmitted to the drive wheels by the electrical path via the second path, and hence the driving efficiency of the power unit becomes lower. Further, since the induction machine is formed by the first stator and the intermediate rotor, when the electric power is generated by the above-mentioned first stator, Joule heat is generated not only in the coil of the first stator but also in the coil of the intermediate rotor, which prevents the sufficient power generation efficiency from being obtained, to further lower the driving efficiency of the power unit.

The present invention has been made to provide a solution to the above-described problems, and an object thereof is to provide a power plant which is capable of enhancing driving efficiency with which the power plant drives driven parts.

[Patent Literature 1]

Japanese Laid-Open Patent Publication (Kokai) No. 2000-197324.

DISCLOSURE OF THE INVENTION

To attain the object, the invention provides a power plant 1, 1A to 1E for driving driven parts (drive wheels DW and DW in the embodiments (the same applies hereinafter in this section)), comprising a prime mover (engine 3) including an output shaft (crankshaft 3a), a first generator-motor 20 including an immovable first stator 22 for generating a first rotating magnetic field, a first rotor (A1 rotor 21) formed by magnets, the first rotor being provided in a manner opposed to the first stator 22, and a second rotor (A2 rotor 23) formed by soft magnetic material elements and disposed between the first stator 22 and the first rotor, the first generator-motor inputting and outputting energy between the first stator 22, the first rotor and the second rotor, via magnetic circuits formed along with generation of the first rotating magnetic field, the first rotating magnetic field and the first and second rotors rotating in accordance with the input and output of the energy while holding such a linear speed relationship in which a difference between a rotational speed of the first rotating magnetic field and a rotational speed of the second rotor, and a difference between a rotational speed of the second rotor and a rotational speed of the first rotor become equal to each other, a first controller (1st·PDU 41, ECU 2) electrically connected to the first stator 22, for controlling electric power generated by the first stator 22 and electric power supplied to the first stator 22, a second generator-motor 30 including an immovable second stator 32 for generating a second rotating magnetic field, a third rotor (B1 rotor 31) formed by magnets, the third rotor being provided in a manner opposed to the second stator 32, and a fourth rotor (B2 rotor 33) formed by soft magnetic material elements and disposed between the second stator 32 and the third rotor, the second generator-motor inputting and outputting energy between the second stator 32, the third rotor and the fourth rotor via magnetic circuits formed along with generation of the second rotating magnetic field, the second rotating magnetic field and the third and fourth rotors rotating in accordance with the input and output of the energy while holding such a linear speed relationship in which a difference between a rotational speed of the second rotating magnetic field and a rotational speed of the fourth rotor, and a difference between a rotational speed of the fourth rotor and a rotational speed of the third rotor become equal to each other, and a second controller (2nd•PDU 42, ECU 2) electrically connected to the second stator 32, for controlling electric power generated by the second stator 32 and electric power supplied to the second stator 32, wherein the first and fourth rotors are mechanically connected to the driven parts, the second and third rotors being mechanically connected to the output shaft of the prime mover, and the first and second stators 22, 32 being mechanically connected to each other via the first and second controllers.

According to this power plant, as shown in FIG. 29, the second rotor of the first generator-motor and the third rotor of the second generator-motor are mechanically connected to the output shaft of the prime mover, and the first rotor of the first generator-motor and the fourth rotor of the second generator-motor are mechanically connected to the driven parts. Further, the first controller for controlling electric power generated by the first stator and electric power supplied to the first stator is electrically connected to the first stator of the first generator-motor, and the second controller for controlling electric power generated by the second stator and electric power supplied to the second stator is electrically connected to the second stator of the second generator-motor. The first and second stators are electrically connected to each other via the first and second controllers. It should be noted that as to connections between elements, mechanical connections are indicated by solid lines, electrical connections are indicated by one-dot chain lines, and magnetic connections are indicated by broken lines. Further, flows of power and electric power are indicated by thick lines with arrows.

Furthermore, in the first generator-motor, energy is input and output between the first stator and the first and second rotors, via the magnetic circuits formed along with generation of the first rotating magnetic field of the first stator, and in accordance with the input and output of the energy, the first rotating magnetic field and the first and second rotors rotate while holding such a linear speed relationship in which the difference between the rotational speed of the first rotating magnetic field and the rotational speed of the second rotor, and the difference between the rotational speed of the second rotor and the rotational speed of the first rotor become equal to each other. The above linear speed relationship between the three of the first rotating magnetic field and the first and second rotors corresponds to the relationship between the rotational speeds of one and the other of the sun gear and ring gear of a planetary gear unit, and a carrier (hereinafter, the sun gear and the ring gear and the carrier are referred to as "the three elements") supporting the planetary gears.

Therefore, the relationship between the input and output of energy between the first stator and the first and second rotors is the same as the relationship between the input and output of energy between the above-described three elements of the planetary gear unit. More specifically, in the first generator-motor, power (energy) input to the second rotor is distributed to the first stator and the first rotor via the magnetic circuits. In this case, as described above, the difference between the rotational speed of the first rotating magnetic field and that of the second rotor, and the difference between the rotational speed of the second rotor and that of the first rotor are equal to each other. As a consequence, assuming that torque equivalent to the electric power generated by the first stator and the rotational speed of the first rotating magnetic field is first power-generating equivalent torque, and torque transmitted to the first rotor is first rotor transmitting torque, second rotor transmitting torque transmitted to the second rotor is distributed to the first stator and the first rotor as the first power-generating equivalent torque and the first rotor transmitting torque at a distribution ratio of 1:1, respectively. Hereinafter, the respective rotational speeds of the first rotating magnetic field, the first rotor and the second rotor will be referred to as the first magnetic field rotational speed VMF1, the first rotor rotational speed VR1 and the second rotor rotational speed VR2, respectively.

Further, the arrangement of the second generator-motor is the same as that of the first generator-motor. Energy is input and output between the second stator and the third and fourth rotors via the magnetic circuits formed along with generation of the second rotating magnetic field of the second stator, and in accordance with the input and output of the energy, the second rotating magnetic field and the third and fourth rotors rotate while holding such a linear speed relationship in which the difference between the rotational speed of the second rotating magnetic field and the rotational speed of the fourth rotor, and the difference between the rotational speed of the fourth rotor and the rotational speed of the third rotor become equal to each other. The above linear speed relationship between the three of the second rotating magnetic field and the third and fourth rotors corresponds to the relationship between the rotational speeds of the three elements of the planetary gear unit.

Therefore, the relationship between the input and output of energy between the second stator and the third and fourth rotors is also the same as the relationship between the input and output of energy between the above-described three elements of the planetary gear unit. More specifically, in the second generator-motor, power input to the third rotor and electric power supplied to the second stator are combined via the magnetic circuits, and the combined power is output to the fourth rotor. In this case, as described above, the difference between the rotational speed of the second rotating magnetic field and that of the fourth rotor, and the difference between the rotational speed of the fourth rotor and that of the third rotor are equal to each other. As a consequence, assuming that torque equivalent to the electric power supplied to the second stator and the rotational speed of the second rotating magnetic field is second driving equivalent torque, and torque transmitted to the third rotor is third rotor transmitting torque, the second driving equivalent torque and the third rotor transmitting torque are combined at a torque combining ratio of 1:1, and the combined torque is transmitted to the fourth rotor as fourth rotor transmitting torque. Hereinafter, the respective rotational speeds of the second rotating magnetic field, the third rotor and the fourth rotor will be referred to as the second magnetic field rotational speed VMF2, the third rotor rotational speed VR3 and the fourth rotor rotational speed VR4, respectively.

With the above arrangement, in the power plant according to the present invention, power from the prime mover is transmitted to the driven parts, e.g. as follows: Electric power generation is performed by the first generator-motor using part of the power from the prime mover under the control of the first and second controllers, and the generated electric power is supplied to the second stator of the second generator-motor. During the electric power generation by the first generator-motor, as shown in FIG. 29, when part of the power from the prime mover is transmitted to the first stator as electric power via the second rotor connected to the prime mover and the magnetic circuits, in accordance therewith, part of the power from the prime mover is also transmitted to the first rotor via the second rotor and magnetic circuits. That is, the power from the prime mover transmitted to the second rotor is distributed to the first stator and the first rotor. Further, the power from the prime mover transmitted to the first rotor is transmitted to the driven parts.

Further, as described above, when the electric power generated by the first stator is supplied to the second stator, the supplied electric power is converted to mechanical power (hereinafter, the mechanical power is referred to as "electric power-converted power"), and along with transmission of the electric power-converted power to the fourth rotor, the remainder of the power from the prime mover is transmitted to the fourth rotor via the third rotor and magnetic circuits. As described above, combined power formed by combining the electric power-converted power and the remainder of the power from the prime mover is transmitted to the fourth rotor, and the combined power is transmitted to the driven parts. As a consequence, power having a magnitude equal to that of the power from the prime mover is transmitted to the driven parts.

As described above, the power from the prime mover is divided and transmitted to the driven parts via three paths, i.e. a first path formed by the second rotor, associated magnetic circuits and the first rotor, a second path formed by the third rotor, associated magnetic circuits and the fourth rotor, and a third path formed by the second rotor, associated magnetic circuits, the first stator, the first and second controllers, the second stator, associated magnetic circuits and the fourth rotor. In the third path, the power from the prime mover is once converted to electric power, and is then converted back into power to be transmitted to the driven parts via a so-called electrical path, whereas in the first and second paths, the power is transmitted to the driven parts without being converted to electric power, via the magnetic circuits in a non-contacting manner, via a so-called magnetic path, so that the transmission efficiency is high compared with the third path.

In this case, as described above, the second rotor transmitting torque is distributed to the first stator and the first rotor as the first power-generating equivalent torque and the first rotor transmitting torque at the distribution ratio of 1:1, respectively, and the second driving equivalent torque and the third rotor transmitting torque are combined at the torque combining ratio of 1:1, thereby transmitted to the fourth rotor as the fourth rotor transmitting torque. This makes it possible to transmit $2/3$ or more of the power from the prime mover, that is, most part thereof to the driven parts by the magnetic path via the aforementioned first and second paths having a high transmission efficiency. In other words, the power from the prime mover, which is transmitted to the driven parts by an electrical path having a low transmission efficiency via the aforementioned third path, can be reduced to $1/3$ or less thereof, which is smaller than in the case of the conventional power plant described hereinabove. Therefore, it is possible to enhance driving efficiency of the power plant with which the power plant drives the driven parts.

Further, differently from the intermediate rotor of the conventional power plant, the second rotor is not formed by coils, but by soft magnetic material elements, so that when energy is input and output between the first stator and the first rotor, the second rotor is magnetized by the first rotating magnetic field and the magnets of the first rotor, whereby the first generator-motor functions as a synchronous motor. This also applies to the second generator-motor the fourth rotor of which is formed by soft magnetic material elements. This makes it possible to make the efficiencies of the first and second generator-motors higher than those of the conventional generator-motors which function as induction machines, whereby it is possible to further enhance the driving efficiency of the power plant.

Further, when the power from the prime mover is transmitted to the driven parts as described above, the first and second magnetic field rotational speeds VMF1, VMF2 are controlled using the first and second controllers, respectively, whereby it is possible to transmit the power from the prime mover to the driven parts while steplessly changing the speed thereof. More specifically, the linear speed relationships as described above holds between the first magnetic field rotational speed VMF1 and the first and second rotor rotational speeds VR1, VR2, and between the second magnetic field rotational speed VMF2 and the third and fourth rotor rotational speeds VR3, VR4. Further, in the above-described connecting relationship, when the second and third rotors are both directly connected to the output shaft of the prime mover, both the second and third rotor rotational speeds VR2, VR3 are equal to the rotational speed of the prime mover, whereas when the first and fourth rotors are both directly connected to the driven parts, both the first and fourth rotor rotational speeds VR1, VR4 are equal to the rotational speed of the driven parts. From the above, the relationship between the rotational speeds VMF1, VR1, VR2, VMF2, VR3, and VR4 is indicated e.g. by thick solid lines in FIG. 30. Although in FIG. 30 and other speed diagrams, referred to hereinafter, actually, vertical lines intersecting horizontal lines indicative of a value of 0 are for representing the velocities of parameters, and the distance between each white circle shown on the vertical lines and an associated one of the horizontal lines corresponds to the velocity of each parameter, a reference numeral indicative of the velocity of each parameter is shown on one end of each vertical line for convenience.

Therefore, as indicated by broken lines in FIG. 30, e.g. by increasing the first magnetic field rotational speed VMF1 and decreasing the second magnetic field rotational speed VMF2, with respect to the second and third rotor rotational speeds VR2, VR3, it is possible to transmit the power from the prime mover to the driven parts while steplessly decreasing the speed of the power. Inversely, as indicated by one-dot chain lines in FIG. 30, by decreasing the first magnetic field rotational speed VMF1 and increasing the second magnetic field rotational speed VMF2, with respect to the second and third rotor rotational speeds VR2, VR3, it is possible to transmit the power from the prime mover to the driven parts while steplessly increasing the power from the prime mover.

The invention includes a power plant 1, 1A to 1E, further comprising an electric power storage device (battery 43) configured to be capable of being charged and discharged, the electric power storage device being electrically connected to the first and second stators 22, 32 via the first and second controllers, respectively.

With this arrangement, the electric power storage device configured to be capable of being charged and discharged is connected to the first and second stators via the first and second controllers, respectively. For example, this makes it possible to control the power from the prime mover such that when power required for driving the driven parts is small with respect to power that will make it possible to obtain the optimum fuel economy of the prime mover (hereinafter referred to as "the optimum fuel economy"), the optimum fuel economy can be obtained, and charge the electric power storage device with surplus power from the prime mover as electric power. Inversely, when the power required for driving the driven parts is large with respect to the power that will make it possible to obtain the optimum fuel economy of the prime mover, this makes it possible to control the power from the prime mover such that the optimum fuel economy can be obtained, and make up for an insufficient amount of the power by supplying electric power charged in the above-described electric power storage device to the first stator and/or the second stator. From the above, the optimum fuel economy of the prime mover can be obtained, and therefore it is possible to further enhance the driving efficiency of the power plant.

The invention includes a power plant 1A, further comprising a transmission 60 disposed between the first and fourth rotors and the driven parts, for transmitting power from the first and fourth rotors to the driven parts while changing speed of the power.

With this arrangement, the power from the first and fourth rotors is transmitted to the driven parts while the speed thereof is changed by the transmission. Therefore, for example, when the load on the driven parts is very large, by controlling the transmission gear ratio of the transmission such that the speed is decreased, torque transmitted from the first and fourth rotors to the transmission can be made small with respect to torque transmitted from the transmission to the driven parts, whereby it is possible to reduce the sizes of the first and fourth rotors, and further reduce the sizes and costs of the first and second generator-motors.

Further, for example, when the speed of the driven parts is very high, by controlling the transmission gear ratio of the transmission such that the speed is increased, the first and fourth rotor rotational speeds VR1, VR4 can be lowered with respect to the speed of the driven parts, and hence it is possible to prevent the first and second generator-motors from becoming faulty due to an event that the rotational speeds of the first and fourth rotors become too high. As described above, the first rotor is formed by magnets which are lower in strength than the soft magnetic material elements and are liable to develop the above-mentioned inconveniences. Therefore, this function is particularly effective. Further, by controlling the transmission gear ratio of the transmission, it is possible to properly control the first and fourth rotor rotational speeds VR1, VR4 with respect to the speed of the driven parts, thereby making it possible to obtain high efficiencies of the first and second generator-motors.

Further, as described hereinabove, the first and second generator-motors makes it possible to transmit the power from the prime mover to the driven parts while steplessly changing the speed of the power, so that it is possible to reduce the frequency of the speed-changing operation of the transmission. This makes it possible to enhance the driving efficiency of the power plant, for the following reason: When the rotational speed of the prime mover is decreased by the speed-changing operation of the transmission, energy based on the decreased amount of the rotational speed of the prime mover and the inertias of the prime mover and the transmission is lost by heat losses, whereby as the frequency of the speed-changing operation of the transmission becomes higher, the driving efficiency of the power plant becomes lower.

The invention includes a power plant 1B, further comprising a transmission 70 disposed between the first rotor and the driven parts, for transmitting power from the first rotor to the driven parts while changing speed of the power.

With this arrangement, the power from the first rotor is transmitted to the driven parts while the speed thereof is changed by the transmission. Therefore, for example, when the load on the driven parts is very large, by controlling the transmission gear ratio of the transmission such that the speed is decreased, torque transmitted from the first rotor to the transmission can be made smaller with respect to torque transmitted from the transmission to the driven parts, whereby it is possible to reduce the size of the first rotor, and further reduce the size and costs of the first generator-motor.

Further, for example, when the speed of the driven parts is very high, by controlling the transmission gear ratio of the transmission such that the speed is increased, the first rotor rotational speed VR1 can be lowered with respect to the speed of the driven parts, and hence it is possible to prevent the first generator-motor from becoming faulty due to an event that the first rotor rotational speed VR1 becomes too high. Since the first rotor is formed by magnets, the above-mentioned inconveniences are liable to occur, and hence this function is particularly effective. Further, by controlling the transmission gear ratio of the transmission, it is possible to properly control the first rotor rotational speed VR1 with respect to the speed of the driven parts, whereby it is possible to obtain high efficiency of the first generator-motor.

On the other hand, in connecting the prime mover to the driven parts via a gear-type stepped transmission, during the speed-changing operation of the transmission, until input and output shafts are connected to a gear train shifted to a desired transmission gear ratio, the prime mover is disconnected from the driven parts by the gear-type stepped transmission, whereby torque from the prime mover is not transmitted, thereby making a speed-change shock, such as a sudden decrease in torque, liable to occur. According to the present invention, it is possible to connect the fourth rotor to the driven parts without via the gear-type stepped transmission, whereby even when the gear-type stepped transmission is used as a transmission for transmitting the power from the first rotor to the driven parts, during the speed-changing operation of the transmission, it is possible to transmit part of torque from the prime mover to the driven parts via the fourth rotor. This makes it possible to suppress the above-described speed-change shock, thereby making it possible to improve marketability.

The invention includes a power plant 1C, further comprising a transmission 80 disposed between the fourth rotor and the driven parts, for transmitting power from the fourth rotor to the driven parts while changing speed of the power.

With this arrangement, the power from the fourth rotor is transmitted to the driven parts while the speed thereof is changed by the transmission. Therefore, for example, when the load on the driven parts is very large, by controlling the transmission gear ratio of the transmission such that the speed is decreased, torque transmitted from the fourth rotor to the transmission can be made small with respect to torque transmitted from the transmission to the driven parts, whereby it is possible to reduce the size of the fourth rotor, and further reduce the size and costs of the second generator-motor. Further, for example, when the speed of the driven parts is very high, by controlling the transmission gear ratio of the transmission such that the speed is increased, the fourth rotor rotational speed VR4 can be lowered with respect to the speed of the driven parts, and hence it is possible to prevent the second generator-motor from becoming faulty due to an event that the fourth rotor rotational speed VR4 becomes too high. Further, by controlling the transmission gear ratio of the transmission, it is possible to properly control the fourth rotor rotational speed VR4 with respect to the speed of the driven parts, whereby it is possible to obtain high efficiency of the second generator-motor.

Further, as described hereinabove, in connecting the prime mover to the driven parts via the gear-type stepped transmission, during the speed-changing operation of the transmission, a speed-change shock is liable to occur. According to the present invention, it is possible to connect the first rotor to the driven parts without via the gear-type stepped transmission, whereby even when the gear-type stepped transmission is used as a transmission for transmitting the power from the fourth rotor to the driven parts, during the speed-changing operation of the transmission, it is possible to transmit part of torque from the prime mover to the driven parts via the first rotor. This makes it possible to suppress the above-described speed-change shock, thereby making it possible to improve marketability.

The invention includes a power plant 1D, further comprising a transmission 90 disposed between the output shaft of the prime mover and the second and third rotors, for transmitting power from the output shaft to the second and third rotors while changing speed of the power.

With this arrangement, the power from the output shaft of the prime mover is transmitted to the second and third rotors while the speed of the power is changed by the transmission. Therefore, for example, by controlling the transmission gear ratio of the transmission such that the speed is increased, torque input from the output shaft of the prime mover to the second and third rotors can be made smaller, whereby it is possible to reduce the sizes and costs of the first and second generator-motors. Further, when the rotational speed of the output shaft of the prime mover is very high, by controlling the transmission gear ratio of the transmission such that the speed is decreased, the second and third rotor rotational speeds VR2, VR3 can be lowered with respect to the rotational speed of the output shaft, and hence it is possible to prevent the first and second generator-motors from becoming faulty due to an event that the rotational speeds of the second and third rotors become too high. Since the third rotor is formed by magnets, the above-mentioned inconveniences are liable to occur, and hence this function is particularly effective.

Further, by controlling the transmission gear ratio of the transmission, it is possible to properly control the second and third rotor rotational speed VR2, VR3 with respect to the rotational speed of the output shaft of the prime mover, whereby it is possible to obtain high efficiencies of the first and second generator-motors. Further, as described hereinabove as to the effects of claim 4, when the prime mover is connected to the driven parts via the gear-type stepped transmission, during the speed-changing operation of the transmission, a speed-change shock is liable to occur. According to the present invention, it is possible to connect the first and fourth rotors to the driven parts without via the gear-type stepped transmission, whereby even when the gear-type stepped transmission is used as a transmission for transmitting the power from the output shaft of the prime mover to the second and third rotors, during the speed-changing operation of the transmission, the above-described speed-change shock can be suppressed by effects described hereafter.

When the second and third rotor are connected to each other, and the output shaft of the prime mover is disconnected from the second and third rotors by the speed-changing operation of the transmission, if electric power is supplied to the first and second stators, torque from the first stator and torque having been transmitted to the first rotor, as described hereinafter, are transmitted to the second rotor in a combined state because of the above-described relationship between the input and output of energy in the first generator-motor. The torque having been transmitted to the second rotor is transmitted to the third rotor, and then is transmitted to the fourth rotor in a state combined with torque from the second stator because of the above-described relationship between the input and output of energy in the second generator-motor. Part of the torque having been transmitted to the fourth torque is transmitted to the driven parts, and the remainder of the torque is transmitted to the first rotor via the driven parts. As described above, during the speed-changing operation of the transmission, torque from the first and second generator-motors can be transmitted to the driven parts, and hence the speed-change shock can be suppressed, thereby making it possible to improve marketability.

The invention includes a power plant 1A to 1E, further comprising a brake mechanism BL for blocking reverse rotation of the output shaft of the prime mover.

With this arrangement, the reverse rotation of the output shaft of the prime mover is blocked by the brake mechanism, and accordingly each of the second and third rotors connected to the output shaft is blocked from rotating in one direction. Hereinafter, the directions of rotations of the second and third rotors, blocked by the brake mechanism, are referred to as "the second rotor blocking direction" and "the third rotor blocking direction", respectively. Further, because of the above-described relationship between the input and output of energy in the first generator-motor, by supplying electric power to the first stator, and causing a rotating magnetic field generated along therewith to rotate in the same direction as the second rotor blocking direction, all the aforementioned electric power-converted power from the first stator can be transmitted to the first rotor as power, and can be further transmitted to the driven parts. Further, because of the above-described relationship between the input and output of energy in the second generator-motor, by supplying electric power to the second stator, and causing a rotating magnetic field generated along therewith to rotate in a direction opposite to the third rotor blocking direction, all the electric power-converted power from the second stator can be transmitted to the fourth rotor as power, and can be further transmitted to the driven parts.

As described above, according to the present invention, it is possible to drive the driven parts by the first generator-motor and/or the second generator-motor, without using the power from the prime mover. Further, in this case, it is possible not only to block reverse rotation of the output shaft of the prime mover by the brake mechanism but also to drive the driven parts without dragging the prime mover by the following effects: The electric power-converted power from the first stator acts on the second rotor such that the second rotor is caused to rotate in the second rotor blocking direction, and the electric power-converted power from the second stator acts on the third rotor such that the third rotor is caused to rotate in the third rotor blocking direction. Thus, during the above-described driving of the driven parts, the output shaft of the prime mover is held in a stopped state together with the second and third rotors, which prevents the prime mover from being dragged.

BRIEF DESCRIPTION OF THE DRAWINGS

FIG. 2 A block diagram showing an ECU etc. that control the engine and the first and second generator-motors of the power plant.

FIG. 8 Diagrams each showing magnetic circuits formed when the first generator-motor is in operation.

FIG. 10 Speed diagrams illustrating examples of representing the relationship between a first magnetic field rotational speed VMF1 and A1 and A2 rotor rotational speeds VRA1 and VRA2, in respective cases of (a) the A1 rotor being made unrotatable, (b) the A2 rotor being made unrotatable, (c) both the A1 and A2 rotors being rotating, and (d) the first magnetic field rotational speed VMF1 being equal to 0.

FIG. 17 A speed diagram representing the relationship between the first and second magnetic field rotational speeds VMF1 and VMF2, and the A1, A2, B1 and B2 rotor rotational speeds VRA1, VRA2, VRB1 and VRB2 at the time of ENG start during the EV traveling.

FIG. 28 A diagram illustrating an example of a speed diagram representing the relationship between the first and second magnetic field rotational speeds VMF1 and VMF2, and the A1, A2, B1 and B2 rotor rotational speeds VRA1, VRA2, VRB1 and VRB2 at the time of ENG-based standing start.

FIG. 32 A schematic diagram illustrating the relationship between the engine torque TENG and the demanded torque PMCMD using solid lines with arrows for the drive-time charging mode and using broken lines with arrows for the battery input/output zero mode.

BEST MODE FOR CARRYING OUT THE INVENTION

Figure 1:
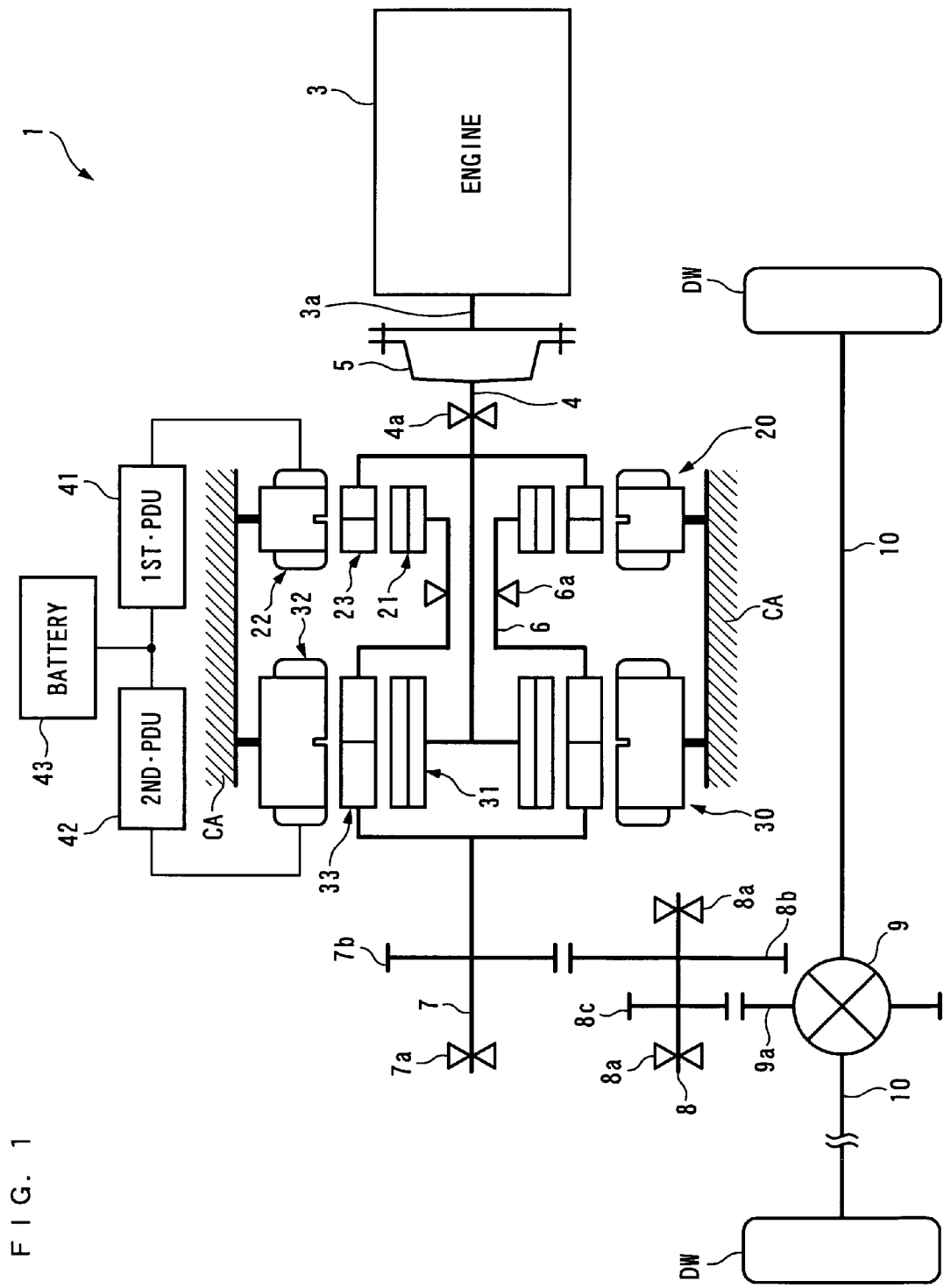
FIG. 1 A schematic view of an internal combustion engine, first and second generator-motors etc. of a power plant according to a first embodiment.

The present invention will now be described in detail with reference to the drawings showing a preferred embodiment thereof. It should be noted that in the figures, hatching for portions illustrating cross-sections are omitted for convenience. FIGS. 1 and 2 schematically show a power plant 1 according to a first embodiment of the present embodiment. As shown in FIG. 1, the power plant 1 is for driving left and right drive wheels DW and DW (driven parts) of a vehicle (not shown), and, as shown in FIG. 1, includes an internal combustion engine 3 (prime mover) and a first generator-motor 20 and a second generator-motor 30 as power sources, and a differential gear mechanism 9 connected to the drive wheels DW and DW via drive shafts 10 and 10. Further, as shown in FIG. 2, the power plant 1 includes an ECU 2 (first controller and second controller), a 1st•PDU 41 (first controller) and a 2nd•PDU 42 (second controller), for controlling the operations of the internal combustion engine 3 and the first and second generator-motors 20 and 30. As described hereinafter, the first and second generator-motors 20 and 30 function as stepless transmissions.

The internal combustion engine (hereinafter referred to as "the engine") 3 is e.g. a gasoline engine, and has a crankshaft 3a (output shaft) to which is concentrically connected a first main shaft 4 via a flywheel 5. The first main shaft 4 is rotatably supported by a bearing 4a. Further, a connection shaft 6 and a second main shaft 7 are arranged concentrically with the first main shaft 4, and an idler shaft 8 is disposed in parallel with the first main shaft 4. The connection shaft 6, the second main shaft 7, and the idler shaft 8 are rotatably supported by bearings 6a, 7a, and 8a and 8a, respectively.

The connection shaft 6 is formed to be hollow, and the first main shaft 4 is concentrically rotatably fitted through the connection shaft 6. The idler shaft 8 is integrally formed with a first gear 8b and a second gear 8c. The first gear 8b is in mesh with a gear 7b integrally formed with the second main shaft 7, and the second gear 8c is in mesh with a gear 9a of a differential gear mechanism 9. With the above arrangement, the second main shaft 7 is connected to the drive wheels DW and DW via the idler shaft 8 and the differential gear mechanism 9. Hereinafter, the circumferential direction and the axial direction of the first main shaft 4, the connection shaft 6, and the second main shaft 7 are simply referred to as "the circumferential direction" and "the axial direction", respectively.

Figure 3:
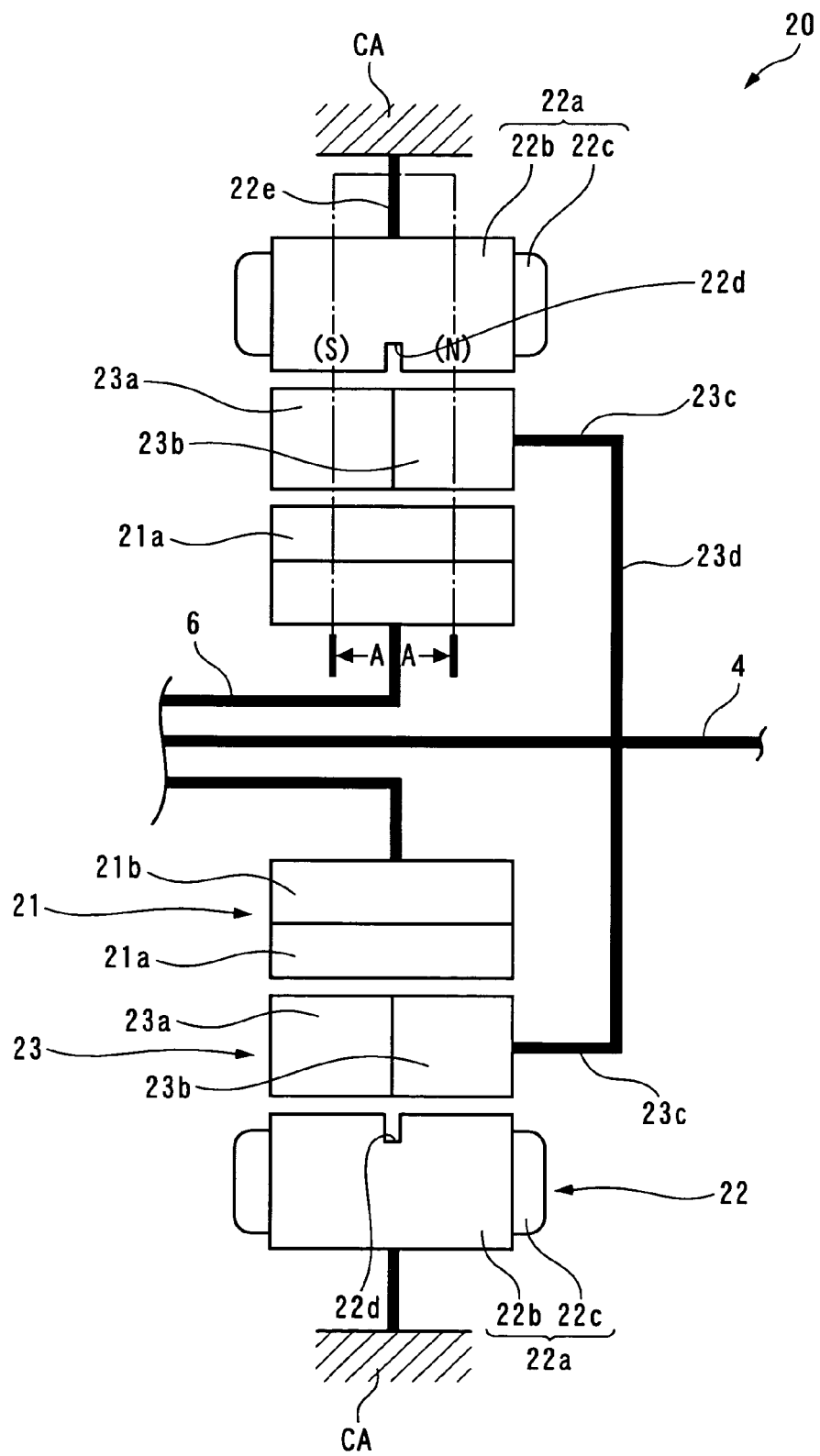
FIG. 3 An enlarged cross-sectional view of the first generator-motor.

As shown in FIGS. 1 and 3, the first generator-motor 20 is comprised of an A1 rotor 21 (first rotor), a first stator 22 disposed in a manner opposed to the A1 rotor 21, and an A2 rotor 23 (second rotor) disposed between the two 21 and 22 at predetermined spaced intervals. The torque capacity of the first generator-motor 20 is set to approximately half of the maximum torque of the engine 3. The A1 rotor 21, the A2 rotor 23, and the first stator 22 are radially arranged from the inner side in the mentioned order. Hereinafter, the left side and the right side as viewed in FIG. 3 will be referred to as "left" and "right"

The A1 rotor 21 has 2n permanent magnets 21a. The permanent magnets 21a are mounted on the outer peripheral surface of an annular fixing portion 21b in a state arranged at equal intervals in the circumferential direction. Each permanent magnet 21a has a generally sector-shaped cross-section orthogonal to the axial direction, and slightly extends in the axial direction. The above-mentioned fixing portion 21b is formed of a soft magnetic material element, such as iron, and has an inner peripheral surface thereof integrally attached to the connection shaft 6. With the above arrangement, the permanent magnets 21a, that is, the A1 rotor 21 are rotatable in unison with the connection shaft 6.

Figure 4:
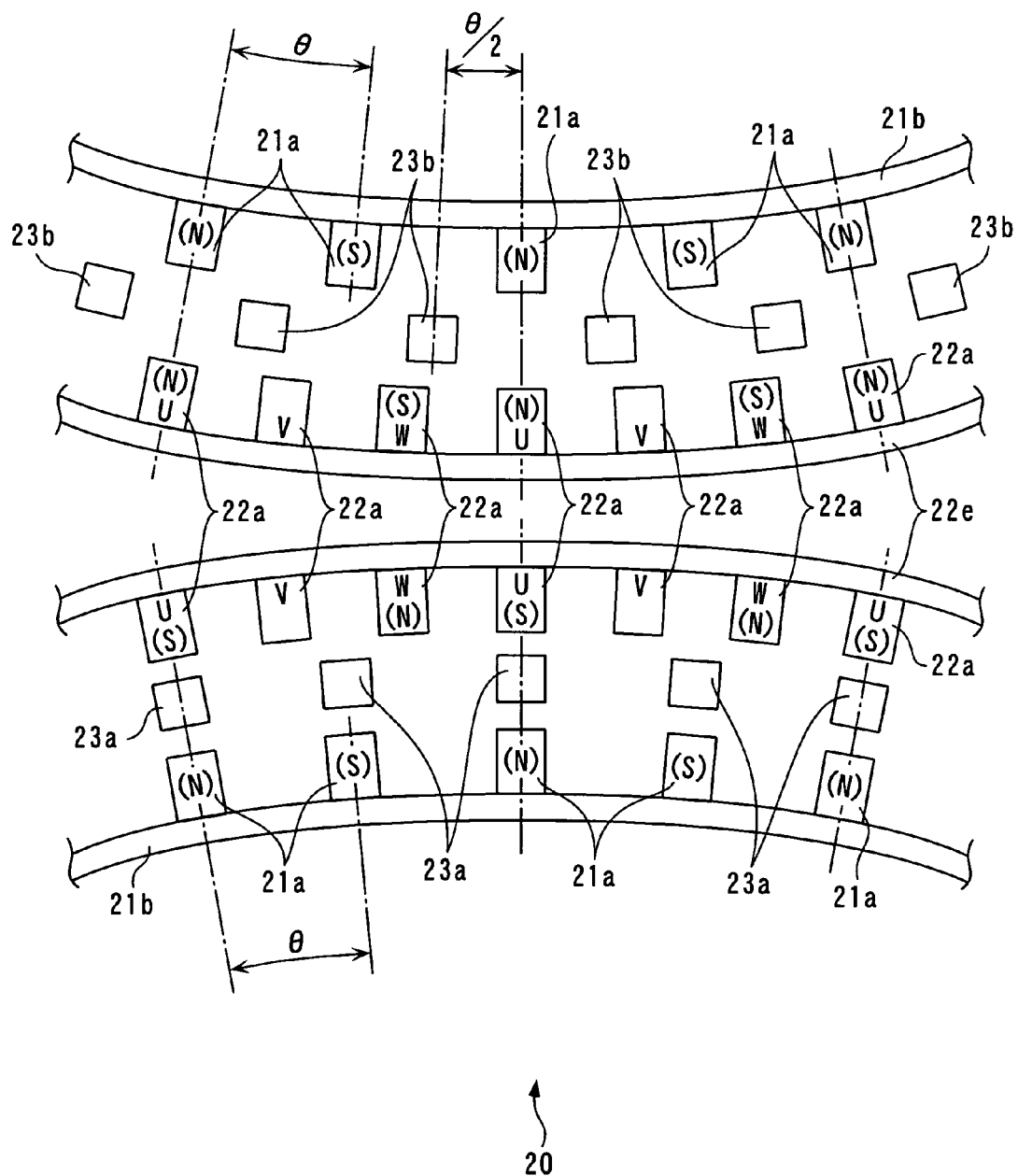
FIG. 4 A development view of part of a cross-section of the first generator-motor taken on line A-A of FIG. 3 along the circumferential direction during generation of first and second rotating magnetic fields.

Further, as shown in FIG. 4, a central angle formed by each two permanent magnets 21a circumferentially adjacent to each other about the connection shaft 6 is a predetermined angle θ. Further, the two permanent magnets 21a circumferentially adjacent to each other have polarities different from each other. Hereafter, respective magnetic poles on the left side and the right side of the permanent magnet 21a are referred to as "the first magnetic pole" and "the second magnetic pole", respectively.

The first stator 22 generates rotating magnetic fields, and has 3n armatures 22a arranged at equal intervals in the circumferential direction. Each armature 22a is comprised of an iron core 22b, a coil 22c wound around the iron core 22b, and so forth. The iron core 22b has a generally sector-shaped cross-section orthogonal to the axial direction, and has approximately the same axial length as that of the permanent magnet 21a. An axially central portion of the inner peripheral surface of the iron core 22b is formed with a circumferentially extending groove 22d. The 3n coils 22c form n sets of three-phase coils of U-phase coils, V-phase coils, and W-phase coils (see FIG. 4). Further, the armature 22a are mounted on a case CA via an annular fixing portion 22e such that the armatures 22a are immovable. Due to the numbers and the arrangements of the armatures 22a and the permanent magnets 21a, when the center of a certain armature 22a circumferentially coincides with the center of a certain permanent magnet 21a, the center of every three armatures 22a from the armature 22a, and the center of every two permanent magnets 21a from the permanent magnet 21a circumferentially coincide with each other.

Furthermore, each armature 22a is electrically connected to a battery 43 (power storage device) and the ECU 2 via the 1st•PDU 41, and the 1st•PDU 41 is formed by an electric circuit, such as an inverter. Further, the armature 22a is configured such that when it is supplied with electric power from the battery 43 or generate electric power, as described hereinafter, magnetic poles having different polarities from each other are generated on the left and right ends of the iron core 22b, respectively. Further, along with generation of these magnetic poles, first and second rotating magnetic fields are generated between the left portion of the A1 rotor 21 (on the first magnetic pole side) and the left end of the iron core 22b, and between the right portion of the A1 rotor 21 (on the second magnetic pole side) and the right end of the iron core 22b in a circumferentially rotating manner, respectively. Hereinafter, the magnetic poles generated on the left and right ends of the iron core 22b are referred to as "the first armature magnetic pole" and "the second armature magnetic pole". Further, the number of the first armature magnetic poles and that of the second armature magnetic poles are the same as the number of the magnetic poles of the permanent magnets 21a, that is, 2n, respectively.

The A2 rotor 23 has a plurality of first cores 23a and a plurality of second cores 23b. The first and second cores 23a and 23b are arranged at equal intervals in the circumferential direction, respectively, and the numbers of 23a and 23b are both set to the same number as that of the permanent magnets 21a that is, 2n. Each first core 23a is formed by laminating soft magnetic material elements, such as a plurality of steel plates, such that it has a generally sector-shaped cross-section orthogonal to the axial direction, and extends by a length approximately equal to a half of the length of the permanent magnet 21a in the axial direction. Similarly to the first core 23a, each second core 23b is formed by laminating a plurality of steel plates, such that it has a generally sector-shaped cross-section orthogonal to the axial direction, and extends by a length approximately equal to a half of the length of the permanent magnet 21a in the axial direction.

Further, the first cores 23a are each axially arranged between the left portion of the A1 rotor 21 (on the first magnetic pole side) and the left portion of the first stator 22 (on the first armature magnetic pole side), and the second cores 23b are each axially arranged between the right portion of the A1 rotor 21 (on the second magnetic pole side) and the right portion of the first stator 22 (on the second armature magnetic pole side). Furthermore, the second cores 23b are circumferentially alternately arranged with respect to the first cores 23a, and the center of the second cores 23b is displaced by a half of the aforementioned predetermined angle θ from the center of the first cores 23a (see FIG. 4).

The first and second cores 23a and 23b are mounted on an outer end of a flange 23d by bar-shaped connecting portions 23c slightly extending in the axial direction, respectively. The flange 23d is integrally concentrically fitted on the first main shaft 4. With this arrangement, the first and second cores 23a and 23b, that is, the A2 rotor 23 is rotatable in unison with the first main shaft 4, and is connected to the crankshaft 3a via the first main shaft 4.

In the first generator-motor 20 configured as above, as shown in FIG. 4, during generation of the first and second rotating magnetic fields, when the polarity of each first armature magnetic pole is different from the polarity of an opposed (closest) one of the first magnetic poles, the polarity of each second armature magnetic pole is the same as the polarity of an opposed (closest) one of the second magnetic poles. Further, when each first core 23a is in a position between each first magnetic pole and each first armature magnetic pole, each second core 23b is in a position between a pair of second armature magnetic poles circumferentially adjacent to each other and a pair of second magnetic poles circumferentially adjacent to each other. Furthermore, although not shown, during generation of the first and second rotating magnetic fields, when the polarity of each second armature magnetic pole is different from the polarity of an opposed (closest) one of the second magnetic poles, the polarity of each first armature magnetic pole is the same as the polarity of an opposed (closest) one of the first magnetic poles. Further, when each second core 23b is in a position between each second magnetic pole and each second armature magnetic pole, each first core 23a is in a position between a pair of first armature magnetic poles circumferentially adjacent to each other, and a pair of first magnetic poles circumferentially adjacent to each other.

Figure 5:
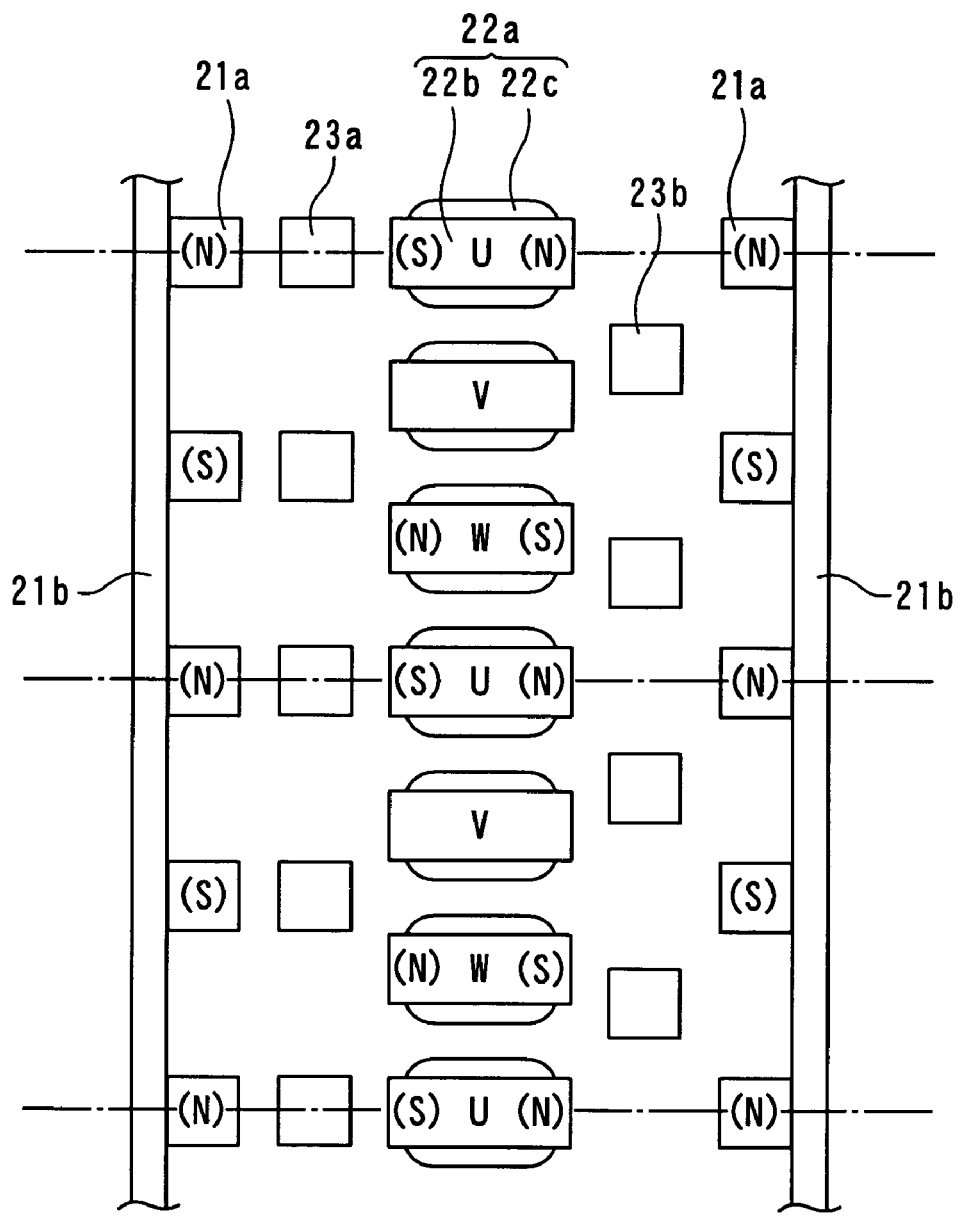
FIG. 5 A diagram showing an arrangement functionally equivalent to the arrangement of the FIG. 4 development view.

The first generator-motor 20 can be also regarded as a planetary gear unit which inputs and outputs torque by the A1 and A2 rotors 21 and 23 and inputs and outputs electric power by the first stator 22. The following description is given of this point based on the operation of the first generator-motor 20. It should be noted that although in FIG. 4, the armatures 22a and the fixing portion 22e are shown as if they were divided into two other parts since FIG. 4 is shown as a development view, actually, they are integrally formed with each other, so that the arrangement in FIG. 4 can be shown as in FIG. 5 as equivalent thereto. Therefore, hereinafter, the operation of the first generator-motor 20 is described assuming that the permanent magnets 21a, the armatures 22a, and the first and second cores 23a and 23b are arranged as shown in FIG. 5.

Further, for convenience of description, the operation of the first generator-motor 20 is described by replacing the motion of the first and second rotating magnetic fields by an equivalent physical motion of 2n imaginary permanent magnets (hereinafter referred to as "the imaginary magnets") VM, equal in number to the permanent magnets 21a. Further, the description will be given assuming that a magnetic pole at a left-side portion of each imaginary magnet VM (on the first magnetic pole side), and a magnetic pole at a right-side portion of the imaginary magnet VM (on the second magnetic pole side) are regarded as first and second armature magnetic poles, respectively, and that rotating magnetic fields generated between the left-side portion of the imaginary magnet VM and the left portion of the A1 rotor 21 (on the first magnetic pole side), and between the right-side portion of the imaginary magnet VM and the right portion of the A1 rotor 21 (on the second magnetic pole side) are regarded as first and second rotating magnetic fields. Furthermore, hereinafter, the left-side portion and the right-side portion of the permanent magnet 21a are referred to as "the first magnet portion" and "the second magnet portion".

First, a description will be given of the operation of the first generator-motor 20 in a state in which the A1 rotor 21 is made unrotatable, and the first and second rotating magnetic fields are generated by the supply of electric power to the first stator 22.

As shown in FIG. 6(a), the first and second rotating magnetic fields are generated in a manner rotated downward, as viewed in the figure, from a state in which each first core 23a is opposed to each first magnet portion, and each second core 23b is in a position between each adjacent two of the second magnet portions. At the start of the generation of the first and second rotating magnetic fields, the polarity of each first armature magnetic pole is made different from the polarity of each opposed one of the first magnetic poles, and the polarity of each second armature magnetic pole is made the same as the polarity of each opposed one of the second magnetic poles.

Since the first cores 23a are disposed as described above, they are magnetized by the first magnetic poles and the first armature magnetic poles, and magnetic lines G1 of force (hereinafter referred to as "the first magnetic force lines") are generated between the first magnetic poles, the first cores 23a, and the first armature magnetic poles. Similarly, since the second cores 23b are disposed as described above, they are magnetized by the second armature magnetic poles and the second magnetic poles, and magnetic lines G2 of force (hereinafter referred to as "the second magnetic force lines") are generated between the second armature magnetic poles, the second cores 23b, and the second magnetic poles.

In the state shown in FIG. 6(a), the first magnetic force lines G1 are generated such that they each connect the first magnetic pole, the first core 23a, and the first armature magnetic pole, and the second magnetic force lines G2 are generated such that they connect each circumferentially adjacent two second armature magnetic poles and the second core 23b located therebetween, and connect each circumferentially adjacent two second magnetic poles and the second core 23b located therebetween. As a result, in this state, magnetic circuits as shown in FIG. 8(a) are formed. In this state, since the first magnetic force lines G1 are linear, no magnetic forces for circumferentially rotating the first core 23a act on the first core 23a. Further, the two second magnetic force lines G2 between the circumferentially adjacent two second armature magnetic poles and the second core 23b are equal to each other in the degree of bend thereof and in the total magnetic flux amount. Similarly, the two second magnetic force lines G2 between the circumferentially adjacent two second magnetic poles and the second core 23b are equal to each other in the degree of bend thereof and in the total magnetic flux amount. As a consequence, the second magnetic force lines G2 are balanced. Therefore, no magnetic forces for circumferentially rotating the second core 23b act on the second core 23b, either.

When the imaginary magnets VM rotate from positions shown in FIG. 6(a) to positions shown in FIG. 6(b), the second magnetic force lines G2 are generated such that they each connect between the second armature magnetic pole, the second core 23b, and the second magnetic pole, and the first magnetic force lines G1 between the first cores 23a and the first armature magnetic poles are bent. As a result, magnetic circuits are formed by the first magnetic force lines G1 and the second magnetic force lines G2, as shown in FIG. 8(b).

In this state, since the degree of bend of each first magnetic line G1 is small but the total magnetic flux amount thereof is large, a relatively large magnetic force acts on the first core 23a. This causes the first cores 23a to be driven by relatively large driving forces in the direction of rotation of the imaginary magnets VM, that is, the direction of rotation of the first and second rotating magnetic fields (hereinafter referred to as "the magnetic field rotation direction"), whereby the A2 rotor 23 rotates in the magnetic field rotation direction. Further, since the degree of bend of the second magnetic force line G2 is large but the total magnetic flux amount thereof is small, a relatively small magnetic force acts on the second core 23b. This causes the second cores 23b to be driven by relatively small driving forces in the magnetic field rotation direction, whereby the A2 rotor 23 rotates in the magnetic field rotation direction.

Figure 6:
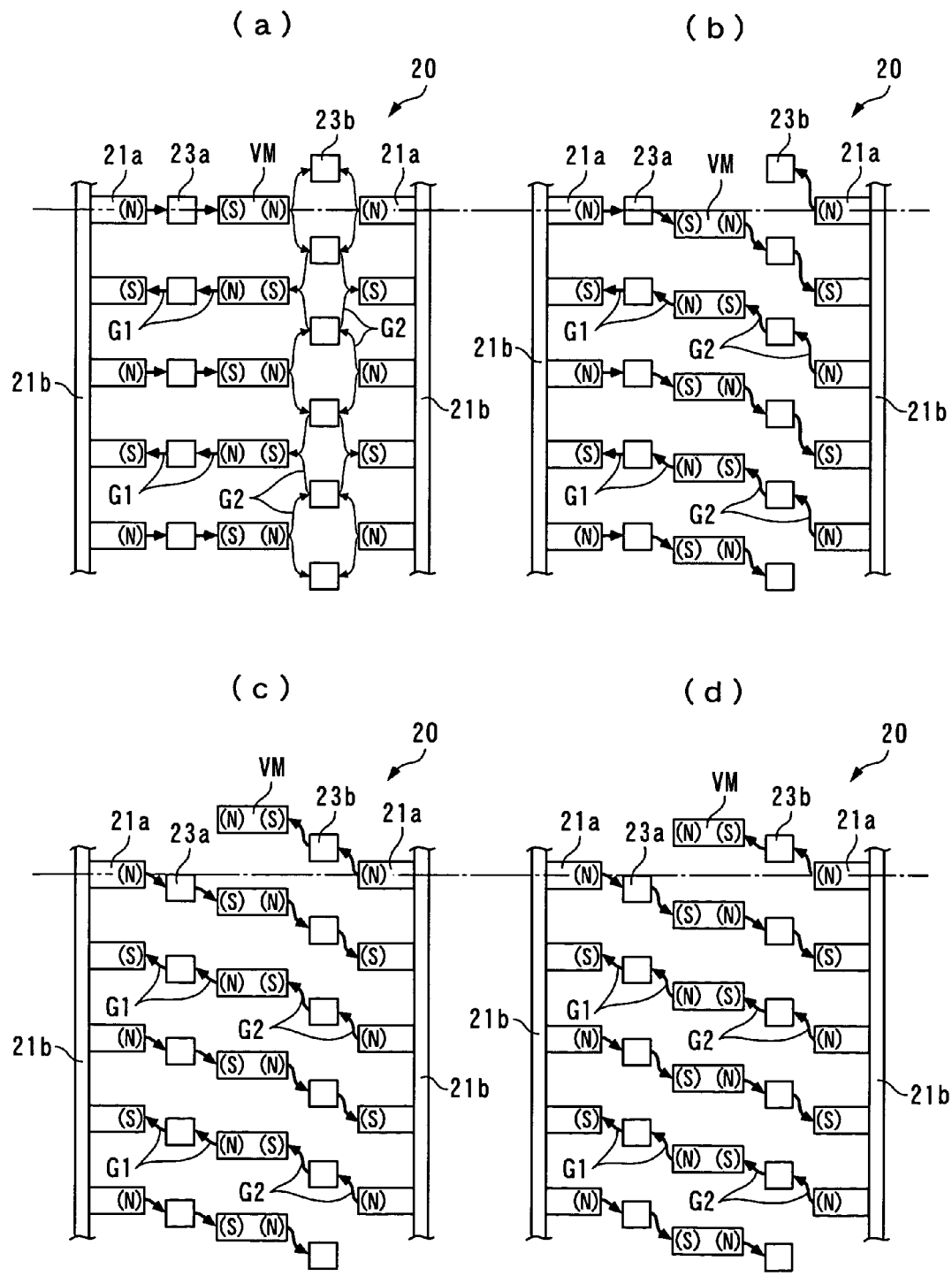
FIG. 6 Diagrams which are useful in explaining the operation of the first generator-motor in the case where the first and second rotating magnetic fields are generated while an A1 rotor is held unrotatable.
Figure 7:
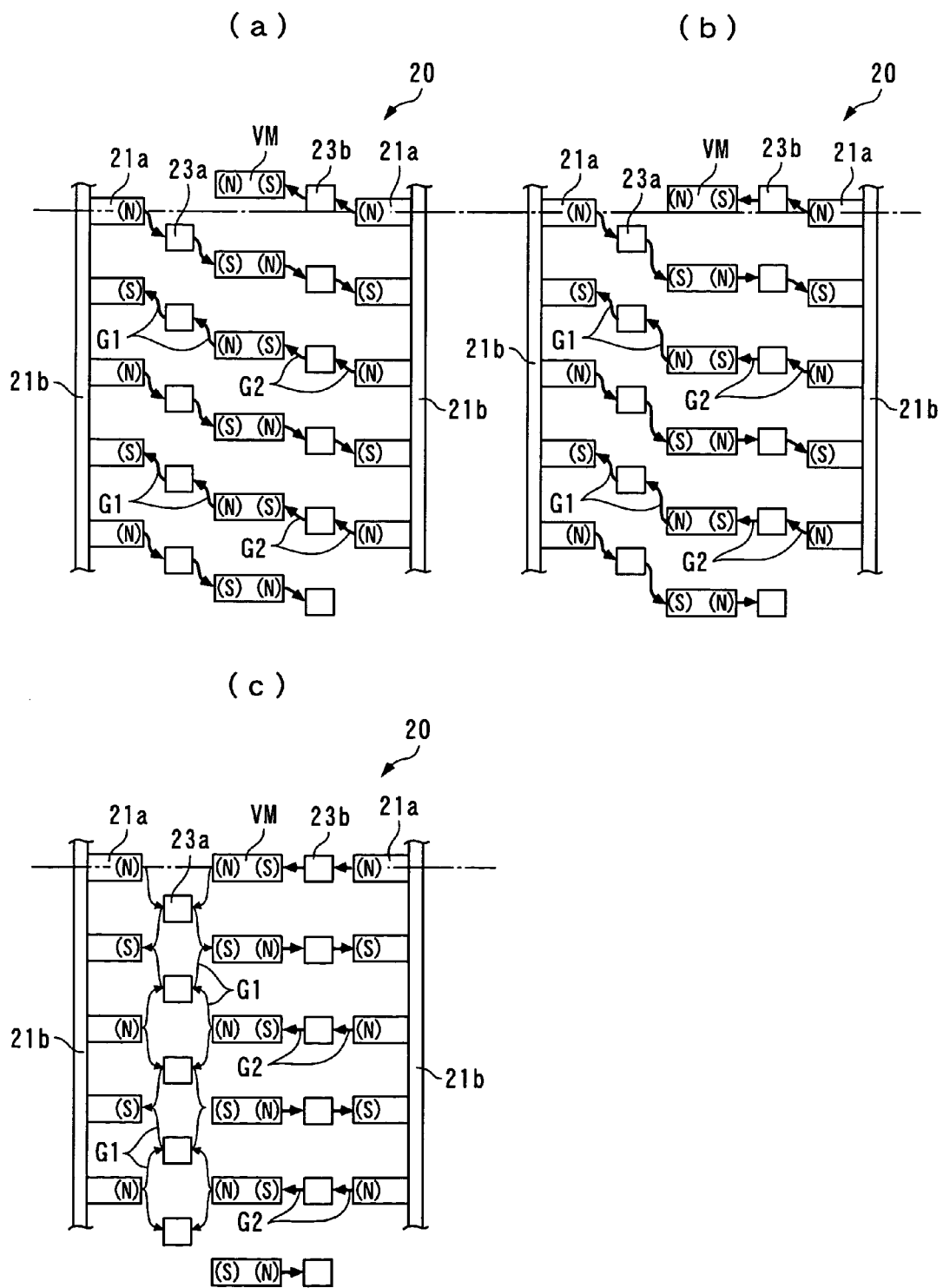
FIG. 7 Diagrams which are useful in explaining a continuation of the operation in FIG. 6.

Then, when the imaginary magnets VM rotate from the positions shown in FIG. 6(b) to respective positions shown in FIGS. 6(c) and 6 (d), and FIGS. 7(a) and 7 (b), in the mentioned order, the first and second cores 23a and 23b are driven in the magnetic field rotation direction by magnetic forces caused by the first and second magnetic force lines G1 and G2, respectively, whereby the A2 rotor 23 rotates in the magnetic field rotation direction. During the time, the first magnetic force lines G1 increase in the degree of bend thereof but decrease in the total magnetic flux amount thereof, whereby the magnetic forces acting on the first cores 23a progressively decrease to progressively reduce the driving forces for driving the first cores 23a in the magnetic field rotation direction. Further, the second magnetic force lines G2 decrease in the degree of bend thereof but increase in the total magnetic flux amount thereof, whereby the magnetic forces acting on the second cores 23b progressively increase to progressively increase the driving forces for driving the second cores 23b in the magnetic field rotation direction.

Then, while the imaginary magnets VM rotate from the positions shown in FIG. 7(b) to the positions shown FIG. 7(c), the second magnetic force lines G2 are bent, and the total magnetic flux amounts thereof become close to their maximum, whereby the strongest magnetic forces act on the second cores 23b to maximize the driving forces acting on the second cores 23b. After that, as shown in FIG. 7(c), when the imaginary magnets VM each move to a position opposed to the first and second magnet portions, the respective polarities of the first armature magnetic pole and the first magnetic pole opposed to each other become identical to each other, and the first core 23a is positioned between circumferentially adjacent two pairs of first armature magnetic poles and first magnetic poles, each pair having the same polarity. In this state, since the degree of bend of the first magnetic force line G1 is large but the total magnetic flux amount thereof is small, no magnetic force for rotating the first core 23a in the magnetic field rotation direction acts on the first core 23a. Further, second armature magnetic poles and second magnetic poles opposed to each other come to have polarities different from each other.

From this state, when the imaginary magnets VM further rotate, the first and second cores 23a and 23b are driven in the magnetic field rotation direction by the magnetic forces caused by the first and second magnetic force lines G1 and G2, whereby the A2 rotor 23 rotates in the magnetic field rotation direction. At this time, while the imaginary magnets VM rotate to the positions shown FIG. 6(a), inversely to the above, since the first magnetic force lines G1 decrease in the degree of bend thereof but increase in the total magnetic flux amount thereof, the magnetic forces acting on the first cores 23a increase to increase the driving forces acing on the first cores 23a. On the other hand, since the second magnetic force lines G2 increase in the degree of bend thereof but decrease in the total magnetic flux amount thereof, the magnetic forces acting on the second cores 23b decrease to reduce the driving force acing on the second core 23b.

Figure 9:
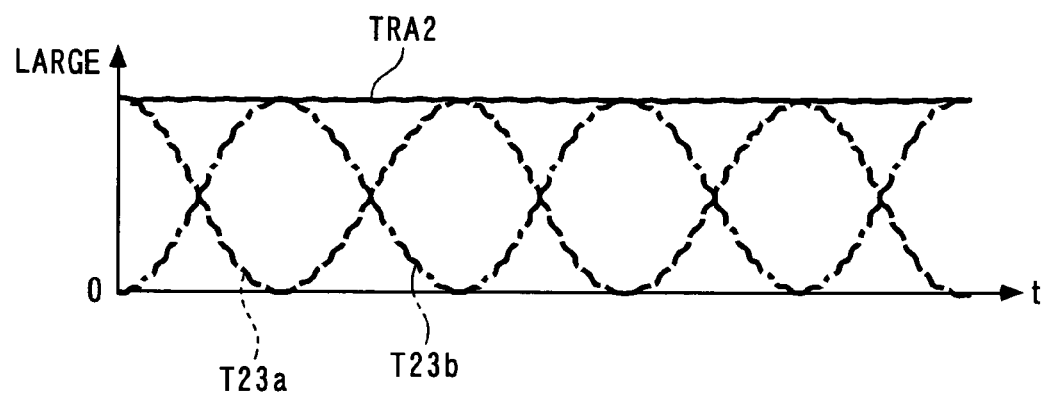
FIG. 9 A schematic diagram illustrating torque transmitted to an A2 rotor when the first and second rotating magnetic fields are generated while holding the A1 rotor unrotatable.

As described above, the A2 rotor 23 rotates in the magnetic field rotation direction, while the driving forces acting on the respective first and second cores 23a and 23b repeatedly increase and decrease by turns in accordance with the rotations of the imaginary magnets VM, that is, the rotations of the first and second rotating magnetic fields. In this case, assuming that the torques transmitted via the first and second cores 23a and 23b are denoted by T23a and T23b, the relationship between a torque TRA2 transmitted to the A2 rotor 23 (hereinafter referred to as "the A2 rotor transmitting torque") and the two torques T23a and T23b is approximately as shown in FIG. 9. As shown in the figure, the two torques T23a and T23b change approximately sinusoidally at the same repetition period, and phases thereof are displaced from each other by a half period. Further, since the A2 rotor 23 has the first and second cores 23a and 23b connected thereto, the A2 rotor transmitting torque TRA2 is equal to the sum of the two torques T23a and T23b that change as described above, and becomes approximately constant.

The first core 23a is positioned at an intermediate location between the first magnetic pole and the first armature magnetic pole connected by the first magnetic force line G1, by the action of the magnetic forces caused by the first and second magnetic force lines G1 and G2, and at the same time the A2 rotor 23 rotates while keeping the position of the second core 23b at an intermediate location between the second magnetic pole and the second armature magnetic pole connected by the second magnetic force line G2. Therefore, in general, between a first rotational speed VMF1 of the first and second rotating magnetic fields (hereinafter referred to as "the first magnetic field rotational speed"), a rotational speed VRA1 of the A1 rotor 21 (hereinafter referred to as "the A1 rotor rotational speed"), and a rotational speed VRA2 of the A2 rotor 23 (hereinafter referred to as "the A2 rotor rotational speed"), there holds the following equation (1):

$$VRA2=(VMF1+VRA1)/2 \tag{1}$$

By changing the equation (1), there is obtained the following equation:

$$VMF1-VRA2=VRA2-VRA1 \tag{1'}$$

As is clear from these equations (1) and (1'), the A2 rotor rotational speed VRA2 is equal to the average speed of the first magnetic field rotational speed VMF1 and the A1 rotor rotational speed VRA1. In other words, the difference between the first magnetic field rotational speed VMF1 and the A2 rotor rotational speed VRA2 is equal to the difference between the A2 rotor rotational speed VRA2 and the A1 rotor rotational speed VRA1.

Therefore, when the aforementioned A1 rotor rotational speed VRA1 is equal to a value of 0, VRA2=VMF1/2 holds, and the relationship between the first magnetic rotational speed VMF1, and the A1 and A2 rotor rotational speeds VRA1 and VRA2 can be expressed as shown in FIG. 10(a).

Further, in this case, the A2 rotor rotational speed VRA2 is reduced to ½ of the first magnetic field rotational speed VMF1, and hence, assuming that torque equivalent to the power supplied to the first stator 22 and the first magnetic field rotational speed VMF1 is a first driving equivalent torque TSE1, the A2 rotor transmitting torque TRA2 becomes a twofold of the first driving equivalent torque TSE1. In short, there holds the following equation (2):

$$TRA2=TSE1\times 2 \tag{2}$$

As described above, when the electric power is supplied to the first stator 22 in a state in which the A1 rotor 21 is made unrotatable, all the electric power is transmitted to the A2 rotor 23 as power.

Next, a description will be given of an operation in the case where the first and second rotating magnetic fields are generated by the power supplied to the first stator 22, with the A2 rotor 23 made unrotatable.

Figure 11:
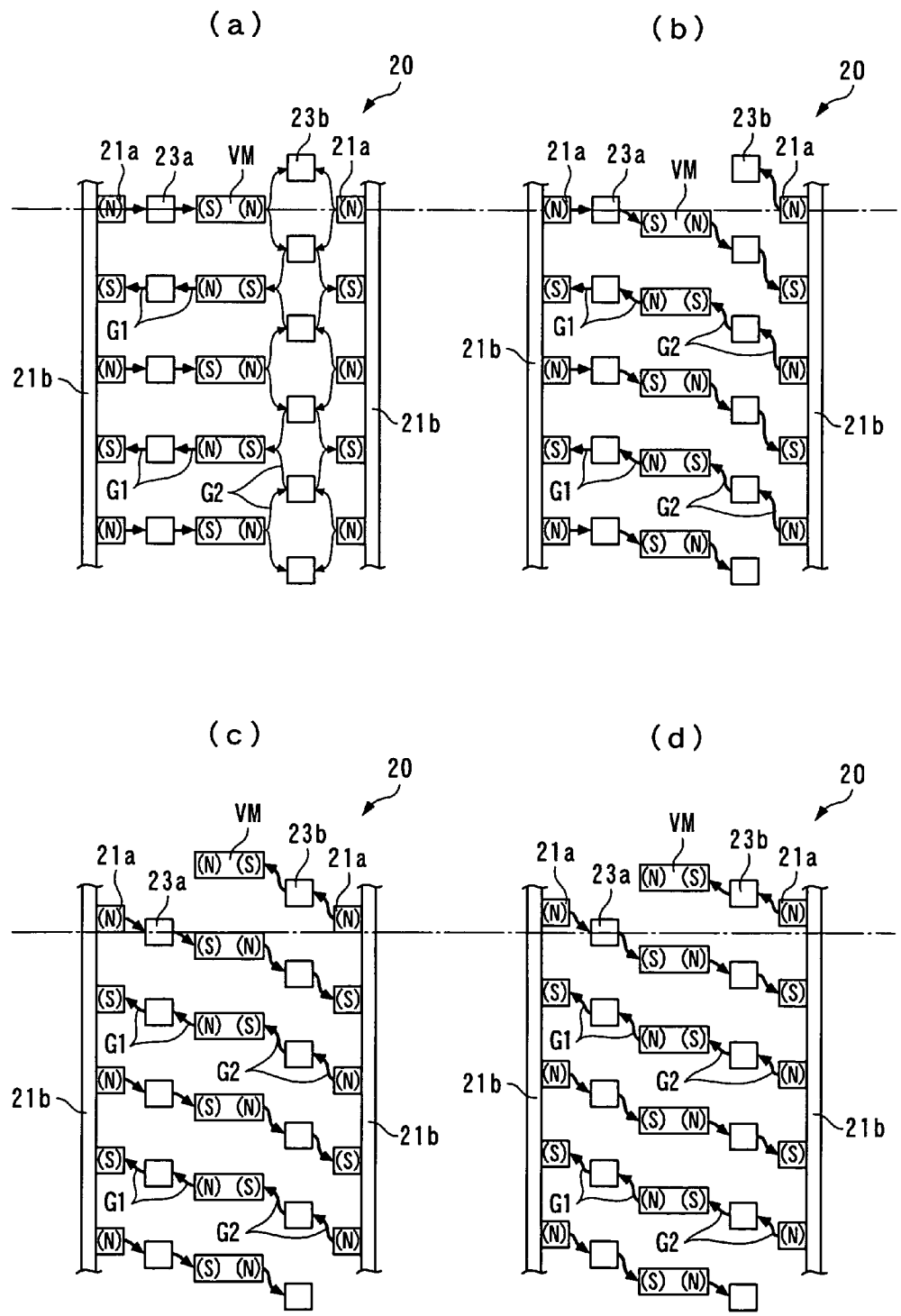
FIG. 11 Diagrams which are useful in explaining the operation of the first generator-motor performed when the first and second rotating magnetic fields are generated while holding the A2 rotor unrotatable.

In this case as well, as shown in FIG. 11(a), the first and second rotating magnetic fields are generated in a manner rotated downward, as viewed in the figure, from a state in which each first core 23a is opposed to each first magnet portion, and each second core 23b is in a position between each adjacent two of the second magnet portions. At the start of the generation of the first and second rotating magnetic fields, the polarity of each first armature magnetic pole is made different from the polarity of an opposed one of the first magnetic poles, and the polarity of each second armature magnetic pole is made the same as the polarity of an opposed one of the second magnetic poles. In this state, magnetic circuits as shown in FIG. 8(a) are formed.

Then, when the imaginary magnet VM rotates from the position shown in FIG. 11(a) to the position shown in FIG. 11(b), the first magnetic force line G1 between the first core 23a and the first armature magnetic pole is bent, and accordingly, the second armature magnetic pole becomes closer to the second core 23b, whereby the second magnetic force line G2 connecting between the second armature magnetic pole, the second core 23b, and the second magnetic pole is generated. As a consequence, the magnetic circuit as shown in FIG. 8(b) is formed.

In this state, although the total magnetic flux amounts of the first magnetic force lines G1 between the first magnetic poles and the first cores 23a are large, the first magnetic force lines G1 are straight, and hence no magnetic forces are generated which cause the first magnet portions to rotate with respect to the first cores 23a. Further, although the distance between second magnetic poles and the second armature magnetic poles having a polarity different from that of the second magnetic poles is relatively large, to make the total magnetic flux amounts of the second magnetic force lines G2 between the second cores 23b and the second magnetic poles relatively small, the degree of bend of the second magnetic force lines G2 is large, whereby magnetic forces that make the second magnet portions closer to the second cores 23b act on the second magnet portions. This causes the permanent magnets 21a to be driven in the direction of rotation of the imaginary magnets VM, that is, in a direction (upward, as viewed in FIG. 11) opposite to the direction of rotations of the magnetic field rotation direction, and be rotated toward positions shown in FIG. 11(c). In accordance with this, the A1 rotor 21 rotates in a direction opposite to the magnetic field rotation direction.

While the permanent magnets 21a rotate from the positions shown in FIG. 11(b) toward the positions shown in FIG. 11(c), the imaginary magnets VM rotate toward positions shown in FIG. 11(d). As described above, although the second magnet portions become closer to the second cores 23b to make the degree of bend of the second magnetic force lines G2 between the second cores 23b and the second magnetic poles smaller, the imaginary magnets VM become further closer to the second cores 23b, which increases the total magnetic flux amounts of the second magnetic force lines G2. As a result, in this case as well, the magnetic forces that make the second magnet portions closer to the second cores 23b act on the second magnet portions, whereby the permanent magnets 21a are driven in the direction opposite to the magnetic field rotation direction.

Further, as the permanent magnets 21a rotate in the direction opposite to the magnetic field rotation direction, the first magnetic force lines G1 between the first magnetic poles and the first cores 23a are bent, whereby magnetic forces that make the first magnet portions closer to the first cores 23a act on the first magnet portions. In this state, however, a magnetic force caused by the first magnetic force line G1 is smaller than the aforementioned magnetic force caused by the second magnetic force line G2, since the degree of bend of the first magnetic force line G1 is smaller than that of the second magnetic force line G2. As a result, a magnetic force corresponding to the difference between the two magnetic forces drives the permanent magnet 21a in the direction opposite to the magnetic field rotation direction.

Referring to FIG. 11(d), when the distance between the first magnetic pole and the first core 23a, and the distance between the second core 23b and the second magnetic pole have become approximately equal to each other, the total magnetic flux amount and the degree of bend of the first magnetic force line G1 between the first magnetic pole and the first core 23a become approximately equal to the total magnetic flux amount and the degree of bend of the second magnetic force line G2 between the second core 23b and the second magnetic pole, respectively. As a result, the magnetic forces caused by the first and second magnetic force lines G1 and G2 are approximately balanced, whereby the permanent magnet 21a is temporarily placed in an undriven state.

Figure 12:
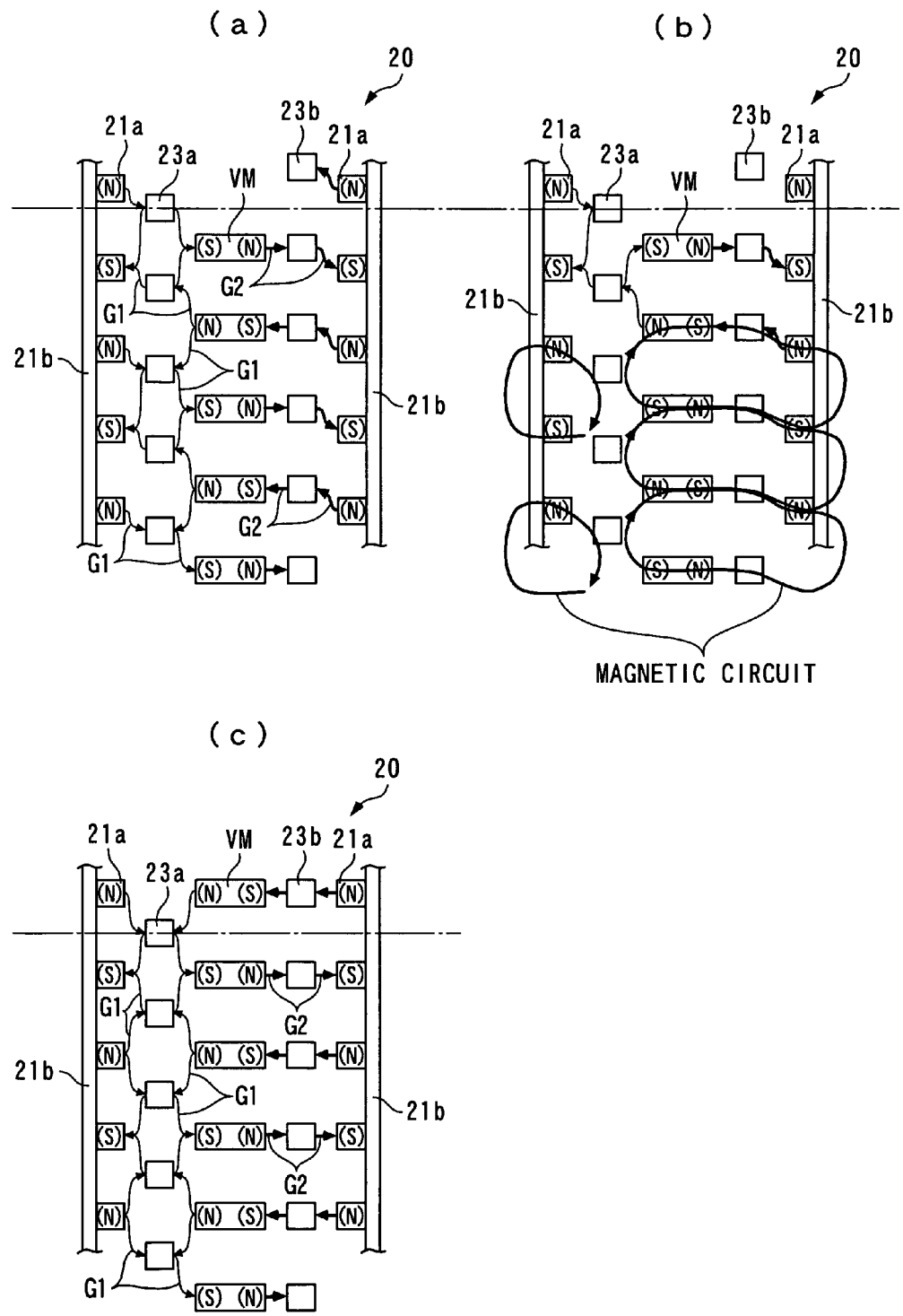
FIG. 12 Diagrams which are useful in explaining a continuation of the operation in FIG. 11.

From this state, when the imaginary magnets VM rotate to positions shown in FIG. 12(a), the state of generation of the first magnetic force lines G1 is changed to form magnetic circuits as shown in FIG. 12(b). Accordingly, the magnetic forces caused by the first magnetic force lines G1 almost cease to act on the first magnet portions such that the magnetic forces make the first magnet portions closer to the first cores 23a, and therefore the permanent magnets 21a are driven by the magnetic forces caused by the second magnetic force lines G2, to positions shown in FIG. 12(c), in the direction opposite to the magnetic field rotation direction.

Then, when the imaginary magnets VM slightly rotate from the positions shown in FIG. 12(c), inversely to the above, the magnetic forces caused by the first magnetic force lines G1 between the first magnetic poles and the first cores 23a act on the first magnet portions such that the magnetic forces make the first magnet portions closer to the first cores 23a, whereby the permanent magnets 21a are driven in the direction opposite to the magnetic field rotation direction, to rotate the A1 rotor 21 in the direction opposite to the magnetic field rotation direction. Then, when the imaginary magnets VM further rotate, the permanent magnets 21a are driven in the direction opposite to the magnetic field rotation direction, by respective magnetic forces corresponding to the differences between the magnetic forces caused by the first magnetic force lines G1 between the first magnetic poles and the first cores 23a, and the magnetic forces caused by the second magnetic force lines G2 between the second cores 23b and the second magnetic poles. After that, when the magnetic forces caused by the second magnetic force lines G2 almost ceases to act on the second magnet portions such that the magnetic force makes the second magnet portions closer to the second cores 23b, the permanent magnets 21a are driven by the magnetic forces caused by the first magnetic force lines G1 in the direction opposite to the magnetic field rotation direction.

As described hereinabove, in accordance with the rotations of the first and second rotating magnetic fields, the magnetic forces caused by the first magnetic force lines G1 between the first magnetic poles and the first cores 23a, the magnetic forces caused by the second magnetic force lines G2 between the second cores 23b and the second magnetic poles, and the magnetic forces corresponding to the differences between the above magnetic forces alternately act on the permanent magnets 21a, i.e. on the A1 rotor 21, whereby the A1 rotor 21 is rotated in the direction opposite to the magnetic field rotation direction. Further, the magnetic forces, that is, the driving forces thus act on the A1 rotor 21 alternately, whereby a torque TRA1 transmitted to the A1 rotor 21 (hereinafter referred to as "the A1 rotor transmitting torque") is made approximately constant.

Further, the relationship between the first magnetic field rotational speed VMF1 at this time and the rotational speeds VRA1 and VRA2 of the A1 and A2 rotors can be expressed as VRA1=–VMF1 by setting VRA2=0 in the aforementioned equation (1), and is shown as in FIG. 10(*b*). Thus, the A1 rotor 21 rotates in the reverse direction at the same speed as that of the first and second rotating magnetic fields. Further, in this case, the A1 rotor transmitting torque TRA1 becomes equal to the first driving equivalent torque TSE1, and there holds the following equation (3):

$$TRA1 = TSE1 \quad (3)$$

Further, if none of the first magnetic field rotational speed VMF1 and the A1 and A2 rotor rotational speeds VRA1 and VRA2 are equal to 0, e.g. if the first and second rotating magnetic fields are generated in a state in which the A1 and/or A2 rotors 21 and 23 are caused to rotate by inputting power thereto, the aforementioned general formula (I) holds between the first magnetic field rotational speed VMF1 and the A1 and A2 rotor rotational speeds VRA1 and VRA2 as it is and the speed relationship between the three is expressed as shown in FIG. 10(*c*).

Further, if the A2 rotor 23 is rotated by input of power, and the first magnetic field rotational speed VMF1 is controlled to 0, the power (energy) input to the A2 rotor 23 is not transmitted to the first stator 22, but is all transmitted to the A1 rotor 21 via the magnetic forces caused by the first and second magnetic force lines G1 and G2. Similarly, by causing the A1 rotor 21 to rotate by input of power, and the first magnetic field rotational speed VMF1 is controlled to 0, the power (energy) input to the A1 rotor 21 is not transmitted to the first stator 22 but is all transmitted to the A2 rotor 23 via the magnetic forces caused by the first and second magnetic force lines G1 and G2.

Further, the relationship between the first magnetic field rotational speed VMF1 and the A1 and A2 rotor rotational speeds VRA1 and VRA2 is expressed as VRA1=VRA2×2 by setting VMF1=0 in the aforementioned equation (1), and is expressed as shown in FIG. 10(*d*). Further, the relationship between the A1 and A2 rotor transmitting torques TRA1 and TRA2 satisfies the following equation (4):

$$TRA1 = TRA2/2 \quad (4)$$

Further, in the first generator-motor 20, even in the case of electric power being not supplied to the first stator 22, induced electric motive force is generated in the armatures 22*a* to generate electric power, if with respect to the armatures 22*a*, the permanent magnets 21*a* are rotated by input of power to the A1 rotor 21 or the first and second cores 23*a* and 23*b* are rotated by input of power to the A2 rotor 23. If the first and second magnetic rotating fields are generated along with this electric power generation, the aforementioned equation (1) holds.

Further, between the first magnetic field rotational speed VMF1 and the A1 and A2 rotor rotational speeds VRA1 and VRA2, the relationship as expressed by the aforementioned equations (1) and (1') and FIGS. 10(*a*) to 10(*d*) is always satisfied, and the speed relationship between the three corresponds to the speed relationship between one and the other of the ring gear and sun gear of the planetary gear unit, and the carrier supporting the planetary gears. Further, such a speed relationship is obtained not only during the supply of electric power to the first stator 22, but also during the generation of electric power, and hence the first generator-motor 20 can be regarded as a planetary gear unit which inputs and outputs torque by the A1 and A2 rotors 21 and 23 and inputs and outputs electric power by the first stator 22.

Further, if power is supplied to the A1 rotor 21 and at the same time electric power is supplied to the first stator 22, when the directions of the rotations of the A1 rotor 21, the A2 rotor 23, and the first and second rotating magnetic fields are identical to each other, the first driving equivalent torque TSE1 output from the first stator 22 and the A1 rotor transmitting torque TRA1 input to the A1 rotor 21 are combined by the first and second magnetic force lines G1 and G2, that is, magnetic circuits, and transmitted to the A2 rotor 23 as the A2 rotor transmitting torque TRA2. That is, the relationship between the first driving equivalent torque TSE1 and the A1 and A2 rotor transmitting torques TRA1 and TRA2 satisfies the following equation (5):

$$TRA2 = TSE1 + TRA1 \quad (5)$$

However, in this case, as shown in the aforementioned equation (1'), the difference between the first magnetic field rotational speed VMF1 and the A2 rotor rotational speed VRA2 and the difference between the A2 rotor rotational speed VRA2 and the A1 rotor rotational speed VRA1 are equal to each other, and hence the torque combining ratio between the first driving equivalent torque TSE1 and the A1 rotor transmitting torque TRA1 is 1:1. Therefore, the energy combining ratio (between power and electric power) is equal to the ratio between the A1 rotor rotational speed VRA1 and the first magnetic field rotational speed VMF1.

Further, if power is input to the A2 rotor 23 and at the same time, the electric power generation is performed by the first stator 22 using the power, when the directions of the rotations of the A1 rotor 21, the A2 rotor 23, and the first and second rotating magnetic fields are identical to each other, assuming that torque equivalent to the electric power generated by the first stator 22 and the first magnetic field rotational speed VMF1 is first power-generating equivalent torque TGE1, the relationship between the first power-generating equivalent torque TGE1 and the A1 and A2 rotor transmitting torques TRA1 and TRA2 satisfy the following equation (6):

$$TRA2 = TGE1 + TRA1 \quad (6)$$

In this case, as is clear from the equation (6), the A2 rotor transmitting torque TRA2 is divided by the first and second magnetic force lines G1 and G2, that is, the magnetic circuits and is output as the first power-generating equivalent torque TGE1 and the A1 rotor transmitting torque TRA1. Further, as shown in the aforementioned equation (1'), the difference between the first magnetic field rotational speed VMF1 and the A2 rotor rotational speed VRA2 and the difference between the A2 rotor rotational speed VRA2 and the A1 rotor rotational speed VRA1 are equal to each other, and hence the torque distribution ratio in this case is 1:1. Accordingly, the energy distribution ratio (between power and electric power) is equal to the ratio between the A1 rotor rotational speed VRA1 and the first magnetic field rotational speed VMF1.

Through the control of the 1st•PDU 41, the ECU 2 controls the electric power supplied to the first stator 22 and the first magnetic field rotational speed VMF1 of the first and second rotating magnetic fields generated by the supply of electric power. Further, through the control of the 1st•PDU 41, the ECU 2 controls the electric power generated by the first stator 22 and the first magnetic field rotational speed VMF1 of the first and second rotating magnetic fields generated by the electric power generation.

The second generator-motor 30 is comprised of a B1 rotor 31 (third rotor), a second stator 32 disposed in a manner opposed to the B1 rotor 31, and a B2 rotor 33 (fourth rotor) disposed between the two 31 and 32 at predetermined spaced intervals. The torque capacity of the second generator-motor 30 is set to approximately the same magnitude as that of the maximum torque of the engine 3. The second stator 32 and the B1 and B2 rotors 31 and 33 are configured similarly to the first stator 22 and the A1 and A2 rotors 21 and 23 of the aforementioned first generator-motor 20, respectively, and hence detailed descriptions thereof is omitted. Further, the second stator 32 is electrically connected to the battery 43 and the ECU 2 via the 2nd•PDU 42. Similarly to the 1st•PDU 41, the 2nd•PDU 42 is formed by an electric circuit, such as an inverter, and is electrically connected to the 1st•PDU 41.

Furthermore, the second generator-motor 30 has the same function as that of the first generator-motor 20 and can be regarded as a planetary gear unit which inputs and outputs torque by the B1 and B2 rotors 31 and 33 and inputs and outputs electric power by the second stator 32. Further, assuming that the rotational speed of the first and second rotating magnetic fields generated by the second stator 32 is a second magnetic field rotational speed VMF2, and the rotational speeds of the B1 and B2 rotors 31 and 33 are the B1 and B2 rotor rotational speeds VRB1 and VRB2, respectively, the relationship as expressed by the aforementioned equations (1), (1'), and FIGS. 10(a) to 10(d) always holds between the rotational speeds VMF2, VRB1 and VRB2, both during the supply of electric power to the second stator 32 and during the generation of electric power. Therefore, there hold the following equations (7) and (7'):

$$VRB2 = (VMF2 + VRB1)/2 \quad (7)$$

$$VMF2 \cdot VRB2 = VRB2 - VRB1 \quad (7')$$

Further, let it be assumed that torques transmitted to the B1 and B2 rotors 31 and 33 are the B1 and B2 rotor transmitting torques TRB1 and TRB2, respectively, torque equivalent to the electric power supplied to the second stator 32 and the second magnetic field rotational speed VMF2 is second driving equivalent torque TSE2, and torque equivalent to the electric power generated by the second stator 32 and the second magnetic field rotational speed VMF2 is second power-generating equivalent torque TGE2. In this case, the relationship as expressed by the aforementioned equations (2) to (6) always holds between the torques TRB1, TRB2, TSE2 and TGE2, and therefore, there hold the following equations (8) to (12):

$$TRB2 = TSE2 \times 2 \text{ (provided } VRB1 = 0, VRB2 = VMF2/2) \quad (8)$$

$$TRB1 = TSE2 \text{ (provided } VRB2 = 0, VRB1 = -VMF2) \quad (9)$$

$$TRB1 = TRB2/2 \text{ (provided } VMF2 = 0, VRB1 = VRB2 \times 2) \quad (10)$$

$$TRB2 = TSE2 + TRB1 \text{ (provided } TSE2 = TRB1, VRB2 = (VMF2 + VRB1)/2) \quad (11)$$

$$TRB2 = TGE2 + TRB1 \text{ (provided } TGE2 = TRB1, VRB2 = (VMF2 + VRB1)/2) \quad (12)$$

Furthermore, as shown in FIG. 1, the B1 rotor 31 is connected to the first main shaft 4, and the B2 rotor 33 is connected to the connection shaft 6 and the second main shaft 7. With the above arrangement, the crankshaft 3a of the engine 3, the A2 rotor 23 of the first generator-motor 20 and the B rotor 31 of the second generator-motor 30 are mechanically connected to each other via the first main shaft 4. Further, the A1 rotor 21 of the first generator-motor 20 and the B2 rotor 33 of the second generator-motor 30 are mechanically connected to each other via the connection shaft 6, and the B2 rotor 33 and the drive wheels DW and DW are mechanically connected to each other via the second main shaft 7 and so forth. That is, the A1 rotor 21 and the B2 rotor 33 are mechanically connected to the drive wheels DW and DW.

Through the control of the 2nd•PDU 42, the ECU 2 controls the electric power supplied to the second stator 32 and the second magnetic field rotational speed VMF2 of the first and second rotating magnetic fields generated by the second stator 32 in accordance with the supply of electric power. Further, through the control of the 2nd•PDU 42, the ECU 2 controls the electric power generated by the second stator 32 and the second magnetic field rotational speed VMF2 of the first and second rotating magnetic fields generated by the second stator 32 in accordance with the electric power generation.

Further, as shown in FIG. 2, a crank angle sensor 51 outputs a detection signal indicative of the crank angle position of the crankshaft 3a to the ECU 2. The ECU 2 calculates the engine speed NE based on the crank angle position. Furthermore, an A1 rotational angle sensor 52 and an A2 rotational angle sensor 53 deliver detection signals indicative of the rotational angle positions of the respective A1 and A2 rotors 21 and 23 to the ECU 2. The ECU 2 calculates the A1 and A2 rotor rotational speeds VRA1 and VRA2 based on the detected rotational angle positions of the A1 and A2 rotors 21 and 23.

Further, a B1 rotational angle sensor 54 and a B2 rotational angle sensor 55 deliver signals indicative of the rotational angle positions of the respective B1 and B2 rotors 31 and 33 to the ECU 2. The ECU 2 calculates the B1 and B2 rotor rotational speeds VRB1 and VRB2 based on the detected rotational angle positions of the B1 and B2 rotors 31 and 33. Furthermore, a current-voltage sensor 56 outputs detection signals indicative of current and voltage values input to and output from the battery 43 to the ECU 2. The ECU 2 calculates a remaining capacity SOC of the battery 43 based on the detection signals.

Further, an accelerator pedal opening sensor 57 delivers a detection signal indicative of an accelerator pedal opening AP as a stepped-on amount of an accelerator pedal (not shown) of the vehicle to the ECU 2. A vehicle speed sensor 58 delivers a detection signal indicative of a vehicle speed VP to the ECU 2.

The ECU 2 is implemented by a microcomputer comprised of an I/O interface, a CPU, a RAM and a ROM, and controls the operations of the engine 3 and the first and second generator-motors 20 and 30 based on the detection signals from the aforementioned sensors 51 to 58.

Next, the control by the ECU 2 at the start or during traveling of the vehicle will be described. First, a description will be given of the control during the creep operation and the standing start of the vehicle. It should be noted that the direction of rotation of the crankshaft 3a is the same as the direction of normal rotation of the drive wheels DW and DW, and hereinafter rotation in the same direction as the direction of rotation of the crankshaft 3a is referred to as "normal rotation", while rotation in a direction opposite to the direction of rotation of the crankshaft 3a is referred to as "reverse rotation". During the creep operation, basically, the engine 3 is stopped and only the second generator-motor 30 is used as a power source of the vehicle. More specifically, electric power is supplied from the battery 43 to the second stator 32 of the second generator-motor 30, whereby the first and second rotating magnetic fields generated in the second stator 32 are caused to perform normal rotation. Further, by using power transmitted to the A1 rotor 21 of the first generator-motor 20, as described hereinafter, electric power generation is performed by the first stator 22 to supply the generated electric power to the second stator 32.

Figure 13:
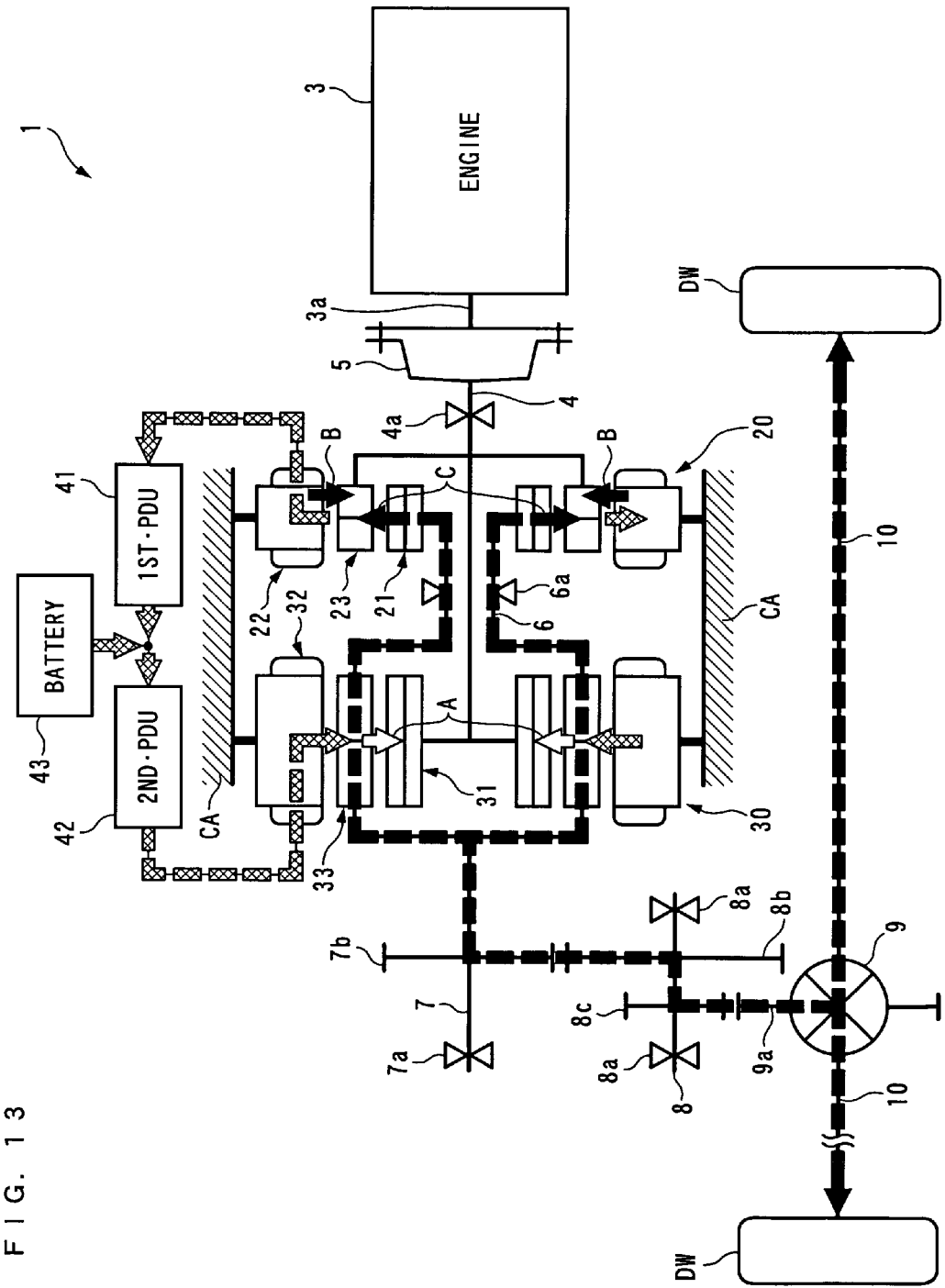
FIG. 13 A diagram showing how torque is transmitted in the power plant during an EV creep operation of a vehicle.
Figure 14:
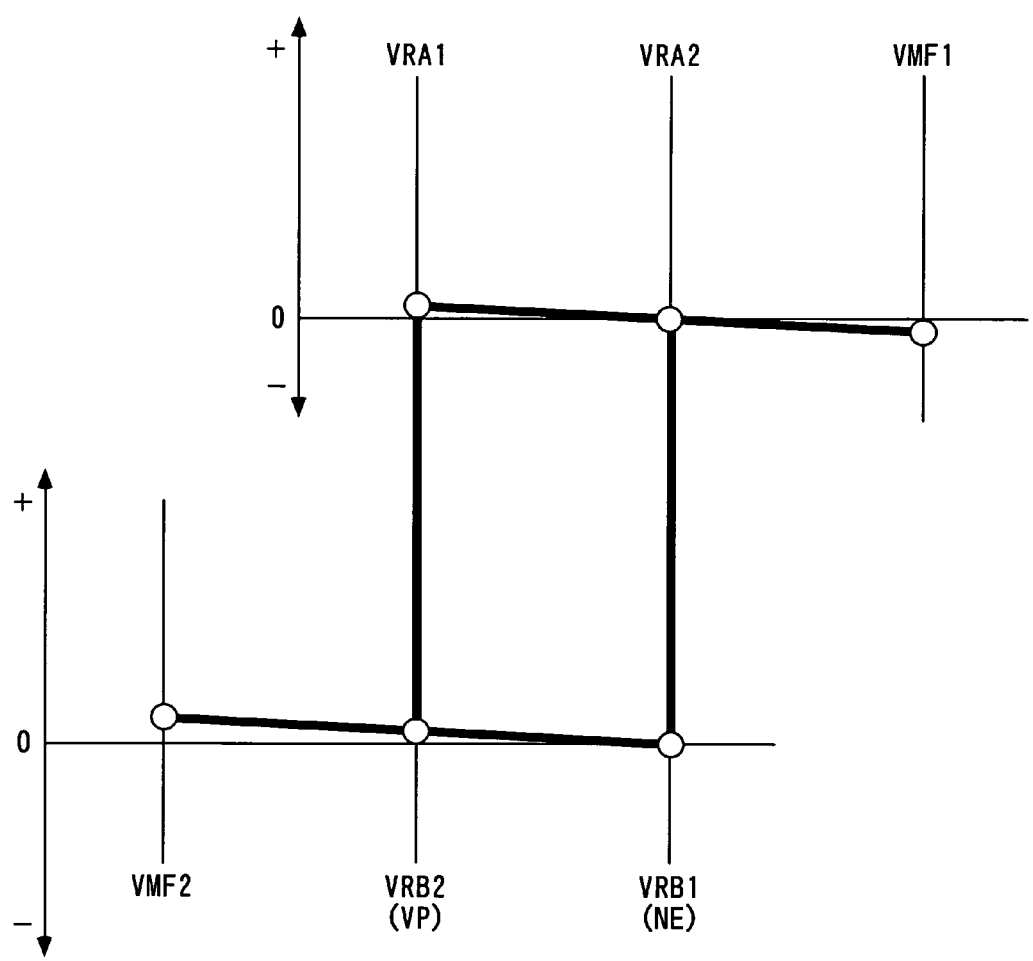
FIG. 14 A speed diagram representing the relationship between the first and second magnetic field rotational speeds VMF1 and VMF2, and the A1, A2, B1 and B2 rotor rotational speeds VRA1, VRA2, VRB1 and VRB2 during EV creep operation.

FIG. 13 shows how torque is transmitted during the above-described creep operation of the vehicle, and FIG. 14 shows a speed diagram representing the relationship between the first and second magnetic field rotational speeds VMF1 and VMF2 and so forth during the creep operation. Hereinafter, such a creep operation using only the first and second generator-motors 20 and 30 is referred to as "the EV creep operation". Further, in FIG. 13 and other figures, referred to hereinafter, which show states of transmission of torque, thick broken lines with arrows indicate flows of torque, and black-filled arrows and hollow arrows show torques acting in the direction of normal rotation and in the direction of reverse rotation, respectively. Further, although in the first and second stators 22 and 32, actually, torque is transmitted in the form of electric energy, in FIG. 13 and other figures, referred to hereinafter, showing the states of transmission of torque, the input and output of energy to and from the first and second stators 22 and 32 are indicated by flows of torque which are hatched, for convenience. Furthermore, in FIG. 14 and other speed diagrams, referred to hereinafter, it is assumed that the direction of normal rotation is indicated by "+", and the direction of reverse rotation is indicated by "−".

As shown in FIG. 13, during the EV creep operation, as electric power is supplied to the second stator 32, torque that acts on the B2 rotor 33 so as to cause the B2 rotor 33 to perform normal rotation is transmitted from the second stator 32 to the B2 rotor 33, and as indicated by arrows A, torque that acts on the B1 rotor 31 so as to cause the B1 rotor 31 to perform reverse rotation is transmitted to the B1 rotor 31. Further, part of the torque transmitted to the B2 rotor 33 is transmitted to the drive wheels DW and DW via the second main shaft 7, the differential gear mechanism 9, and so forth, whereby the drive wheels DW and DW perform normal rotation.

Furthermore, during the EV creep operation, the remainder of the torque transmitted to the B2 rotor 33 is transmitted to the A1 rotor 21 via the connection shaft 6, and then is transmitted to the first stator 22 as the first power-generating equivalent torque TGE1 along with the electric power generation by the first stator 22. Further, as shown in FIG. 14, the first and second rotating magnetic fields generated by the electric power generation in the first stator 22 perform reverse rotation. AS a result, as indicated by arrows B in FIG. 13, along with the electric power generation by the first stator 22, torque dependent on the amount of generated electric power is transmitted from the first stator 22 to the A2 rotor 23. This torque acts on the A2 rotor 23 to cause the A2 rotor 23 to perform normal rotation. Further, the torque transmitted to the A1 rotor 21 is further transmitted to the A2 rotor 23 (as indicated by arrows C) such that it is balanced with the torque transmitted from the first stator 22 to the A2 rotor 23, and these torques are combined at the torque combining ratio of 1:1.

In this case, the electric power supplied to the second stator 32 and the electric power generated by the first stator 22 are controlled such that the above-mentioned torque indicated by the arrows A, for causing the B1 rotor 31 to perform reverse rotation, and the torques indicated by the arrows B and C, for causing the A2 rotor 23 to perform normal rotation are balanced with each other, whereby the A2 rotor 23, the B1 rotor 31 and the crankshaft 3a are held at rest. As a consequence, as shown in FIG. 14, during the EV creep operation, the A2 and B1 rotor rotational speeds VRA2 and VRB1 become equal to 0, and the engine speed NE as well become equal to 0.

Further, during the EV creep operation, the electric power supplied to the second stator 32, the electric power generated by the first stator 22 and the first and second magnetic field rotational speeds VMF1 and VMF2 are controlled such that the speed relationships expressed by the aforementioned equations (1) and (7) are maintained and at the same time, the A1 and B2 rotor rotational speeds VRA1 and VRB2 become very small (see FIG. 14). From the above, the creep operation with a very low vehicle speed VP is carried out. As described above, it is possible to perform the creep operation using the driving force of the second generator-motor 30 in a state in which the engine 3 is stopped.

Figure 15:
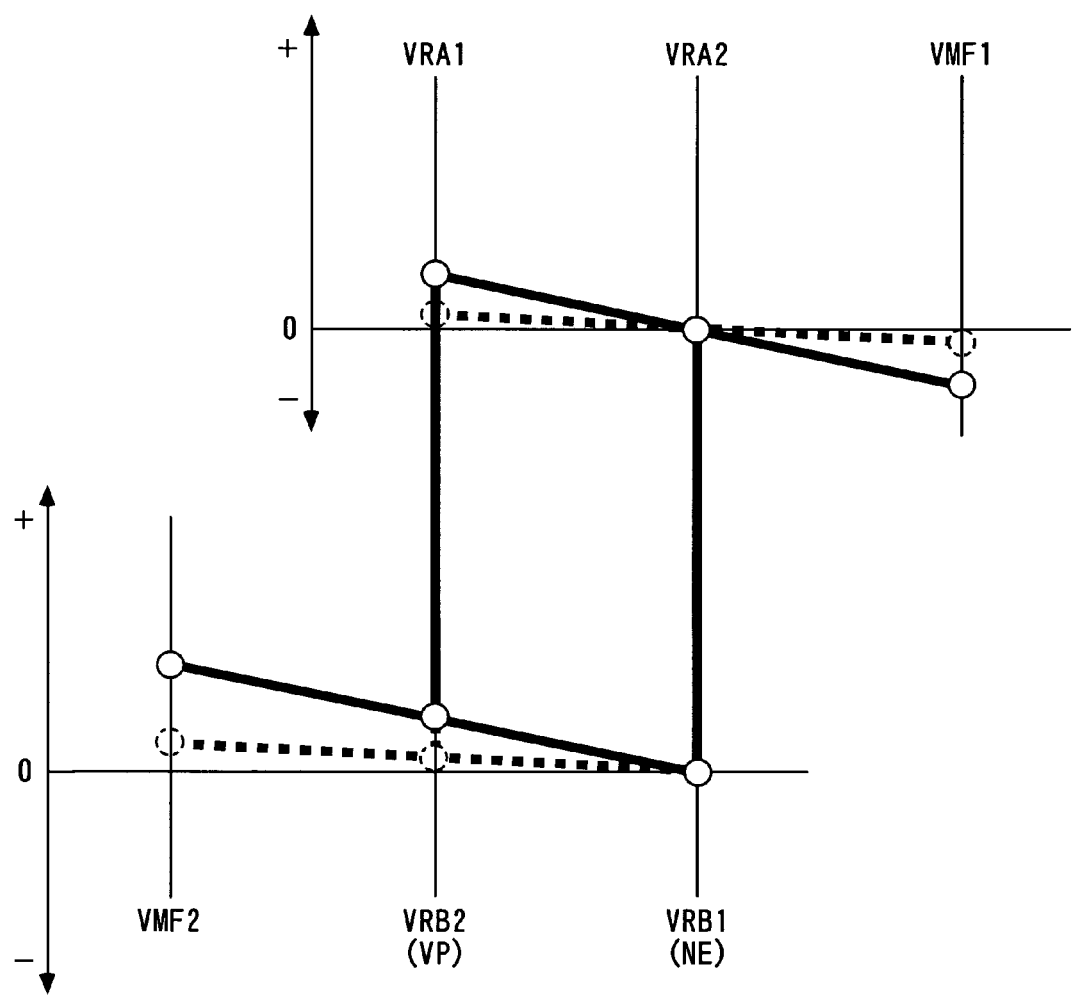
FIG. 15 A speed diagram representing the relationship between the first and second magnetic field rotational speeds VMF1 and VMF2, and the A1, A2, B1 and B2 rotor rotational speeds VRA1, VRA2, VRB1 and VRB2 during EV standing start.

The control at the standing start of the vehicle is carried out, subsequent to the above-described creep operation, as follows: The electric power supplied to the second stator 32 and the electric power generated by the first stator 22 are both increased. Further, while the relationships between the rotational speeds expressed by the aforementioned equations (1) and (7) are maintained and at the same time, the A2 and B1 rotor rotational speeds VRA2 and VRB1, that is, the engine speed NE is held at 0, the first magnetic field rotational speed VMF1 of the first and second rotating magnetic fields generated by the first stator 22 that has been performing reverse rotation during the EV creep operation, and the second magnetic field rotational speed VMF2 of the first and second rotating magnetic fields generated by the second stator 32 that has been performing normal rotation during the EV creep operation are increased in the same rotation directions as they have been. From the above, as indicated by thick solid lines in FIG. 15, the A1 and B2 rotor rotational speeds VRA1 and VRB2, that is, the vehicle speed VP is increased from the state of the EV creep operation, indicated by broken lines in FIG. 15, causing the vehicle to start. Hereinafter, such start and traveling of the vehicle, which are performed using only the first and second generator-motors 20 and 30 as power sources, will be referred to as "the EV standing start" and "the EV traveling", respectively.

Further, subsequent to the above-described EV standing start, the start of the engine 3 is performed as follows. Hereinafter, such start of the engine 3 is referred to as "the ENG start during EV traveling". While holding the A1 and B2 rotor rotational speeds VRA1 and VRB2, that is, the vehicle speed VP at the value assumed then, the first magnetic field rotational speed VMF1 of the first and second rotating magnetic fields generated by the first stator 22 that has been performing reverse rotation during the EV standing start, as described above, is controlled to 0, and the second magnetic field rotational speed VMF2 of the first and second rotating magnetic fields generated by the second stator 32 that has been performing normal rotation during the EV standing start, is controlled such that it is decreased. Then, after the first magnetic field rotational speed VMF1 becomes equal to 0, electric power is supplied from the battery 43 not only to the second stator 32 but also to the first stator 22, whereby the first and second rotating magnetic fields generated by the first stator 22 are caused to perform normal rotation, and the first magnetic field rotational speed VMF1 is caused to be increased.

Figure 16:
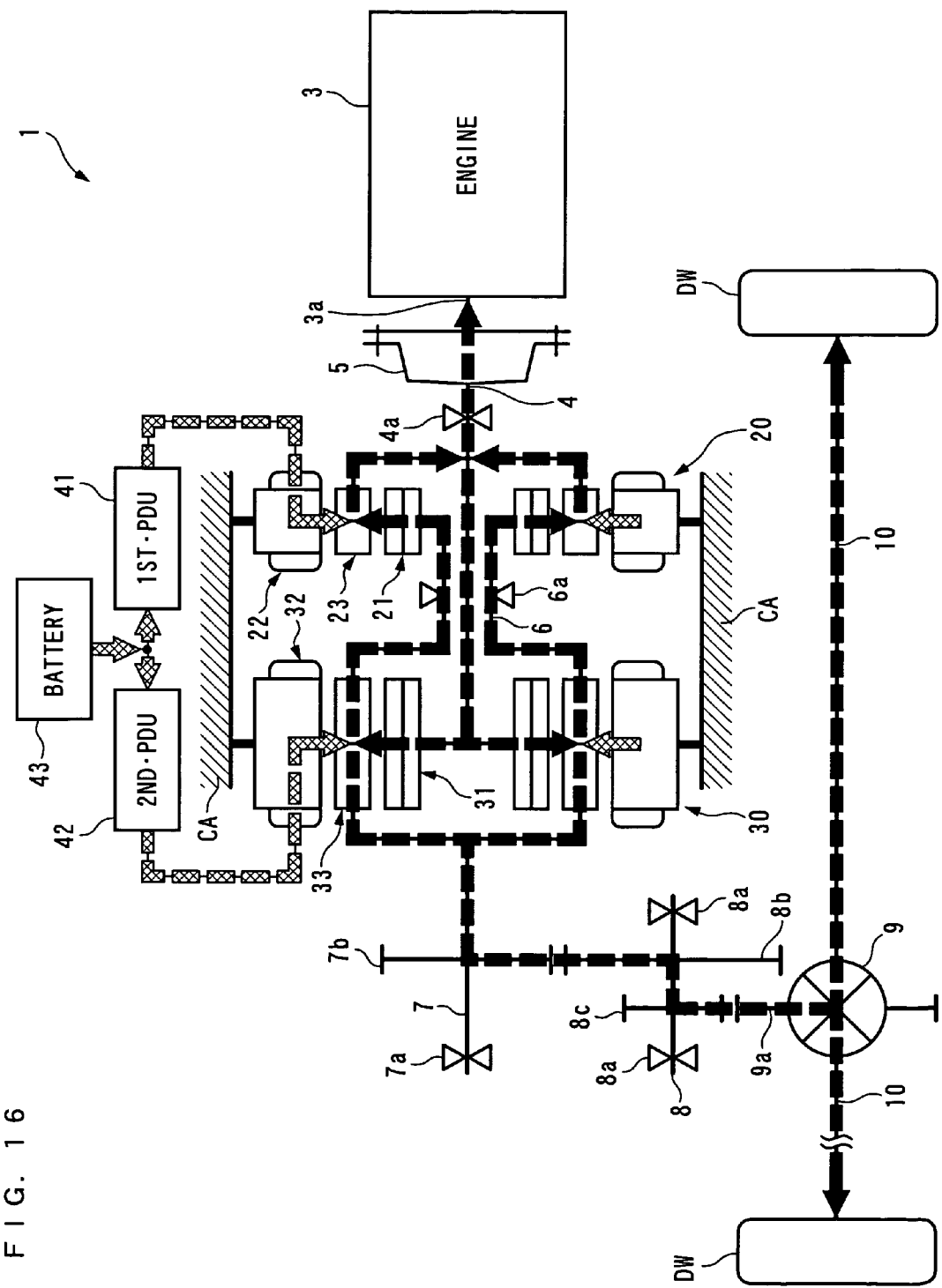
FIG. 16 A diagram showing how torque is transmitted in the power plant at the time of ENG start during EV traveling.

FIG. 16 shows how torque is transmitted in a state in which at the time of the ENG start during EV traveling, electric power has been supplied to the first and second stators 22 and 32, as described above. As described above using the aforementioned equation (1), when electric power is supplied to the second stator 32 in a state in which power is input to the B1 rotor 31, the second driving equivalent torque TSE2 and the B1 rotor transmitting torque TRB1 are combined at the torque combining ratio of 1:1, and transmitted to the B2 rotor 33 as the B2 rotor transmitting torque TRB2. Therefore, as shown in FIG. 16, as the supply of electric power to the second stator 32 as mentioned above causes the second driving equivalent torque TSE2 to be transmitted to the B2 rotor 33, torque transmitted to the B1 rotor 31, as will be described hereinafter, is transmitted to the B2 rotor 33. Further, part of the torque transmitted to the B2 rotor 33 is transmitted to the A1 rotor 21 via the connection shaft 6, and the rest thereof is transmitted to the drive wheels DW and DW e.g. via the second main shaft 7.

Furthermore, at the time of the ENG start during EV traveling, as described above using the aforementioned equation (5), when electric power is supplied to the first stator 22 in a state in which power is input to the A1 rotor 21, the first driving equivalent torque TSE1 and the A1 rotor transmitting torque TRA1 are combined at the torque combining ratio of 1:1, and transmitted to the A2 rotor 23 as the A2 rotor transmitting torque TRA2. Therefore, as shown in FIG. 16, electric power is supplied from the battery 43 to the first stator 22, whereby as the first driving equivalent torque TSE1 is transmitted to the A2 rotor 23, the torque transmitted to the A1 rotor 21 as described above is transmitted to the A2 rotor 23.

Further, at the time of the ENG start during EV traveling, part of the torque transmitted to the A2 rotor 23 is transmitted to the B1 rotor 31 via the first main shaft 4, and the rest thereof is transmitted to the crankshaft 3a via the first main shaft 4 and the flywheel 5, whereby the crankshaft 3a performs normal rotation. Furthermore, in this case, the electric power supplied to the first and second stators 22 and 23 is controlled such that sufficient power is transmitted to the drive wheels DW and DW and the engine 3.

From the above, as indicated by thick solid lines in FIG. 17, at the time of the ENG start during EV traveling, while the vehicle speed VP is held at the value assumed then, the A2 and B1 rotor rotational speeds VRA2 and VRB1 are increased from a state in which they are equal to 0, indicated by broken lines, and the rotational speed of the crankshaft 3a connected to the A2 and B1 rotors 23 and 31, that is, the engine speed NE is also increased. In this state, the ignition operation of fuel injection valves (not shown) and spark plugs (not shown) of the engine 3 is controlled according to the aforementioned crank angle position, whereby the engine 3 is started. Further, in this case, by controlling the first and second magnetic field rotational speeds VMF1 and VMF2, the engine speed NE is controlled to a relatively small value suitable for starting the engine 3.

Figure 18:
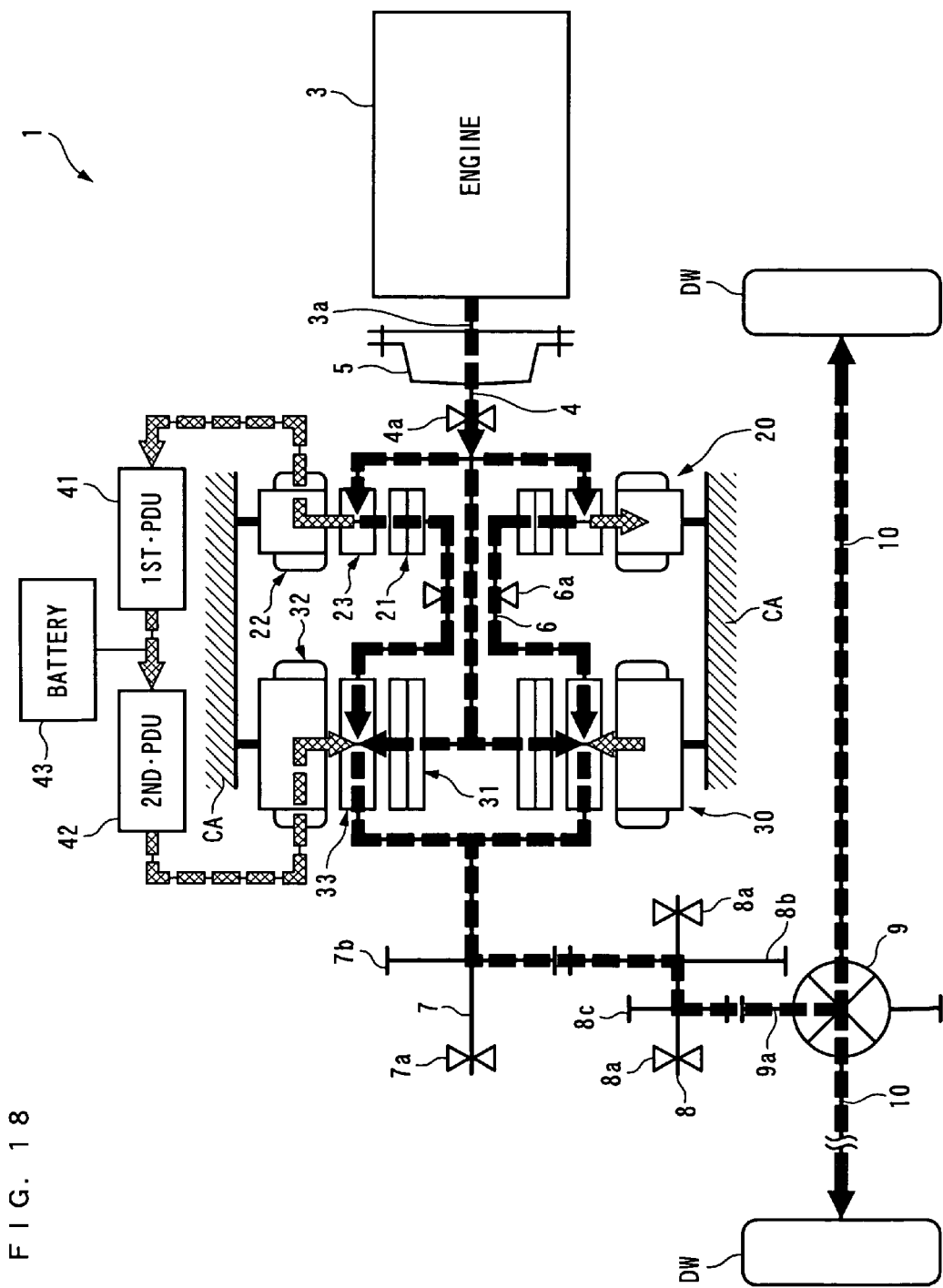
FIG. 18 A diagram showing how torque is transmitted in the power plant in a battery input/output zero mode.

Next, a description will be given of the control during traveling of the vehicle after the ENG start during EV traveling. During traveling of the vehicle, power WENG from the engine 3 (hereinafter referred to as "the engine power") is basically controlled such that the optimum fuel economy can be obtained within a range within which a demanded torque PMCMD can be generated. The demanded torque PMCMD is demanded by the vehicle and is calculated e.g. by searching a map (not shown) according the vehicle speed VP and the accelerator pedal opening AP. Further, by using the engine power WENG transmitted to the A2 rotor 23, electric power generation is performed by the first stator 22 to supply generated electric power to the second stator 32 without charging it into the battery 43. Hereinafter, this operation mode is referred to as "the battery input/output zero mode". FIG. 18 shows how torque is transmitted in the battery input/output zero mode.

As described hereinabove using the equation (6), during the generation of electric power using power input to the A2 rotor 23, the first generator-motor 20 divides the A2 rotor transmitting torque TRA2 at a torque distribution ratio of 1:1 and outputs the divided torque as the first power-generating equivalent torque TGE1 and the A1 rotor transmitting torque TRA1. Therefore, as shown in FIG. 18, in the battery input/output zero mode, as part of torque TENG of the engine 3 (hereinafter referred to as "the engine torque") is transmitted to the first stator 22 as the first power-generating equivalent torque TGE1 via the A2 rotor 23, engine torque TENG equal in magnitude to the first power-generating equivalent torque TGE1 is transmitted also to the A1 rotor 21 via the A2 rotor 23. That is, part of the engine torque TENG is transmitted to the A2 rotor 23, and the engine torque TENG transmitted to the A2 rotor 23 is distributed to the first stator 22 and the A1 rotor 21 at the torque distribution ratio of 1:1. Further, the remainder of the engine torque TENG is transmitted to the B1 rotor 31 via the first main shaft 4.

Further, similarly to the above-described case of the ENG start during EV traveling, the second driving equivalent torque TSE2 and the B1 rotor transmitting torque TRB1 are combined at the torque combining ratio of 1:1, and the combined torque is transmitted to the B2 rotor 33 as the B2 rotor transmitting torque TRB2. Therefore, in the battery input/output zero mode, the electric power generated by the first stator 22 as described above is supplied to the second stator 32, whereby as the second driving equivalent torque TSE2 is transmitted to the B2 rotor 33, the engine torque TENG transmitted to the B rotor 31 as described above is transmitted to the B2 rotor 33. Further, the engine torque TENG distributed to the A1 rotor 21 along with the electric power generation as described above is further transmitted to the B2 rotor 33 via the connection shaft 6.

As described above, combined torque formed by combining the engine torque TENG distributed to the A1 rotor 21, the second driving equivalent torque TSE2 and the engine torque TENG transmitted to the B1 rotor 31 is transmitted to the B2 rotor 33. Further, this combined torque is transmitted to the drive wheels DW and DW e.g. via the second main shaft 7. As a consequence, if there is no transmission loss caused by the gears, in the battery input/output zero mode, power equal in magnitude to the engine power WENG is transmitted to the drive wheels DW and DW.

Furthermore, in the battery input/output zero mode, the engine power WENG is transmitted to the drive wheels DW and DW while having the speed thereof steplessly changed through the control of the first and second magnetic field rotational speeds VMF1 and VMF2. In short, the first and second generator-motors 20 and 30 function as a stepless transmission.

Figure 19:
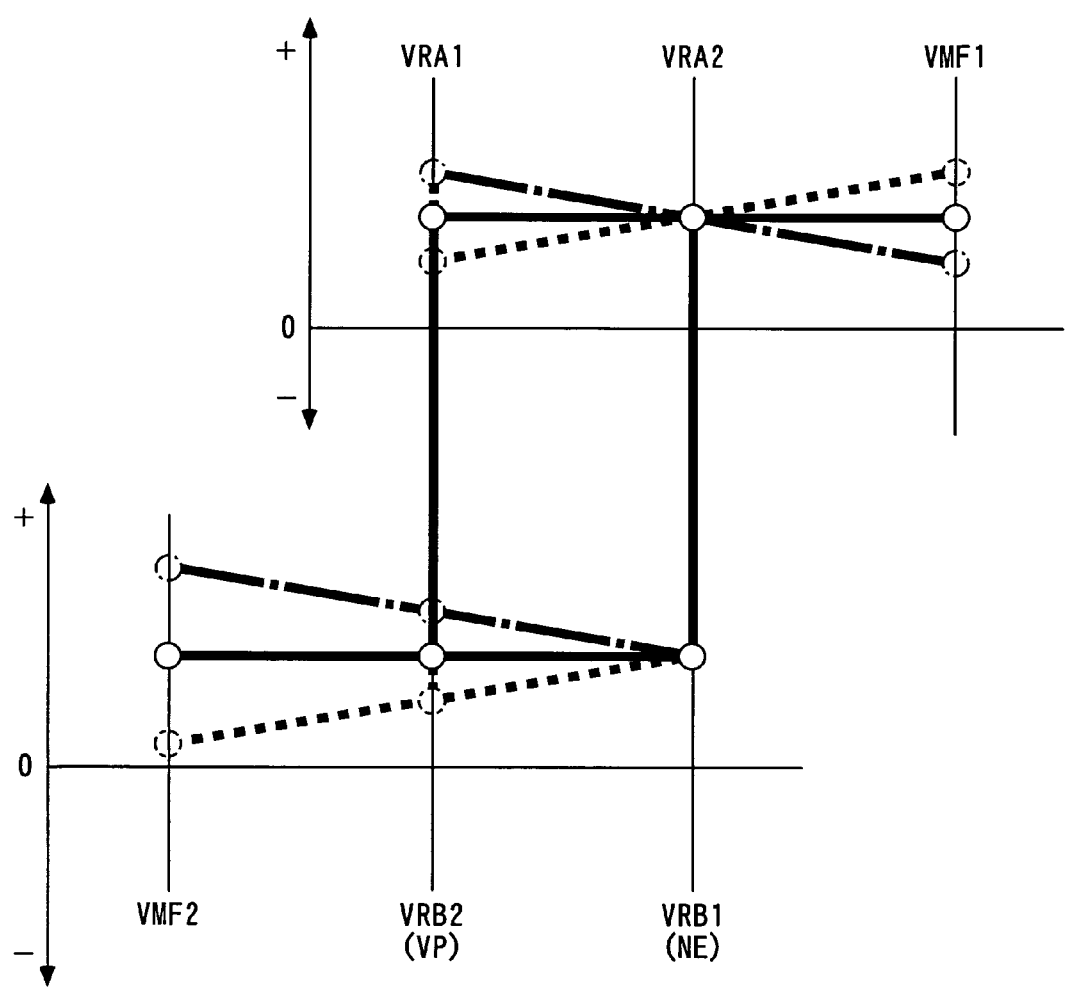
FIG. 19 A speed diagram representing the relationship between the first and second magnetic field rotational speeds VMF1 and VMF2, and the A1, A2, B1 and B2 rotor rotational speeds VRA1, VRA2, VRB1 and VRB2 in the battery input/output zero mode.

More specifically, as indicated by broken lines in FIG. 19, while maintaining the speed relationships expressed by the aforementioned equations (1) and (7), by increasing the first magnetic field rotational speed VMF1 and decreasing the second magnetic field rotational speed VMF2 with respect to the A2 and B1 rotor rotational speeds VRA2 and VRB1, that is, the engine speed NE, it is possible to steplessly decrease the A1 and B2 rotor rotational speeds VRA1 and VRB2, that is, the vehicle speed VP. Inversely, as indicated by one-dot chain lines in FIG. 19, by decreasing the first magnetic field rotational speed VMF1 and increasing the second magnetic field rotational speed VMF2 with respect to the A2 and B1 rotor rotational speeds VRA2 and VRB1, it is possible to steplessly increase the vehicle speed VP.

Furthermore, in this case, the first and second magnetic field rotational speeds VMF1 and VMF2 are controlled such that the engine speed NE becomes equal to a target engine speed NECMD. The target engine speed NECMD is calculated e.g. by searching a NECMD map (not shown) according to the vehicle speed VP and the demanded torque PMCMD. In this NECMD map, the NECMD value is set to such a value as will make it possible to obtain the optimum fuel economy of the engine 3 with respect to the vehicle speed VP and the demanded torque PMCCMD assumed at the time.

As described hereinabove, in the battery input/output zero mode, the engine power WENG is once divided by the first and second generator-motors 20 and 30, and is transmitted to the B2 rotor 33 via the next first to third transmission paths. Then, the divided engine power WENG is combined by the B2 rotor 33 and then is transmitted to the drive wheels DW and DW.

First transmission path: A 2 rotor 23→magnetic circuit→A1 rotor 21 connection shaft 6→B2 rotor 33

Second transmission path: B1 rotor 31→magnetic circuit B2 rotor 33

Third transmission path: A2 rotor 23→magnetic circuit→first stator 22→1st•PDU 41→2nd•PDU 42→second stator 32→magnetic circuit→B2 rotor 33

In the above first and second transmission paths, the engine power WENG is transmitted to the drive wheels DW and DW by so-called electrical paths through the magnetic circuits without being converted to electric power. Further, in the above-described third transmission path, the engine power WENG is once converted to electric power, and is then converted back into power again so as to be transmitted to the drive wheels DW and DW by the so-called electrical paths.

Further, in the battery input/output zero mode, the electric power generated by the first stator 22 and the first and second magnetic field rotational speeds VMF1 and VMF2 are controlled such that the speed relationships expressed by the aforementioned equations (1) and (7) are maintained. Further, the electric power generated by the first stator 22 is more specifically controlled as follows:

In the battery input/output zero mode, the relationship between the engine power WENG and the engine power WENG transmitted to the drive wheels DW and DW via the above-described electrical paths (hereinafter referred to as "the electrical path power WP") is represented as follows: The engine power WENG is represented by the product of the engine torque TENG and the engine speed NE. Further, in the battery input/output zero mode, all the electric power generated by the first stator 22 is supplied to the second stator 32, so that the electrical path power WP is equal to the product of the electric power generated by the first stator 22, that is, the first power-generating equivalent torque TGE1 and the first magnetic field rotational speed VMF1. Therefore, the ratio between the electrical path power WP and the engine power WENG is expressed by the following equation (13):

$$WP/WENG = (TGE1 \times VMF1)/(TENG \times NE) \quad (13)$$

Further, as described above, since part of the engine torque TENG is transmitted to the A2 rotor 23, and the rest thereof is transmitted to the B1 rotor 31, the sum of the A2 rotor transmitting torque TRA2 and the B1 rotor transmitting torque TRB1 is equal to the engine torque TENG. Therefore, there holds the following equation (14):

$$TENG = TRA2 + TRB1 \quad (14)$$

Furthermore, in this case, the aforementioned equation (6), that is, TRA2=TGE1+TRA1 holds, and the torque distribution ratio is 1:1, that is, TGE1=TRA1 holds, and hence there holds the following equation (15):

$$TRA2 = TGE1 \times 2 \quad (15)$$

Further, as described above, since the torque combining ratio between the B1 rotor transmitting torque TRB1 and the second driving equivalent torque TSE2 is 1:1, there holds the following equation (16):

$$TRB1 = TSE2 \quad (16)$$

If the equations (15) and (16) are substituted into the equation (14), there is obtained the following equation (17):

$$TENG = 2 \times TGE1 + TSE2 \quad (17)$$

Furthermore, in the aforementioned equation (1), since the A2 rotor 23 is connected to the engine 3, the second rotor rotational speed VRA2 is equal to the engine speed NE and therefore, there holds the following equation (18):

$$NE = (VMF1 + VRA1)/2 \quad (18)$$

Further, since the B2 rotor 33 and the A1 rotor 21 are connected to each other, the B2 rotor rotational speed VRB2 and the A1 rotor rotational speed VRA1 are equal to each other, and since the B1 rotor 31 is connected to the crankshaft 3a, the B1 rotor rotational speed VRB1 and the engine speed NE are equal to each other. Therefore, the aforementioned equation (7) can be represented by the following equation (19):

$$VRA1 = (VMF1 + NE)/2 \quad (19)$$

Furthermore, if the equation (19) is substituted into the equation (18), there is obtained the following equation (20):

$$NE = (2 \times VMF1 + VMF2)/3 \quad (20)$$

Further, if the equations (17) and (20) are substituted into the equation (13), there is obtained the following equation (21):

$$WP/WENG = (TGE1 \times VMF1)/\{(2 \times TGE1 + TSE2) \times (2 \times VMF1 + VMF2)/3\} \quad (21)$$

Further, in this case, since the electric power generated by the first stator 22 and the electric power supplied to the second stator 32 are equal to each other, there holds the following equation (22):

$$TSE2 = (VMF1 \times TGE1)/VMF2 \quad (22)$$

If the equation (22) is substituted into the equation (21), there is obtained the following equation (23). More specifically, in the battery input/output zero mode, the ratio between the electrical path power WP and the engine power WENG is expressed by the equation (23):

$$WP/WENG = 3/\{(2 + VMF1/VMF2) \times (2 + VMF2/VMF1)\} \quad (23)$$

provided VMF1>0 and VMF2>0 therein.

As described heretofore, the electrical path power WP is equal to the electric power generated by the first stator 22. Therefore, the electric power generated by the first stator 22 is controlled based on the equation (23) to WENG×3/{(2+VMF1/VMF2)×(2+VMF2/VMF1)} holds.

Further, as is clear from the equation (23), the ratio between the electrical path power WP and the engine power WENG is maximized when the first and second magnetic field rotational speeds VMF1 and VMF2 are equal to each other, giving WP/WENG=⅓.

As described above, it is possible to reduce the engine power WENG transmitted by an electrical path via the aforementioned third transmission path having a low transmission efficiency to ⅓ or less thereof. In other words, ⅔ or more of the engine power WENG, that is, most of it can be transmitted to the drive wheels DW and DW by magnetic paths via the aforementioned first and second transmission paths having a high transmission efficiency. Further, the torque distribution ratio between the first power-generating equivalent torque TGE1 and the A1 rotor transmitting torque TRA1 is 1:1, and the torque combining ratio between the B1 rotor transmitting torque TRB1 and the second driving equivalent torque TSE2 is 1:1, so that if the first and second magnetic field rotational speeds VMF1 and VMF2 are equal to each other, and the speed of the engine power WENG is not changed, the engine torque TENG is divided into three equal parts, and is transmitted to the drive wheels DW and DW via the first to third transmission paths.

On the other hand, during traveling of the vehicle, if the following conditions (a) and (b) are both satisfied, the engine 3 is assisted by the second generator-motor 30. Hereinafter, this operation mode is referred to as "the assist mode".

(a) demanded torque PMCMD>first predetermined value PM1

(b) remaining capacity SOC>lower limit value SOCL

Here, the first predetermined value PM1 is calculated e.g. by searching a PM1 table (not shown) according to the vehicle speed VP. In this PM1 table, the first predetermined value PM1 is set to such a torque value as will make it possible to obtain the optimum fuel economy of the engine 3 with respect to the vehicle speed VP assumed then. The above-described lower limit value SOCL is set to such a value as will not cause excessive discharge of the battery 43. Thus, the operation in the assist mode is performed when power required for driving the vehicle (hereinafter referred to as "the vehicle demand power"), which is represented by the current vehicle speed VP and the demanded torque PMCMD, is larger than the engine power WENG that will make it possible to obtain the optimum fuel economy of the engine 3 and at the same time when the remaining electric power of in the battery 43 is large enough.

Figure 20:
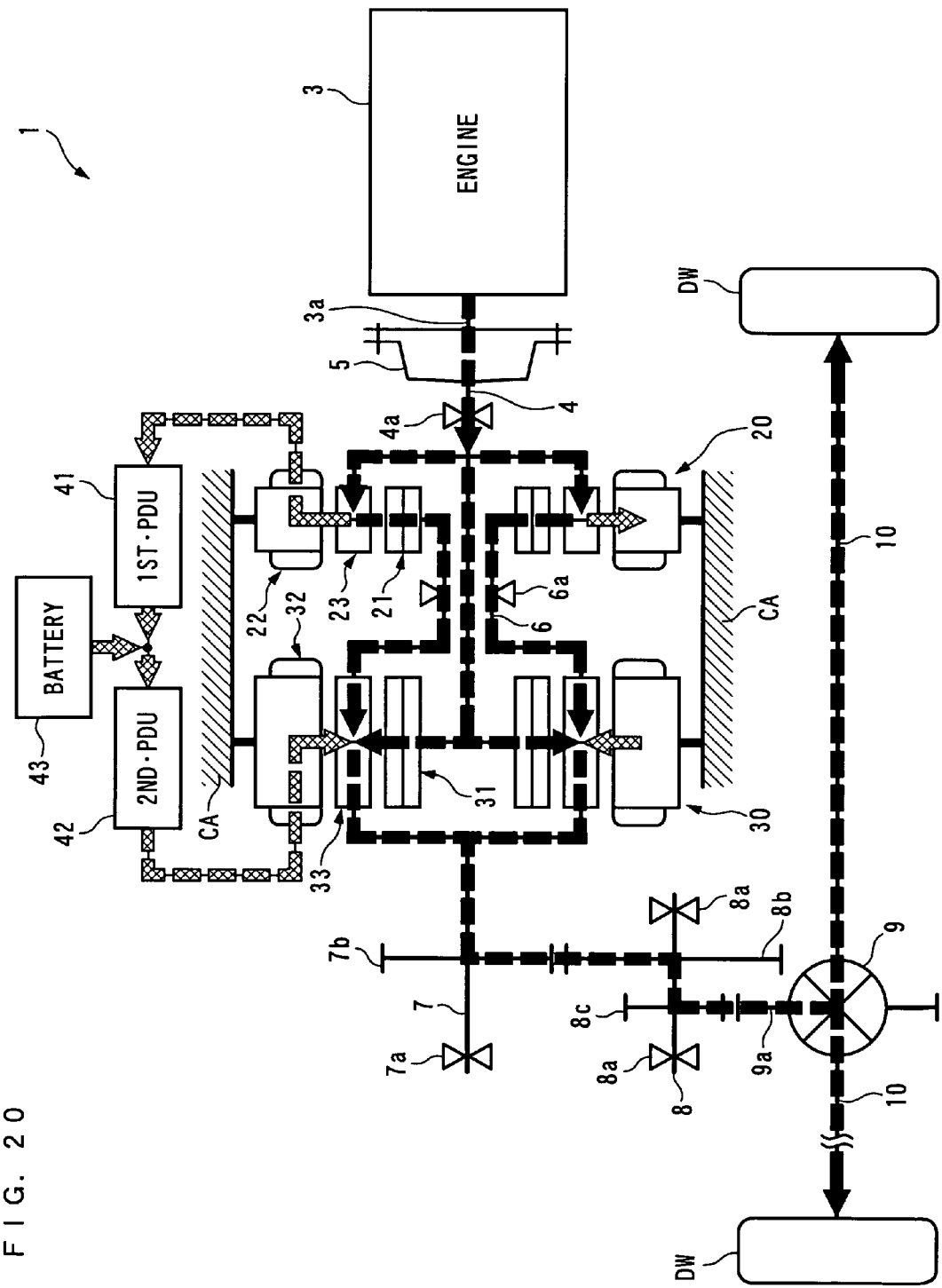
FIG. 20 A diagram showing how torque is transmitted in the power plant in an assist mode.

More specifically, similarly to the battery input/output zero mode, electric power is generated by the first stator 22 using the engine power WENG transmitted to the A2 rotor 23. Further, in this case, differently from the battery input/output zero mode, as shown in FIG. 20, electric power charged in the battery 43 is supplied to the second stator 32 in addition to the electric power generated by the first stator 22. Therefore, the second driving equivalent torque TSE2 based on the sum of the electric power generated by the first stator 22 and the electric power supplied from the battery 43 is transmitted to the B2 rotor 33. Further, similarly to the battery input/output zero mode, the second driving equivalent torque TSE2, the engine torque TENG distributed to the A1 rotor 21 along with the electric power generation and the engine torque TENG transmitted to the B1 rotor 31 are combined by the B2 rotor 33, and the combined torque is transmitted to the drive wheels DW and DW. As a result, assuming that there is no transmission loss caused by the gears or the like, in the assist mode, the power transmitted to the drive wheels DW and DW becomes equal to the sum of the engine power WENG and the electric power (energy) supplied from the battery 43.

Figure 31:
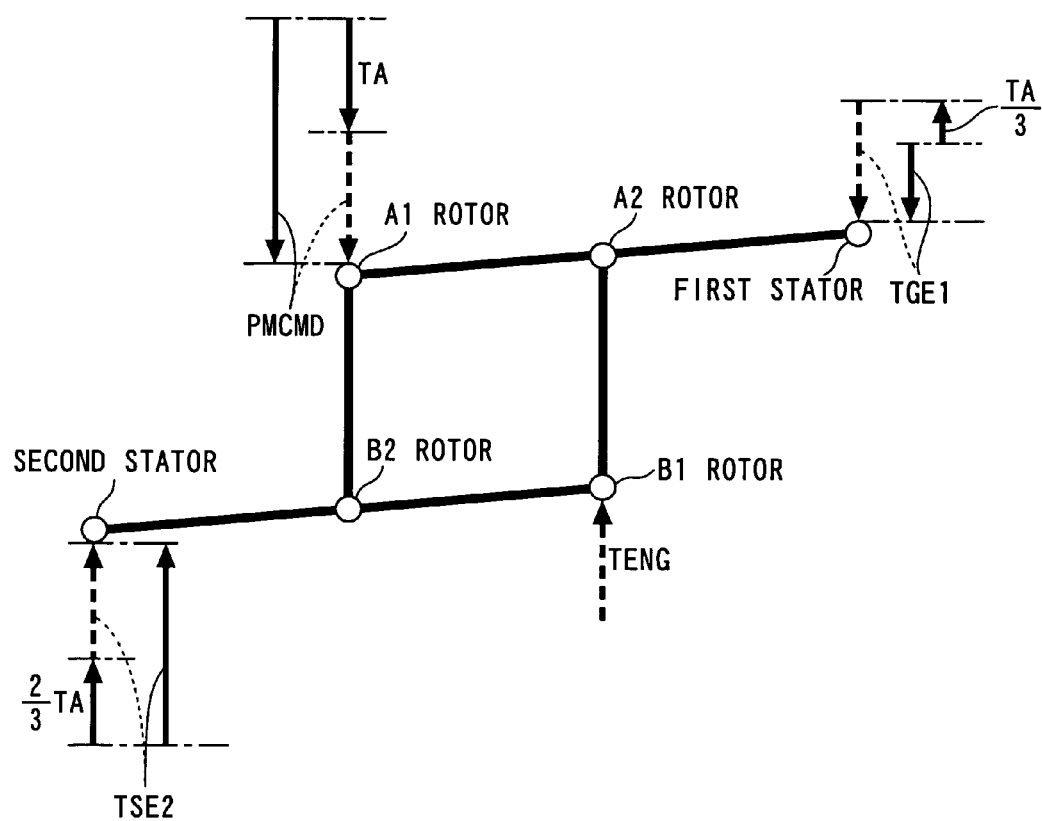
FIG. 31 A schematic diagram illustrating the relationship between the engine torque TENG and demanded torque PMCMD using solid lines with arrows for the assist mode and using broken lines with arrows for the battery input/output zero mode.

Further, in the assist mode, the electric power generated by the first stator 22, the electric power supplied from the battery 43 to the second stator 32, and the first and second magnetic field rotational speeds VMF1 and VMF2 are controlled such that the speed relationships expressed by the aforementioned equations (1) and (7) are maintained. More specifically, the electric power generated by the first stator 22 and the electric power supplied from the battery 43 are controlled as follows:

FIG. 31 schematically shows an example of the relationship between the engine torque TENG, the demanded torque PMCMD, and so forth, obtained in the assist mode. In FIG. 31, broken lines with arrows indicate states in the battery input/output zero mode before the assist mode, and it is assumed that the engine torque TENG, the demanded torque PMCMD, the first power-generating equivalent torque TGE1 and the second driving equivalent torque TSE2 are balanced with each other in the states. From the states, as indicated by solid lines with arrows in FIG. 31, when the demanded torque PMCMD is increased to switch the operation mode to the assist mode, the following control is carried out so as to supplement the insufficient amount of the engine torque TENG (hereinafter referred to as "the insufficient torque TA") with respect to the demanded torque PMCMD.

In this case, as described hereinabove, the torque distribution ratio and the torque combining ratio in the first and second generator-motors 20 and 30 are 1:1, and hence to maintain the speed relationships expressed by the aforementioned equations (1) and (7), it is necessary to supplement ⅓ of the insufficient torque TA by the first generator-motor 20, and ⅔ of the insufficient torque TA by the second generator-motor 30. Further, since the first power-generating equivalent torque TGE1 acts on the engine torque TENG as negative torque, the electric power generated by the first stator 22 is controlled such that the first power-generating equivalent torque TGE1 becomes equal to a value obtained by subtracting the ⅓ of the insufficient torque TA from the first power-generating equivalent torque TGE1 in the battery input/output zero mode (TGE1−TA/3). As a consequence, the electric power supplied from the first stator 22 to the second stator 32 is reduced. Further, the electric power supplied from the battery 43 to the second stator 32 is controlled to a value obtained by converting the insufficient torque TA and the vehicle speed VP into electric energy. From the above, the total electric power supplied from the first stator 22 and the battery 43 to the second stator 32 is controlled such that the second driving equivalent torque TSE2 becomes equal to a value obtained by adding the ⅔ of the insufficient torque TA to the second driving equivalent torque TSE2 in the battery input/output zero mode (TSE2+TA×⅔).

It should be noted that although the above-described example is an example of a case in which the ⅓ of the insufficient torque TA to be supplemented is small with respect to the first power-generating equivalent torque TGE1 in the battery input/output zero mode, if the ⅓ of the insufficient torque TA is larger, the electric power is supplied from the battery 43 not only to the second stator 32 but also to the first stator 22.

As described above, the operation in the assist mode is performed when the vehicle demand power is large with respect to the engine power WENG that will make it possible to obtain the optimum fuel economy of the engine 3. Further, in the assist mode, the engine power WENG is controlled such that the optimum fuel economy of the engine 3 can be obtained, and the insufficient amount of the engine power WENG with respect to the vehicle demand power is made up for by supply of electric power from the battery 43.

On the other hand, during traveling of the vehicle, if the following conditions (c) and (d) are both satisfied, part of the electric power generated by the first stator 22 using the engine power WENG, as described above, is charged into the battery 43, and the rest thereof is supplied to the second stator 32. Hereinafter, this operation mode is referred to as "the drive-time charging mode".

(c) demanded torque PMCMD<second predetermined value PM2

(d) remaining capacity SOC<upper limit value SOCH

Here, the second predetermined value PM2 is calculated e.g. by searching a PM2 table (not shown) according to the vehicle speed VP. In this PM2 table, the second predetermined value PM2 is set to a value smaller than such a torque value as will make it possible to obtain the optimum fuel economy of the engine 3 with respect to the vehicle speed VP assumed then. The upper limit value SOCH is set to such a value as will not cause overcharge of the battery 43. Thus, the operation in the drive-time charging mode is performed when the vehicle demand power is smaller than the engine power WENG that will make it possible to obtain the optimum fuel economy of the engine 3, and at the same time when the remaining capacity SOC is relatively small.

Figure 21:
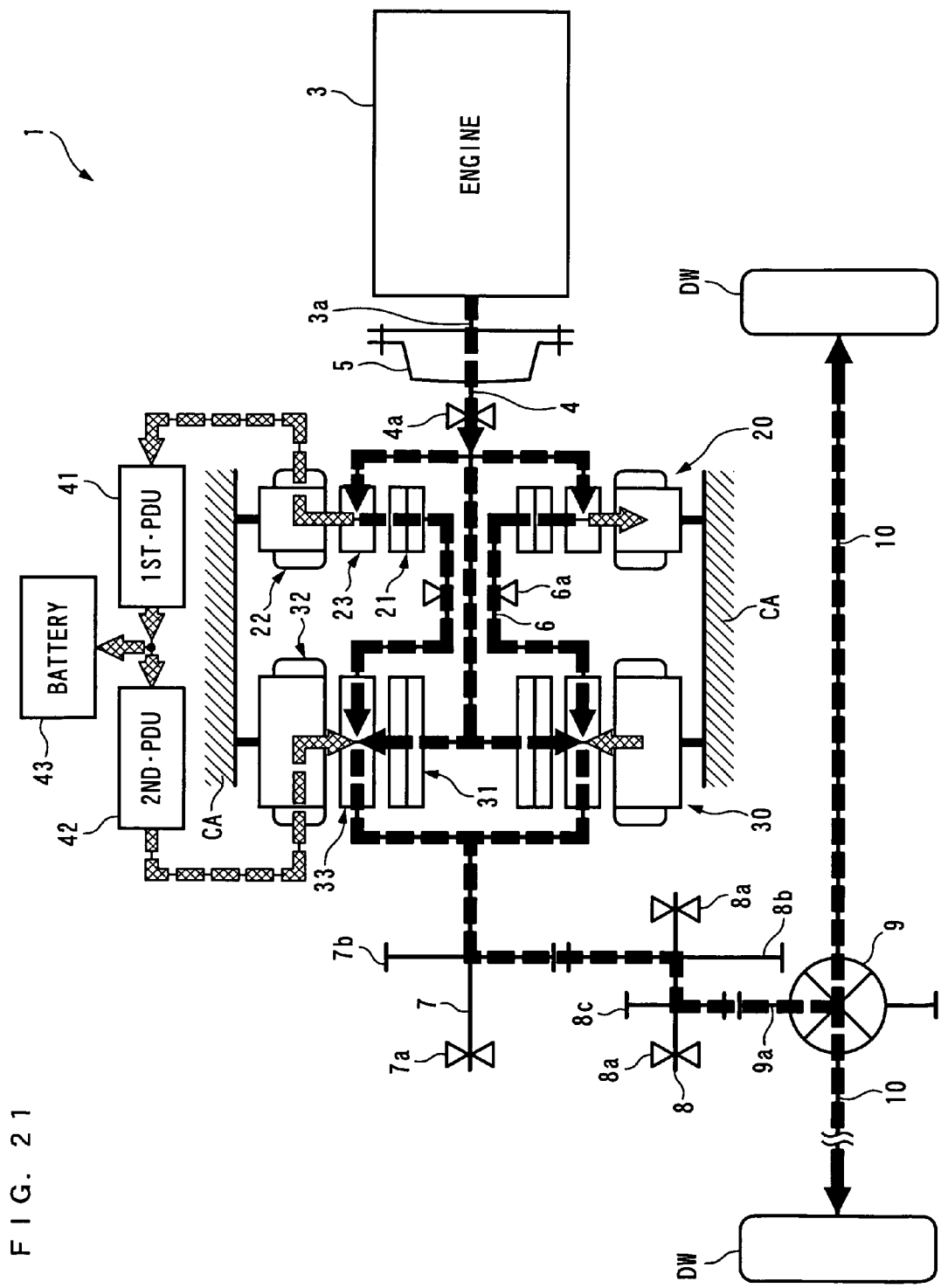
FIG. 21 A diagram showing how torque is transmitted in the power plant in a drive-time charging mode.

Referring to FIG. 21, in the drive-time charging mode, differently from the battery input/output zero mode, electric power, which has a magnitude obtained by subtracting the electric power charged into the battery 43 from the electric power generated by the first stator 22, is supplied to the second stator 32, and the second driving equivalent torque TSE2 based on the electric power having the magnitude is transmitted to the second rotor 33. Further, similarly to the battery input/output zero mode, the second driving equivalent torque TSE2, the engine torque TENG distributed to the A1 rotor 21 along with the electric power generation and the engine torque TENG transmitted to the B1 rotor 31 are combined by the B2 rotor 33, and the combined torque is transmitted to the drive wheels DW and DW. As a result, if there is no transmission loss caused by the gears, in the drive-time charging mode, the power transmitted to the drive wheels DW and DW has a magnitude obtained by subtracting the electric power (energy) charged into the battery 43 from the engine power WENG.

Further, in the drive-time charging mode, the electric power generated by the first stator 22, the electric power charged into the battery 43 and the first and second magnetic field rotational speeds VMF1 and VMF2 are controlled such that the speed relationships expressed by the aforementioned equations (1) and (7) are maintained. Furthermore, more specifically, the electric power generated by the first stator 22 and the electric power charged into the battery 43 are controlled as follows:

FIG. 32 schematically shows an example of the relationship between the engine torque TENG, the demanded torque PMCMD, and so forth, obtained in the drive-time charging mode. In the figure, broken lines with arrows indicate states in the battery input/output zero mode before the drive-time charging mode, and it is assumed that the engine torque TENG, the demanded torque PMCMD, the first power-generating equivalent torque TGE1 and the second driving equivalent torque TSE2 are balanced with each other in the states. From the states, as indicated by solid lines with arrows in FIG. 32, when the demanded torque PMCMD is decreased to switch the operation mode to the drive-time charging mode, the engine torque TENG becomes larger than the demanded torque PMCMD (hereinafter, the surplus amount of the engine torque TENG with respect to the demanded torque PMCMD is referred to as "the surplus torque TG").

In this case, as described hereinabove, the torque distribution ratio and the torque combining ratio in the first and second generator-motors 20 and 30 are 1:1, and hence to maintain the speed relationships expressed by the aforementioned equations (1) and (7), it is necessary to reduce torque by an amount corresponding to ⅔ of the surplus torque TG in the first generator-motor 20, and by an amount corresponding to ⅓ of the surplus torque TG in the second generator-motor 30. In this case, since the first power-generating equivalent torque TGE1 acts on the engine torque TENG as negative torque, the electric power generated by the first stator 22 is controlled such that the first power-generating equivalent torque TGE1 becomes equal to a value obtained by adding ⅔ of the surplus torque TG to the first power-generating equivalent torque TGE1 in the battery input/output zero mode (TGE1+TG×2/3). Further, the electric power charged into the battery 43 is controlled to a value obtained by converting the surplus torque TG and the engine speed NE into electric energy. From the above, the electric power supplied from the first stator 22 to the second stator 32 is controlled such that the second driving equivalent torque TSE2 becomes equal to a value obtained by subtracting ⅓ of the surplus torque TG from the second driving equivalent torque TSE2 in the battery input/output zero mode (TSE2-TG/3).

As described above, the operation in the drive-time charging mode is performed when the vehicle demand power is small with respect to the engine power WENG that will make it possible to obtain the optimum fuel economy of the engine 3. Further, in the drive-time charging mode, the engine power WENG is controlled such that the optimum fuel economy of the engine 3 can be obtained, and the surplus amount of the engine power WENG with respect to the vehicle demand power is charged into the battery 43 as electric power.

Figure 22:
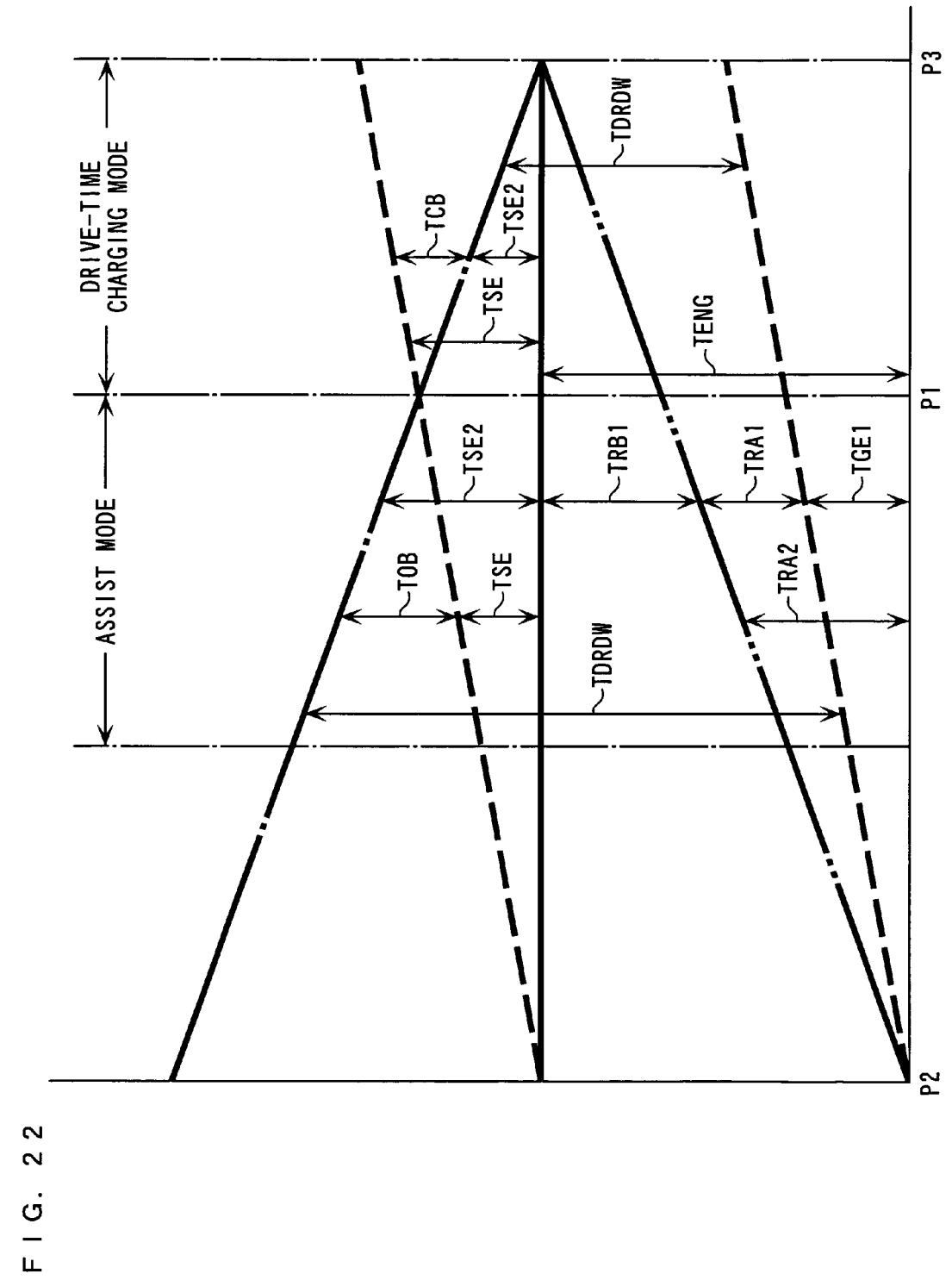
FIG. 22 A diagram showing a ratio of torque transmitted to foot axis drive torque TDRDW and the like to engine torque TENG, assuming that the engine torque TENG is held constant and at the same time the first and second magnetic field rotational speeds VMF1 and VMF2 are equal to each other in the battery input/output zero mode, the assist mode and the drive-time charging mode.

FIG. 22 shows a diagram showing the torque transmitted to the drive wheels DW and DW (hereinafter referred to as "the foot axis drive torque TDRDW") and so forth in ratios with respect to the engine torque TENG, assuming that the engine torque TENG is held constant and at the same time the first and second magnetic field rotational speeds VMF1 and VMF2 are equal to each other in the battery input/output zero mode, the assist mode and the drive-time charging mode described above. Further, in FIG. 22, P1 indicates torques in the battery input/output zero mode. It should be noted that FIG. 22 does not reflect changes in the torques due to shifting of the gears, and this also applies to the following description.

Further, in FIG. 22, TSE represents, in a case where all the electric power generated by the first stator 22 using the engine power WENG is supplied to the second stator 32, torque equivalent to the supplied electric power and the second magnetic field rotational speed VMF2 (hereinafter referred to as "the supplied electric power equivalent torque"). In short, the supplied electric power equivalent torque TSE is equal to the first power-generating equivalent torque TGE1.

As described above, basically, in any of the operation modes, combined torque formed by combining the second driving equivalent torque TSE2, the B1 rotor transmitting torque TRB1, and the A1 rotor transmitting torque TRA1 is transmitted to the drive wheels DW and DW via the B2 rotor 33, and therefore the foot axis drive torque TDRDW is equal to the total sum of the torques TSE2, TRB1 and TRA1. Further, since the torque combining ratio between the second driving equivalent torque TSE2 and the B1 rotor transmitting torque TRB1 is 1:1, TSE2 and TRB1 are equal to each other. Furthermore, since the A2 rotor 23 and the B1 rotor 31 are connected to the engine 3, the sum of the A2 rotor transmitting torque TRA2 and the B1 rotor transmitting torque TRB1 is equal to the engine torque TENG, and as the value of TRA2 is larger, the value of TRB1 becomes smaller. Inversely, as the value of TRB1 is larger, the value of TRA2 becomes smaller.

Further, as described hereinabove, in the battery input/output zero mode, when the first and second magnetic field rotational speeds VMF1 and VMF2 are equal to each other, the engine torque TENG is divided into three equal parts, and is transmitted to the drive wheels DW and DW via the first to third transmission paths. Therefore, as indicated by P1 in FIG. 22, the A1 rotor transmitting torque TRA1, the first power-generating equivalent torque TGE1 and the B1 rotor transmitting torque TRB1 are equal to each other. Furthermore, in this case, all the electric power generated by the first stator 22 is supplied to the second stator 32, so that the second driving equivalent torque TSE2 is equal to the supplied electric power equivalent torque TSE and the first power-generating equivalent torque TGE1.

Further, in FIG. 22, TOB represents, in the assist mode, torque equivalent to the electric power supplied from the battery 43 to the second stator 32 and the second magnetic field rotational speed VMF2 (hereinafter referred to as "the battery output equivalent torque"). As described hereinabove, in the assist mode, not only the electric power generated by the first stator 22 but also the electric power from the battery 43 are supplied to the second stator 32, and hence as shown in FIG. 22, the second driving equivalent torque TSE2 becomes equal to the sum of the supplied electric power equivalent torque TSE and the battery output equivalent torque TOB, and as the battery output equivalent torque TOB is larger, the second driving equivalent torque TSE2 becomes larger. Furthermore, as the battery output equivalent torque TOB is larger, the foot axis drive torque TDRDW becomes larger.

Further, the torque combining ratio between the second driving equivalent torque TSE2 and the B1 rotor transmitting torque TRB1 is 1:1, and hence as the second driving equivalent torque TSE2 is larger, the B1 rotor transmitting torque TRB1 becomes larger. Furthermore, as described above, as the B1 rotor transmitting torque TRB1 is larger, the A2 rotor transmitting torque TRA2 becomes smaller, so that the first power-generating equivalent torque TGE1 distributed from the A2 rotor transmitting torque TRA2 is also smaller. From the above, as the second driving equivalent torque TSE2 is larger, and the battery output equivalent torque TOB is larger, the first power-generating equivalent torque TGE1 becomes smaller, and the ratio of the supplied electric power equivalent torque TSE to the second driving equivalent torque TSE2 becomes smaller. That is, as the electric power supplied from the battery 43 is larger, the engine power WENG transmitted to the drive wheels DW and DW by the above-described electrical paths becomes smaller, while the engine power WENG transmitted to the drive wheels DW and DW by the magnetic paths becomes larger.

When the electric power generation is not performed by the first stator 22 but the electric power supplied from the battery 43 to the second stator 32 is controlled such that the battery output equivalent torque TOB becomes equal to the engine torque TENG, it is possible to transmit the engine power WENG to the drive wheels DW and DW only by the magnetic paths without transmitting the same by the electrical paths. In this case, as indicated by P2 in FIG. 22, all of the A2 rotor transmitting torque TRA2, the A1 rotor transmitting torque TRA1, the first power-generating equivalent torque TGE1 and the supplied electric power equivalent torque TSE become equal to 0. Further, the B1 rotor transmitting torque TRB1 becomes equal to the engine torque TENG, and the foot axis drive torque TDRDW becomes equal to the sum of the engine torque TENG and the second driving equivalent torque TSE2, i.e. the battery output equivalent torque TOB.

Further, in FIG. 22, TCB represents torque equivalent to the electric power charged into the battery 43 in the drive-time charging mode, and the first magnetic field rotational speed VMF1 (hereinafter referred to as "the charging equivalent torque"). As described hereinabove, in the drive-time charging mode, part of the electric power generated by the first stator 22 is charged into the battery 43, and the rest thereof is supplied to the second stator 32, so that as shown in FIG. 22, the charging equivalent torque TCB is equal to the difference between the supplied electric power equivalent torque TSE and the second driving equivalent torque TSE2. Furthermore, as the first power-generating equivalent torque TGE1 is larger and the A2 rotor transmitting torque TRA2 is larger, both the B1 rotor transmitting torque TRB1 and the second driving equivalent torque TSE2 become smaller. Further, as described above, as the first power-generating equivalent torque TGE1 is larger, the second driving equivalent torque TSE2 becomes smaller, and hence the charging equivalent torque TCB becomes larger. Furthermore, as the charging equivalent torque TCB is larger, the foot axis drive torque TDRDW becomes smaller.

Further, in FIG. 22, P3 indicates torques obtained in the case where the electric power generated by the first stator 22 is controlled such that the first power-generating equivalent torque TGE1 becomes equal to ½ of the engine torque TENG, and all the generated electric power is charged into the battery 43. In this case, as indicated by P3, the A2 rotor transmitting torque TRA2 becomes equal to the engine torque TENG, and both the B1 rotor transmitting torque TRB1 and the second driving equivalent torque TSE2 become equal to 0. Furthermore, both the foot axis drive torque TDRDW and the charging equivalent torque TCB becomes equal to ½ of the engine torque TENG. As described above, in this case, the second driving equivalent torque TSE2 become equal to 0, so that it is possible to transmit the engine power WENG to the drive wheels DW and DW only by the magnetic paths without transmitting the same by the electrical paths.

Next, a description will be given of the control during decelerating traveling of the vehicle. During decelerating running, when the ratio of foot axis input torque of the drive wheels DW and DW transmitted to the engine 3 to torque of the drive wheels DW and DW (hereinafter referred to as "the foot axis input torque") is small, electric power generation is performed by both the first and second stators 22 and 32 using part of power from the drive wheels DW and DW, and generated electric power is charged into the battery 43. More specifically, this electric power generation is performed by the first stator 22 using power transmitted, as described hereinafter, to the A2 rotor 23, and is performed by the second stator 32 using power transmitted, as described hereinafter, to the B2 rotor 33.

Figure 23:
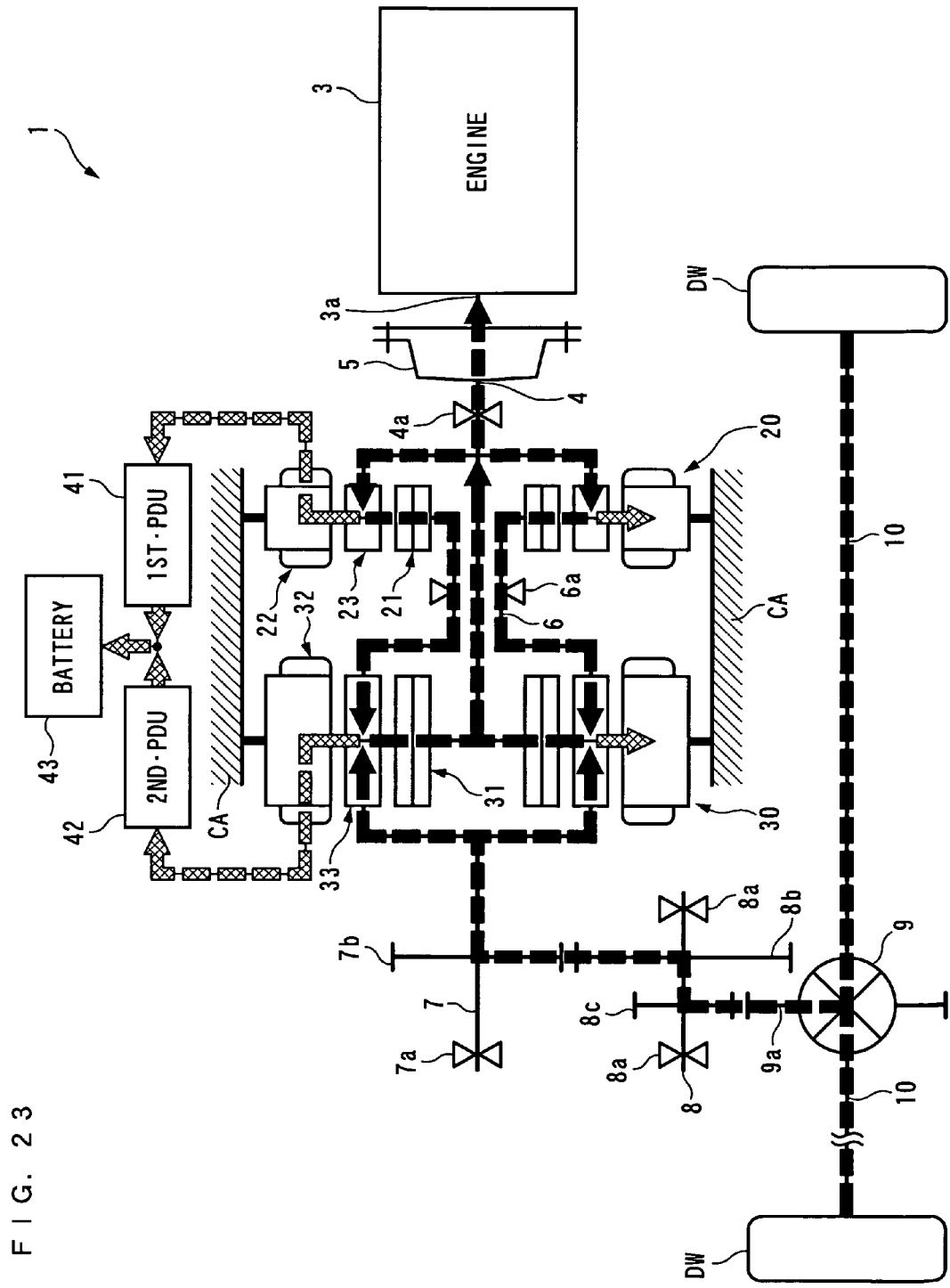
FIG. 23 A diagram showing how torque is transmitted in the power plant during decelerating traveling of the vehicle.

FIG. 23 shows how torque is transmitted during the above-mentioned decelerating traveling of the vehicle. As shown in FIG. 23, combined torque formed by combining all the foot axis input torque and torque distributed, as described hereinafter, to the A1 rotor 21 is transmitted to the B2 rotor 33. As described above using the aforementioned equation (12), in the second generator-motor 30, during electric power generation using power input to the B2 rotor 33, the B2 rotor transmitting torque TRB2 is distributed to the second stator 32 and the B1 rotor 31 at the distribution ratio of 1:1 and transmitted thereto as the second power-generating equivalent torque TGE2 and the B1 rotor transmitting torque TRB1. Therefore, along with the electric power generation, the combined torque transmitted to the B2 rotor 33 is distributed to the second stator 32 and the B1 rotor 31 at the distribution ratio of 1:1.

Further, part of the torque distributed to the B1 rotor 31 is transmitted to the engine 3. Similarly to the case in the battery input/output zero mode, as the electric power is generated by the first stator 22, the rest thereof is transmitted to the A2 rotor 23 and then is distributed to the first stator 22 and the A1 rotor 21 at the distribution ratio of 1:1. Further, the torque distributed to the A1 rotor 21 is transmitted to the B2 rotor 33. As a result, if there is no transmission loss caused by the gears, during the decelerating traveling of the vehicle, the sum of the power transmitted to the engine 3 and the electric power (energy) charged into the battery 43 becomes equal to the power from the drive wheels DW and DW.

Further, in place of the above-described methods, the start of the engine 3, the creep operation and the standing start of the vehicle may be performed as follows: First, a description will be given of the start of the engine 3. Differently from the above-described start of the engine 3 during traveling of the vehicle, this start of the engine 3 is carried out during stoppage of the vehicle. Hereinafter, such start of the engine 3 is referred to as "the ENG start during stoppage of the vehicle". More specifically, electric power is supplied from the battery 43 to the first stator 22, and the first and second rotating magnetic fields generated by the first stator 22 in accordance with the supply of the electric power are caused to perform normal rotation, while electric power is generated by the second stator 32 using power transmitted, as described hereinafter, to the B1 rotor 31, and the generated electric power is supplied to the first stator 22.

Figure 24:
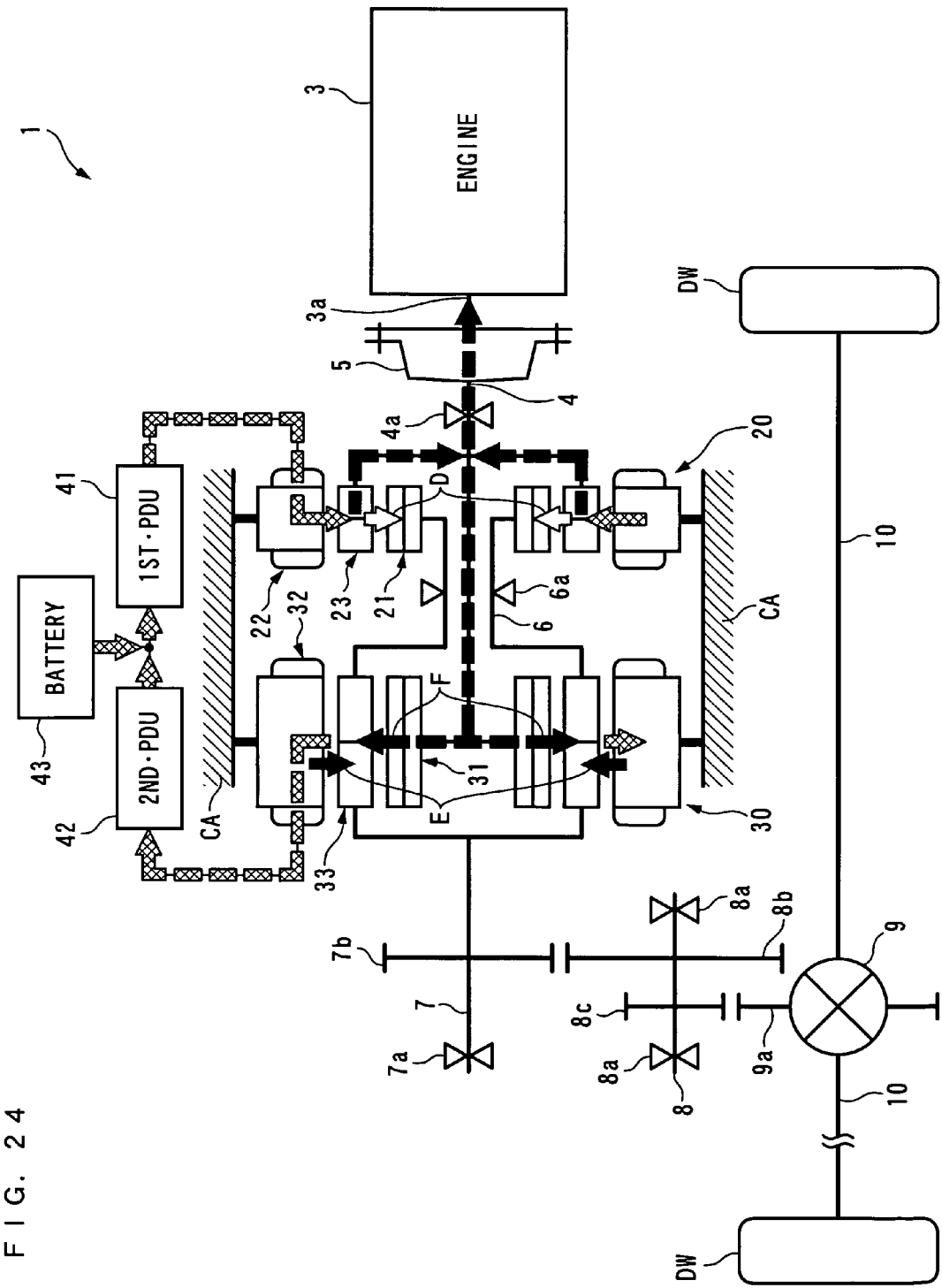
FIG. 24 A diagram showing how torque is transmitted in the power plant at the time of ENG start during stoppage of the vehicle.
Figure 25:
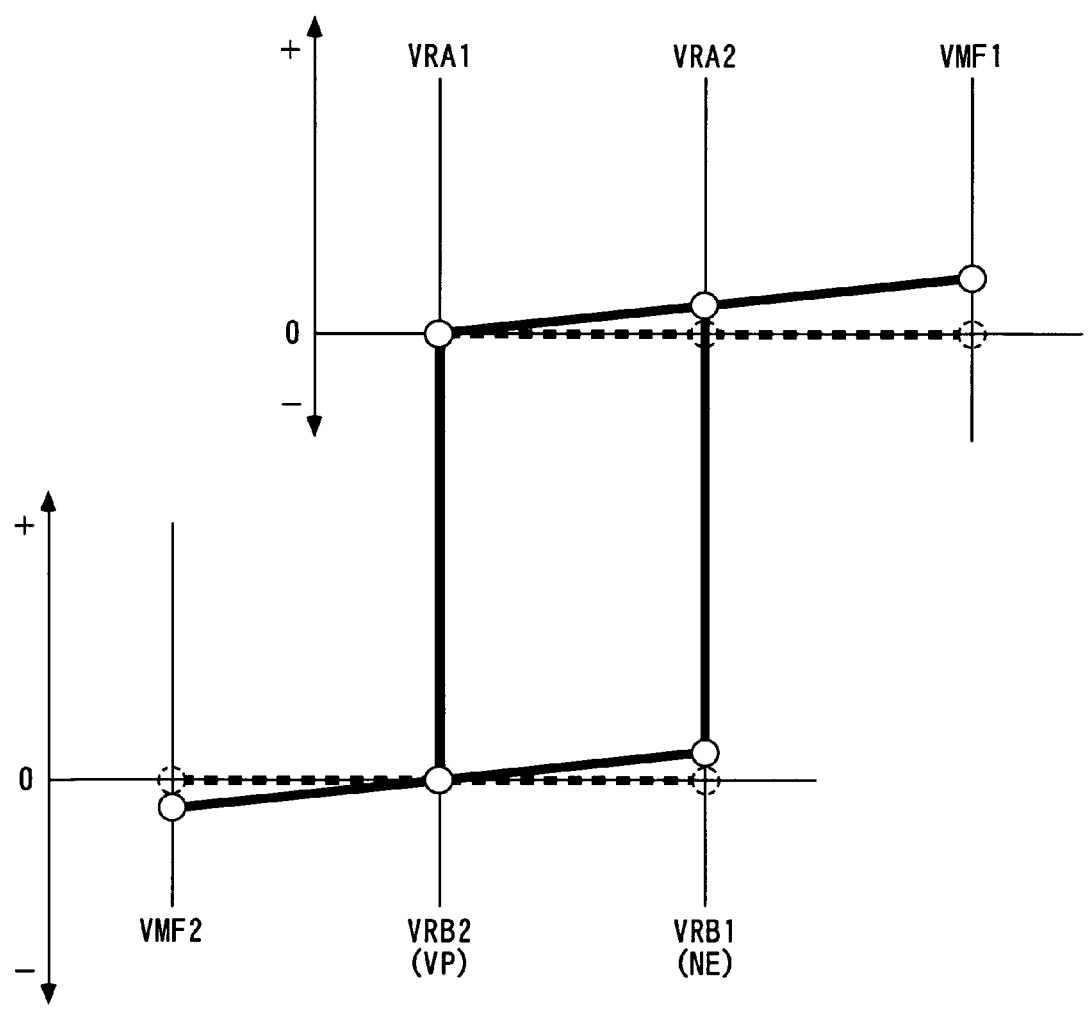
FIG. 25 A speed diagram representing the relationship between the first and second magnetic field rotational speeds VMF1 and VMF2, and the A1, A2, B1 and B2 rotor rotational speeds VRA1, VRA2, VRB1 and VRB2 at the time of the ENG start during stoppage of the vehicle.

FIG. 24 shows how torque is transmitted at the above-described ENG start during stoppage of the vehicle, and FIG. 25 shows a speed diagram at the time of the ENG start during stoppage of the vehicle. As shown in FIG. 24, at the ENG start during stoppage of the vehicle, along with the supply of the electric power to the first stator 22, torque that acts on the A2 rotor 23 to cause the A2 rotor 23 to perform normal rotation is transmitted from the first stator 22 to the A2 rotor 23, and as indicated by arrows D, torque that acts on the A1 rotor 21 to cause the A1 rotor 21 to perform reverse rotation is transmitted from the first stator 22 to the A1 rotor 21. Further, part of the torque transmitted to the A2 rotor 23 is transmitted to the crankshaft 3a, whereby the crankshaft 3a performs normal rotation.

Furthermore, at the ENG start during stoppage of the vehicle, the remainder of the torque transmitted to the A2 rotor 23 is transmitted to the B1 rotor 31, and then is transmitted to the second stator 32 as the second power-generating equivalent torque TGE2 as the electric power is generated by the second stator 32. Further, as indicated by thick solid lines in FIG. 25, the first and second rotating magnetic fields generated along with the electric power generation by the second stator 32 perform reverse rotation. Therefore, as indicated by arrows E in FIG. 24, along with the electric power generation by the second stator 32, torque dependent on the amount of generated electric power is transmitted from the second stator 32 to the B2 rotor 33. This torque acts on the B2 rotor 33 to cause the B2 rotor 33 to perform normal rotation. Further, the torque transmitted to the B1 rotor 31 is further transmitted to the B2 rotor 33 (as indicated by arrows F) such that it is balanced with the torque transmitted from the second stator 32 to the B2 rotor 33, and these torques are combined at the torque combining ratio of 1:1.

In this case, the electric power supplied to the first stator 22 and the electric power generated by the second stator 32 are controlled such that the above-described torque indicated by the arrows D, for causing the A1 rotor 21 to perform reverse rotation, and the torques indicated by the arrows E and F, for causing the B2 rotor 33 to perform normal rotation are balanced with each other, whereby the A1 rotor 21, the B2 rotor 33 and the drive wheels DW and DW are held at rest. As a consequence, as shown in FIG. 25, the A1 and B2 rotor rotational speeds VRA1 and VRB2 become equal to 0, and the engine speed NE as well become equal to 0.

Further, in this case, the electric power supplied to the first stator 22, the electric power generated by the second stator 32 and the first and second magnetic field rotational speeds VMF1 and VMF2 are controlled such that the speed relationships expressed by the aforementioned equations (1) and (7) are maintained and at the same time, the A2 and B1 rotor rotational speeds VRA2 and VRB1 take relatively small values (see FIG. 25). From the above, at the ENG start during stoppage of the vehicle, while holding the vehicle speed VP at 0, the engine speed NE is controlled to a relatively small value suitable for the start of the engine 3. Further, in this state, the ignition operation of the fuel injection valves and the spark plugs of the engine 3 is controlled, whereby the engine 3 is started.

The control during the creep operation is performed subsequent to the above-described ENG start during stoppage of the vehicle, as follows. Hereinafter, this creep operation is referred to as "the ENG creep operation". That is, electric power generation is performed by the first stator 22 by using the engine power WENG transmitted to the A2 rotor 23, and electric power generation is performed by the second stator 32 by using the engine power WENG transmitted to the B1 rotor 31. Further, the electric power thus generated by the first and second stators 22 and 32 is charged into the battery 43.

Figure 26:
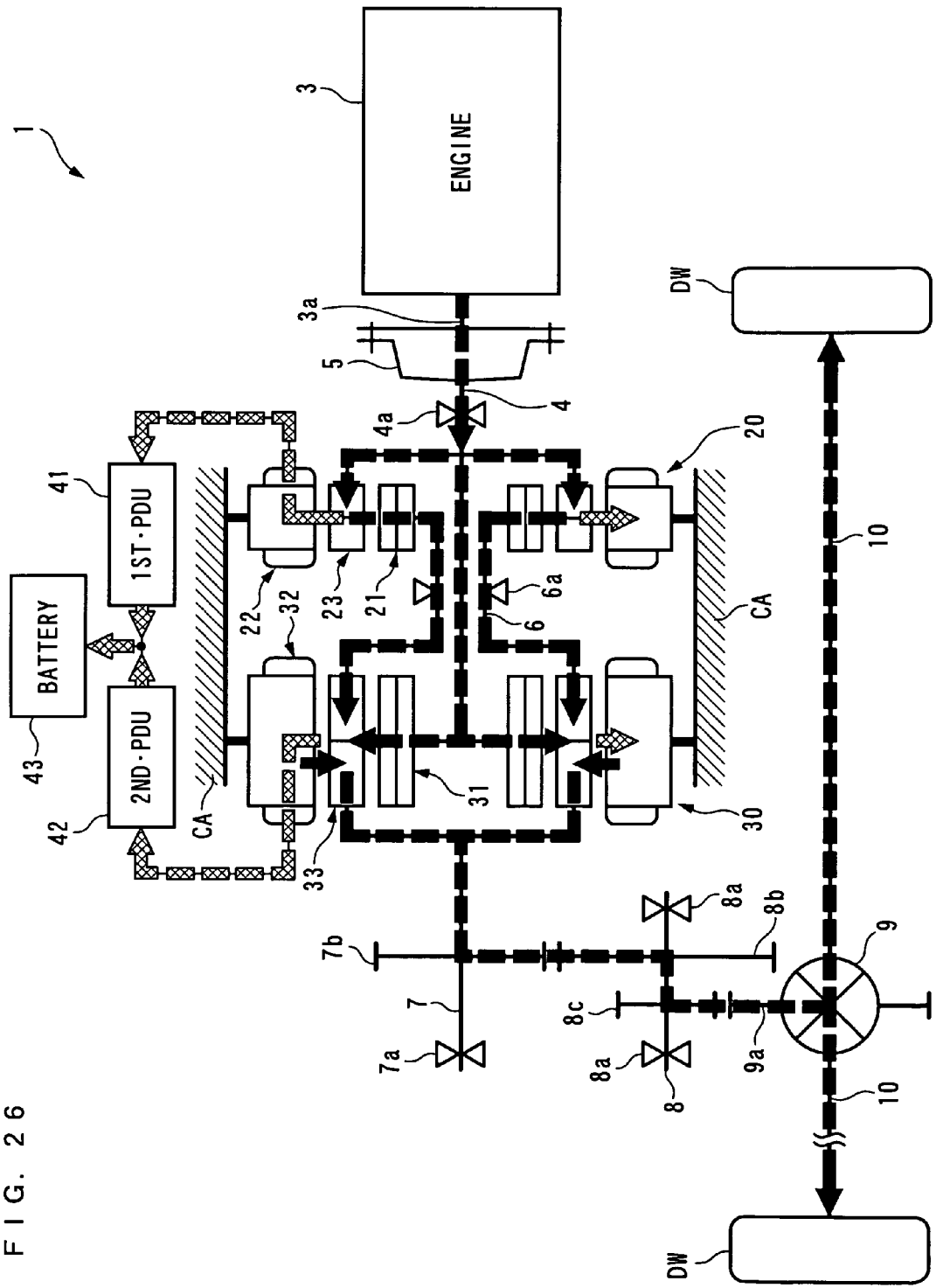
FIG. 26 A diagram showing how torque is transmitted in the power plant during an ENG creep operation.
Figure 27:
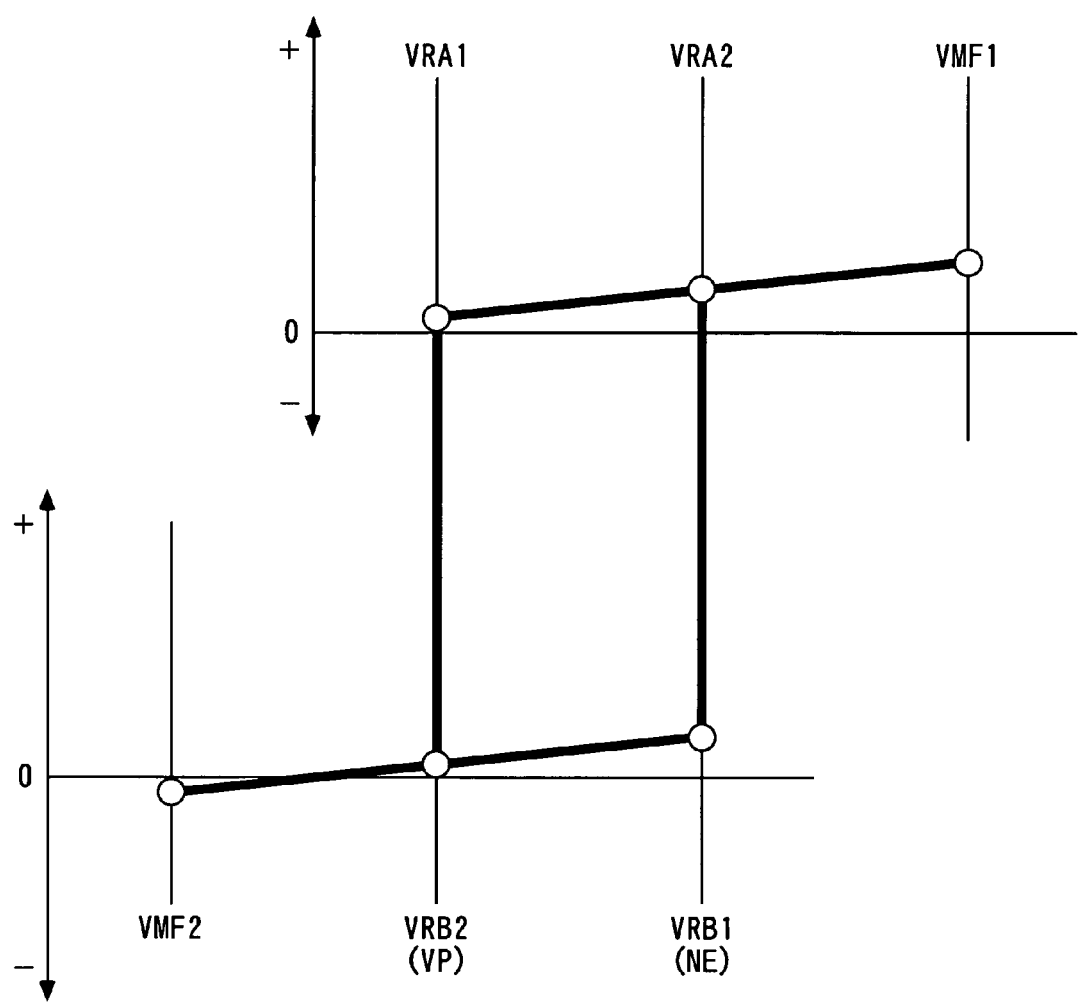
FIG. 27 A diagram illustrating an example of a speed diagram representing the relationship between the first and second magnetic field rotational speeds VMF1 and VMF2, and the A1, A2, B1 and B2 rotor rotational speeds VRA1, VRA2, VRB1 and VRB2 during the ENG creep operation.
Figure 29:
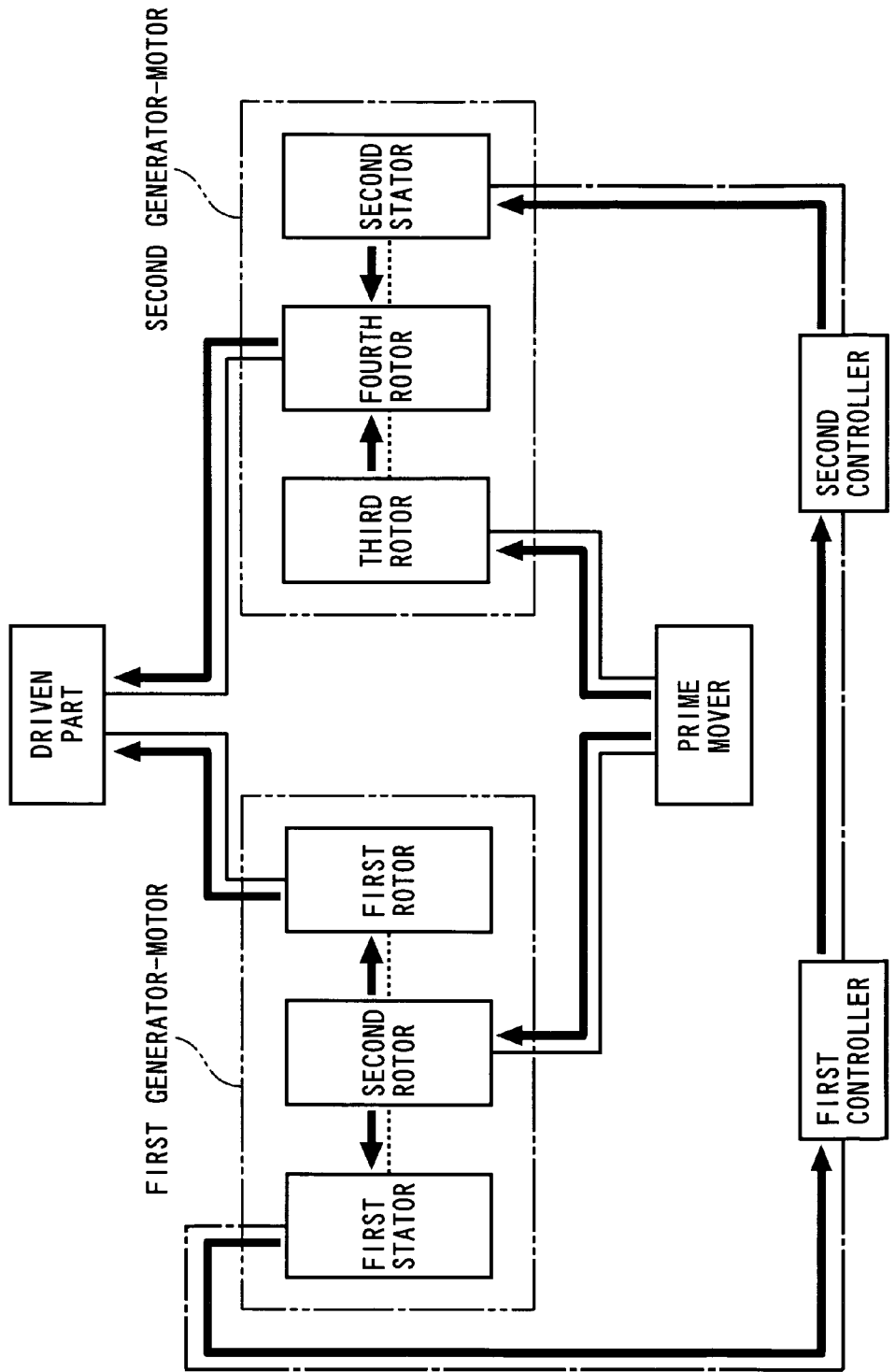
FIG. 29 A diagram which is useful in explaining an example of the operation of the power plant according to the present invention.
Figure 30:
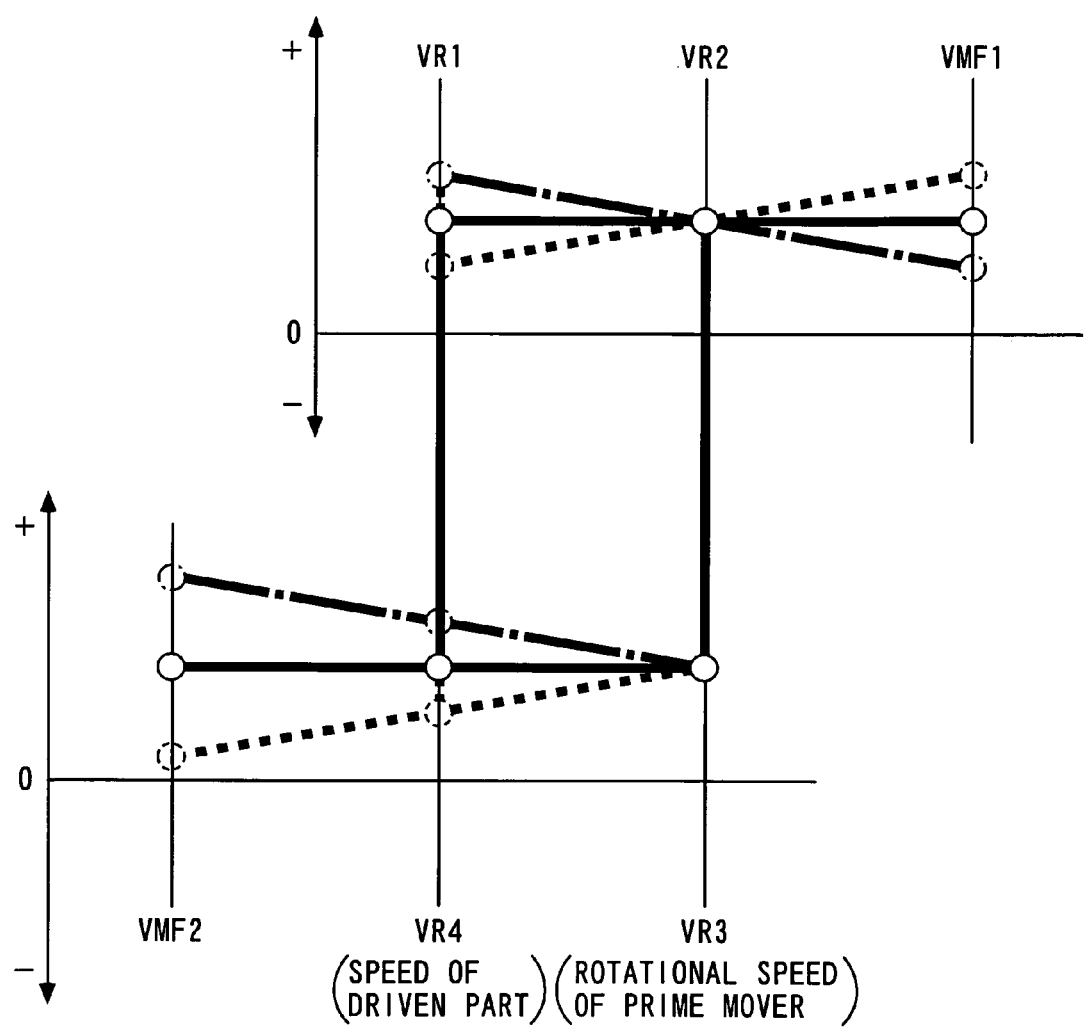
FIG. 30 A diagram which is useful in explaining a speed-changing operation of the power plant according to the present invention.

FIG. 26 shows how torque is transmitted during the above-described ENG creep operation and FIG. 27 shows a speed diagram during the ENG creep operation. As shown in FIG. 26, during the ENG creep operation, similarly to the case in the above-mentioned battery input/output zero mode, along with the electric power generation by the first stator 22, part of the engine torque TENG is transmitted to the A2 rotor 23, and the engine torque TENG transmitted to the A2 rotor 23 is distributed to the first stator 22 and the A1 rotor 21 at the torque distribution ratio of 1:1. Further, as shown in FIG. 27, the first and second rotating magnetic fields generated along with the electric power generation by the second stator 32 perform reverse rotation. Therefore, as shown in FIG. 26, along with the electric power generation, similarly to the case of the above-described ENG start during stoppage of the vehicle, torque, which is dependent on the amount of generated electric power and causes the B2 rotor 33 to perform normal rotation, is transmitted from the second stator 32 to the B2 rotor 33. Further, the torque transmitted to the B1 rotor 31 is further transmitted to the B2 rotor 33 such that it is balanced with the torque causing the B2 rotor 33 to perform normal rotation, and these torques are combined at the torque combining ratio of 1:1. Furthermore, the engine torque TENG distributed to the A1 rotor 21, as described above, is transmitted to the B2 rotor 33.

As described above, during the ENG creep operation, combined torque formed by combining the engine torque TENG distributed to the A1 rotor 21, the torque dependent on the amount of the electric power generated by the second stator 32, and the engine torque TENG transmitted to the B1 rotor 31 is transmitted to the B2 rotor 33. Further, this combined torque is transmitted to the drive wheels DW and DW, for causing the drive wheels DW and DW to perform normal rotation. Furthermore, the electric power generated by the first and second stators 22 and 32, and the first and second magnetic field rotational speeds VMF1 and VMF2 are controlled such that the A1 and B2 rotor rotational speeds VRA1 and VRB2, that is, the vehicle speed VP becomes very small (see FIG. 27), whereby the ENG creep operation is carried out.

Further, during the ENG creep operation, as described above, the engine torque TENG distributed to the A1 rotor 21 along with the electric power generation by the first stator 22, and the engine torque TENG transmitted to the B2 rotor 33 via the B1 rotor 31 along with the electric power generation by the second stator 32 are transmitted to the drive wheels DW and DW. That is, since part of the engine torque TENG is transmitted to the drive wheels DW and DW, it is possible to prevent the large reaction from the drive wheels DW and DW from acting on the engine 3, thereby making it possible to perform the ENG creep operation without causing engine stall. It should be noted that the ENG creep operation using the above-described engine power WENG is mainly carried out when the remaining charge SOC is small or when the vehicle is ascending a slope.

The control at the standing start of the vehicle is performed subsequent to the above-described ENG creep operation, as follows. Hereinafter, this standing start of the vehicle is referred to as "the ENG-based standing start". That is, while controlling the second magnetic field rotational speed VMF2 of the first and second rotating magnetic fields of the second stator 32, which have been performing reverse rotation during the ENG creep operation, such that it becomes equal to 0, the first magnetic field rotational speed VMF1 of the first and second rotating magnetic fields of the first stator 22, which have been performing normal rotation during the ENG creep operation, is increased, and the engine power WENG is increased. Then, after the second magnetic field rotational speed VMF2 becomes equal to 0, the operation in the above-mentioned battery input/output zero mode is performed. From the above, as indicated by thick solid lines in FIG. 28, the A1 and B2 rotor rotational speeds VRA1 and VRB2, i.e. the vehicle speed VP is increased from a state of the ENG creep operation, indicated by broken lines in the figure, causing the vehicle to start.

As described heretofore, according to the present embodiment, in the above-mentioned battery input/output zero mode, ⅔ or more of the engine power WENG, that is, most part thereof can be transmitted to the drive wheels DW and DW by the magnetic paths having a high transmission efficiency, and the engine power WENG transmitted to the drive wheels DW and DW by the electrical paths can be made not larger than ⅓ thereof, which is smaller than in the conventional power plant. This makes it possible to enhance the driving efficiency of the power plant 1. Further, since the A2 rotor 23 and the B2 rotor 33 are formed of soft magnetic material elements, they are magnetized during the operations of the first and second generator-motors 20 and 30, and hence the first and second generator-motors 20 and 30 function as synchronous motors. This makes it possible to make the efficiencies of the first and second generator-motors 20 and 30 higher than those of the conventional generator-motors which function as induction machines. Therefore, it is possible to further enhance the driving efficiency of the power plant 1.

Further, in the battery input/output zero mode, the engine power WENG is transmitted to the drive wheels DW and DW while having the speed thereof steplessly changed through the control of the first and second magnetic field rotational speeds VMF1 and VMF2. Further, in this case, the first and second magnetic field rotational speeds VMF1 and VMF2 are controlled such that the engine speed NE becomes equal to the target engine speed NECMD set to a value that will make it possible to obtain the optimum fuel economy of the engine 3, and therefore it is possible to drive the drive wheels DW and DW while controlling the engine power WENG such that the optimum fuel economy of the engine 3 can be obtained. This makes it possible to further enhance the driving efficiency of the power plant 1.

Furthermore, the operation in the drive-time charging mode is performed when the vehicle demand power is small with respect to the engine power WENG that will make it possible to obtain the optimum fuel economy of the engine 3. In this drive-time charging mode, the engine power WENG is controlled such that the optimum fuel economy of the engine 3 can be obtained, and the surplus amount of the engine power WENG with respect to the vehicle demand power is charged into the battery 43 as electric power. Further, the operation in the assist mode is performed when the vehicle demand power is large with respect to the engine power WENG that will make it possible to obtain the optimum fuel economy of the engine 3. In this assist mode, the engine power WENG is controlled such that that the optimum fuel economy of the engine 3 can be obtained, and the insufficient amount of the engine power WENG with respect to the vehicle demand power is made up for by supply of electric power from the battery 43. This makes it possible to further enhance the driving efficiency of the power plant 1.

Next, power plants 1A, 1B, 1C and 1D according to second to fifth embodiments of the present invention will be described with reference to FIGS. 33 to 36. These power plants 1A to 1D are mainly distinguished from the first embodiment in that they further include transmissions 60, 70, 80 and 90, respectively. In all of the second to fifth embodiments, the connecting relationship between the engine 3, the first and second generator-motors 20 and 30, and the drive wheels DW and DW is the same as the connecting relationship in the first embodiment. That is, the A2 and B1 rotors 23 and 31 are mechanically connected to the crankshaft 3a of the engine 3, and the A1 and B2 rotors 21 and 33 are mechanically connected to the drive wheels DW and DW. Further, in FIGS. 33 to 36, the component elements identical to those of the first embodiment are denoted by the same reference numerals. Hereinafter, the different points from the first embodiment will be mainly described from the second embodiment to the fifth embodiment in the mentioned order.

Figure 33:
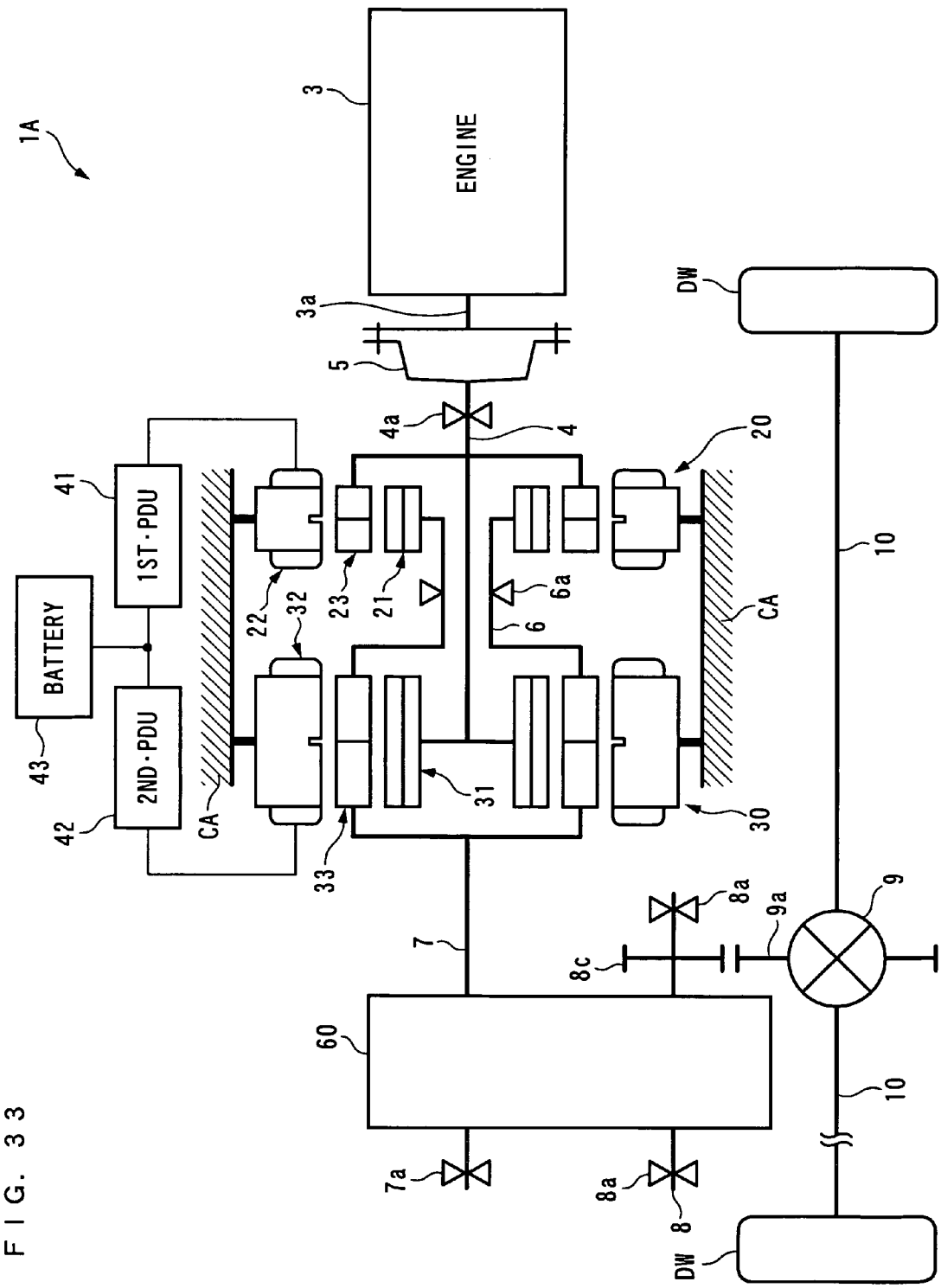
FIG. 33 A schematic diagram of an engine and first and second generator-motors of a power plant according to a second embodiment.

Referring to FIG. 33, in the power plant 1A, the transmission 60 is provided in place of the gear 7b and the first gear 8b in mesh with each other. This transmission 60 is a belt-type stepless transmission, and includes an input shaft connected to the aforementioned second main shaft 7, an output shaft connected to the idler shaft 8, pulleys provided on the input shaft and the output shaft, respectively, and metal belts wound around the pulleys, none of which are shown. The transmission 60 changes effective diameters of the pulleys, thereby outputting power input to the input shaft to the output shaft while steplessly changing the speed thereof. Further, the transmission gear ratio of the transmission 60 (the rotational speed of the input shaft/the rotational speed of the output shaft) is controlled by the ECU 2.

As described above, the transmission 60 is provided between the A1 and B2 rotors 21 and 33 and the drive wheels DW and DW, and the power transmitted to the A1 and B2 rotors 21 and 33 is transmitted to the drive wheels DW and DW while having the speed thereof changed by the transmission 60.

In the power plant 1A configured as above, when a very large torque is transmitted from the A1 and B2 rotors 21 and 33 to the drive wheels DW and D, e.g. during the above-described EV standing start and ENG-based standing start, the transmission gear ratio of the transmission 60 is controlled to a predetermined speed-reducing value which is larger than 1.0. Thus, the torque transmitted to the A1 and B2 rotors 21 and 33 is increased by the transmission 60, and then is transmitted to the drive wheels DW and DW. In accordance therewith, electric power generated by the first generator-motor 20 and electric power supplied to the second generator-motor 30 (generated electric power) are controlled such that the torque transmitted to the A1 and B2 rotors 21 and 33 becomes smaller. Therefore, according to the present invention, it is possible to make smaller the maximum value of torque demanded of the first and second generator-motors 20 and 30, thereby making it possible to reduce the sizes and costs of the first and second generator-motors 20 and 30.

Further, when the A1 and B2 rotor rotational speeds VRA1 and VRB2 become very high, e.g. during high-vehicle speed operation in which the vehicle speed VP is very high, the transmission gear ratio of the transmission 60 is controlled to a predetermined speed-increasing value which is smaller than 1.0. Thus, the A1 and B2 rotor rotational speeds VRA1 and VRB2 can be lowered with respect to the vehicle speed VP, thereby making it possible to prevent the first and second generator-motors 20 and 30 from becoming faulty due to an event that the A1 and B2 rotor rotational speeds VRA1 and VRB2 become too high. This is particularly effective since as described above, the A1 rotor 21 is formed by magnets, which are lower in strength than the soft magnetic material element, and are liable to develop the above-mentioned inconveniences.

Furthermore, during the EV traveling and traveling of the vehicle including traveling in the aforementioned battery input/output zero mode and so forth, the transmission gear ratio of the transmission 60 is controlled such that the first and second magnetic field rotational speeds VMF1 and VMF2 become equal to predetermined first and second target values, respectively. When only the first and second generator-motors 20 and 30 are used as power sources, the first and second target values are calculated by searching a map according to the vehicle speed VP, whereas when the engine 3 and the first and second generator-motors 20 and 30 are used as power sources, they are calculated by searching a map other than the above-mentioned map according to the engine speed NE and the vehicle speed VP. Further, in these maps, the first and second target values are set to values that will make it possible to obtain high efficiencies of the first and second generator-motors 20 and 30 with respect to the vehicle speed VP (and engine speed NE) assumed then. Furthermore, in parallel with the control of the transmission 60 as described above, the first and second magnetic field rotational speeds VMF1 and VMF2 are controlled to the first and second target values, respectively. From the above, according to the present embodiment, during traveling of the vehicle, it is possible to obtain the high efficiencies of the first and second generator-motors 20 and 30.

Further, as described above with reference to FIG. 19, if the first and second generator-motors 20 and 30 are used, the engine power WENG can be transmitted to the drive wheels DW and DW while having the speed thereof steplessly changed, so that it is possible to reduce the frequency of the speed-changing operation of the transmission 60. This makes it possible to suppress heat losses by the speed-changing operation, thereby making it possible to ensure the high driving efficiency of the power plant 1A. In addition to this, according to the present embodiment, it is possible to obtain the same advantageous effects as provided by the first embodiment.

It should be noted that although in the present embodiment, the transmission 60 is a belt-type stepless transmission, a toroidal-type stepless transmission or a gear-type stepped transmission may be employed.

Figure 34:
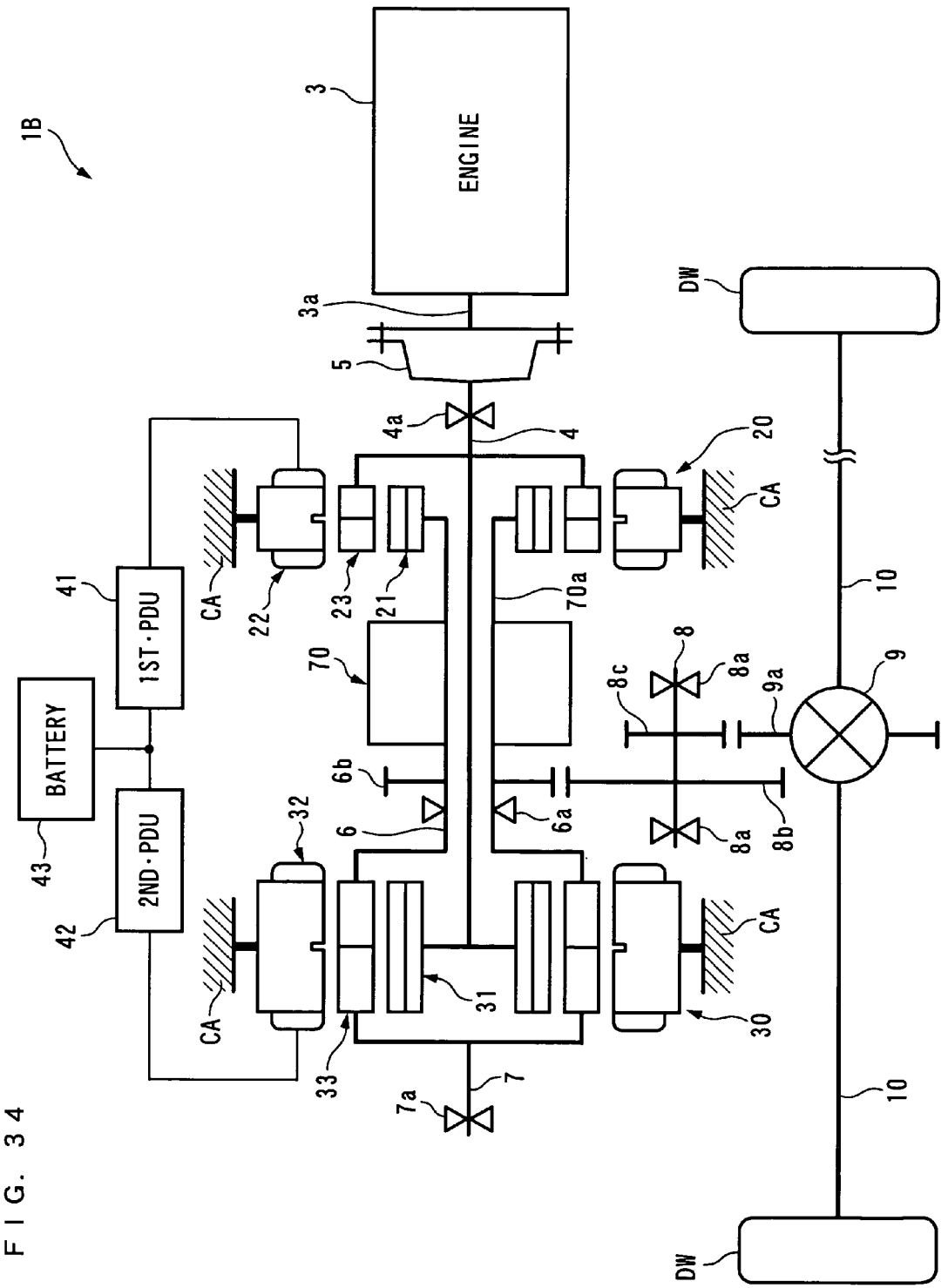
FIG. 34 A schematic diagram of an engine and first and second generator-motors of a power plant according to a third embodiment.

In the power plant 1B according to the third embodiment shown in FIG. 34, the transmission 70 is the gear-type stepped transmission including an input shaft 70a and an output shaft (not shown), a plurality of gear trains different in gear ratio from each other, and clutches (not shown) for engaging and disengaging respectively between the gear trains, and the input shaft 70a and the output shaft. The transmission 70 changes the speed of power inputted to the input shaft 70a by using one of the gear trains, and outputs the power to the output shaft. Further, in the transmission 70, a total of four speed positions, i.e. a first speed (transmission gear ratio=the rotational speed of the input shaft 70a/the rotational speed of the output shaft>1.0), a second speed (transmission gear ratio=1.0), a third speed (transmission gear ratio<1.0) for forward travel, and one speed position for rearward travel can be set using these gear trains, and the ECU 2 controls a change between these speed positions.

Further, in the power plant 1B, differently from the first embodiment, the gear 7b is not provided on the second main shaft 7, and the A1 and B2 rotors 21 and 33 are connected to the drive wheels DW and DW as follows: The A1 rotor 21 is directly connected to the input shaft 70a of the transmission 70, and the output shaft of the transmission 70 is directly connected to the above-described connection shaft 6. The connection shaft 6 is integrally formed with a gear 6b, and the gear 6b is in mesh with the aforementioned first gear 8b.

As described above, the A1 rotor 21 is mechanically connected to the drive wheels DW and DW via the transmission 70, the gear 6b, the first gear 8b, the idler shaft 8, the second gear 8c, the gear 9a and the differential gear mechanism 9. Further, the power transmitted to the A1 rotor 21 is transmitted to the drive wheels DW and DW while having the speed thereof changed by the transmission 70. Furthermore, the B2 rotor 33 is mechanically connected to the drive wheels DW and DW via the connection shaft 6, the gear 6b and the first gear 8b, without via the transmission 70.

In the power plant 1B configured as above, in such a case as a very large torque is transmitted from the A1 rotor 21 to the drive wheels DW and DW, e.g. during the ENG-based standing start, the speed position of the transmission 70 is controlled to the first speed (transmission gear ratio>1.0). Thus, torque transmitted to the A1 rotor 21 is increased by the transmission 70, and then is transmitted to the drive wheels DW and DW. In accordance therewith, the electric power generated by the first generator-motor 20 is controlled such that torque to be transmitted to the A1 rotor 21 becomes smaller. As a consequence, according to the present embodiment, the maximum value of torque demanded of the first generator-motor 20 can be made smaller, thereby making it possible to reduce the size and costs of the first generator-motor 20.

Further, in such a case as the A1 rotor rotational speed VRA1 becomes very high, e.g. during the high-vehicle speed operation in which the vehicle speed VP is very high, the speed position of the transmission 70 is controlled to the third speed (transmission gear ratio<1.0). Thus, according to the present embodiment, since the A1 rotor rotational speed VRA1 can be lowered with respect to the vehicle speed VP, it is possible to prevent the first generator-motor 20 from becoming faulty due to an event that the A1 rotor rotational speed VRA1 becomes too high. This is particularly effective since the A1 rotor 21 is formed by magnets, which are lower in strength than the soft magnetic material element, and are liable to develop the above-mentioned inconveniences.

Furthermore, during the EV traveling and traveling of the vehicle including traveling in the aforementioned battery input/output zero mode and so forth, the speed position of the transmission 70 is controlled such that the first magnetic field rotational speed VMF1 becomes equal to a predetermined target value. When only the first and second generator-motors 20 and 30 are used as power sources, this target value is calculated by searching a map according to the vehicle speed VP, whereas when the engine 3 and the first and second generator-motors 20 and 30 are used as power sources, the target value is calculated by searching a map other than the above-mentioned map according to the engine speed NE and the vehicle speed VP. Further, in these maps, the target value is set to a value that will make it possible to obtain the high efficiency of the first generator-motor 20 with respect to the vehicle speed VP (and engine speed NE) assumed then. Furthermore, in parallel with the control of the transmission 70 as described above, the first magnetic field rotational speed VMF1 is controlled to the above-described target value. Thus, according to the present embodiment, during traveling of the vehicle, it is possible to obtain the high efficiency of the first generator-motor 20.

Further, when the vehicle is running using the engine 3 as a power source, e.g. as in the battery input/output zero mode, during the speed-changing operation of the transmission 70, that is, after the input shaft 70a and output shaft of the transmission 70 are disconnected from a gear train before being shifted to a desired transmission gear ratio and until the input shaft 70a and the output shaft are connected to a gear train shifted to the desired transmission gear ratio, the first and second generator-motors 20 and 30 are controlled as follows: During the speed-changing operation of the transmission 70, the gear train of the transmission 70 is disconnected from the input shaft 70a and the output shaft to disconnect the A1 rotor 21 from the drive wheels DW and DW, whereby the load of the drive wheels DW and DW ceases to act on the A1 rotor 21, so that the electric power generation is not performed by the first generator-motor 20 and electric power is supplied from the battery 43 to the second stator 32. As a consequence, according to the present embodiment, during the speed-changing operation of the transmission 70, the second driving equivalent torque TSE2 from the second stator 32 and part of the engine torque TENG transmitted to the B1 rotor 31 are combined and transmitted to the drive wheels DW and DW via the B2 rotor 33, and hence it is possible to suppress a speed-change shock, which can be caused by interruption of transmission of the engine torque TENG to the drive wheels DW and DW via the transmission 70. This makes it possible to improve marketability. In addition to this, according to the present embodiment, it is possible to obtain the same advantageous effects as provided by the first embodiment.

Figure 35:
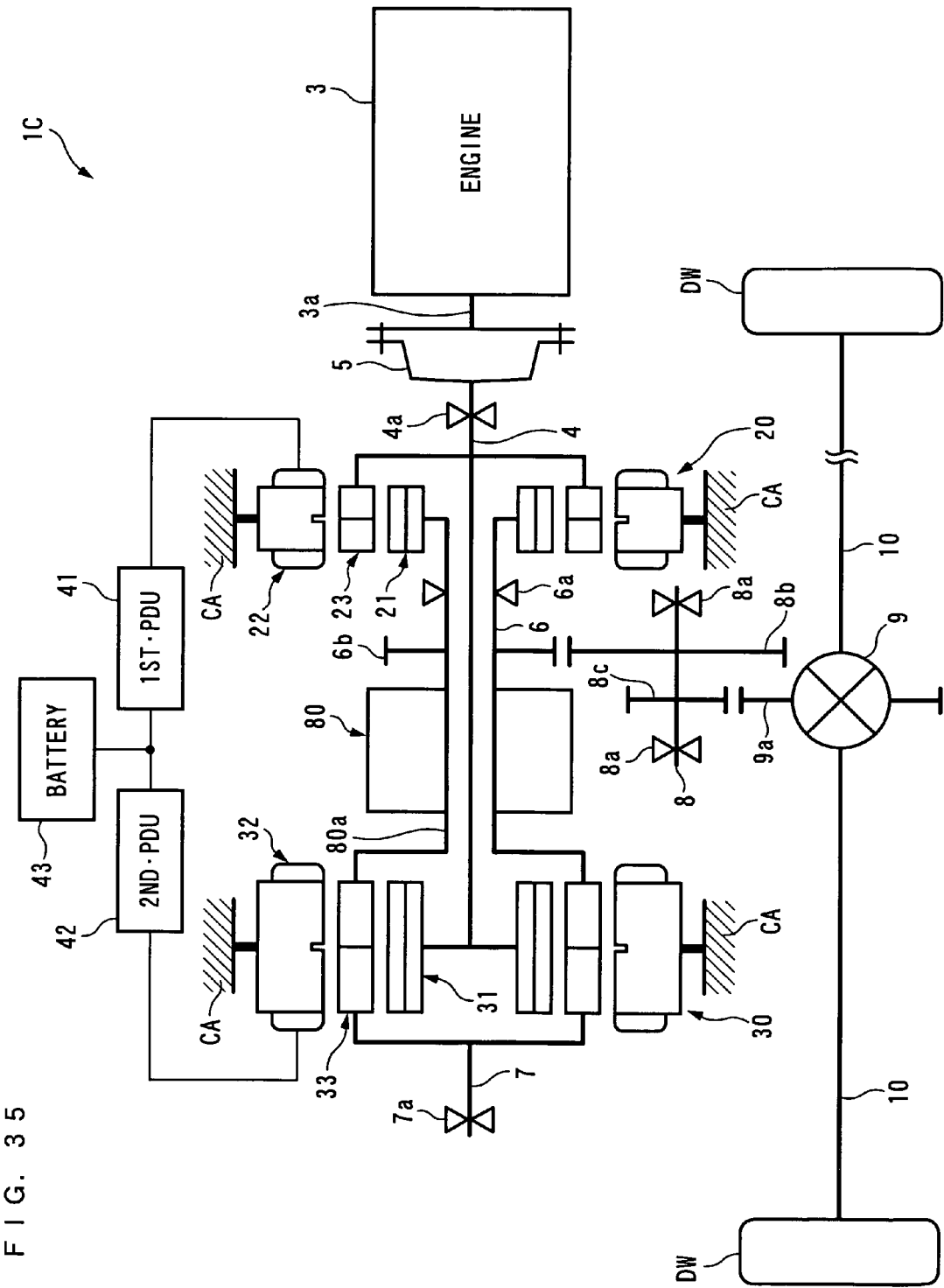
FIG. 35 A schematic diagram of an engine and first and second generator-motors of a power plant according to a fourth embodiment.

In the power plant 1C according to the fourth embodiment shown FIG. 35, differently from the first embodiment, the second main shaft 7 is not provided with the gear 7b, and the aforementioned first gear 8b is in mesh with the gear 6b integrally formed on the connection shaft 6. Thus, the A1 rotor 21 is connected to the drive wheels DW and DW via the connection shaft 6, the gear 6b, the first gear 8b, the idler shaft 8, the second gear 8c, the gear 9a and the differential gear mechanism 9, without via the transmission 80.

Further, the transmission 80 is a gear-type stepped transmission configured, similarly to the transmission 70 according to the third embodiment, to have speed positions including a first speed to a third speed. The transmission 80 includes an input shaft 80a directly connected to the B2 rotor 33 and an output shaft (not shown) directly connected to the connection shaft 6, and transmits power input to the input shaft 80a to the output shaft while changing the speed of the power. Further, the ECU 2 controls a change between these speed positions of the transmission 80.

With the above arrangement, the B2 rotor 33 is mechanically connected to the drive wheels DW and DW via the transmission 80, the gear 6b, the second gear 8c, and so forth. Further, power transmitted to the B2 rotor 33 is transmitted to the drive wheels DW and DW while having the speed thereof changed by the transmission 80.

In the power plant 1C configured as above, in such a case as a very large torque is transmitted from the B2 rotor 33 to the drive wheels DW and DW, e.g. during the EV standing start and the ENG-based standing start, the speed position of the transmission 80 is controlled to the first speed (transmission gear ratio>1.0). Thus, torque transmitted to the B2 rotor 33 is increased by the transmission 80, and then is transmitted to the drive wheels DW and DW. In accordance therewith, electric power supplied to the second generator-motor 30 is controlled such that torque to be transmitted to the B2 rotor 33 becomes smaller. As a consequence, according to the present embodiment, the maximum value of torque required of the second generator-motor 30 can be made smaller, thereby making it possible to reduce the size and costs of the second generator-motor 30. This is particularly effective since as described above, during the ENG-based standing start, the torque from the second stator 32 and part of the engine torque TENG transmitted to the B1 rotor 31 are combined and the combined torque is transmitted to the drive wheels DW and DW via the B2 rotor 33, and hence a larger torque acts on the B2 rotor 33 than on the A1 rotor 21.

Further, in such a case as the B2 rotor rotational speed VRB2 becomes very high, e.g. during the high-vehicle speed operation in which the vehicle speed VP becomes very high, the speed position of the transmission 80 is controlled to the third speed (transmission gear ratio<1.0). Thus, according to the present embodiment, since the B2 rotor rotational speed VRB2 can be lowered with respect to the vehicle speed VP, it is possible to prevent the second generator-motor 30 from becoming faulty due to an event that the B2 rotor rotational speed VRB2 becomes too high.

Furthermore, during the EV traveling and traveling of the vehicle including running in the aforementioned battery input/output zero mode and so forth, the speed position of the transmission 80 is controlled such that the second magnetic field rotational speed VMF2 becomes equal to a predetermined target value. When only the first and second generator-motors 20 and 30 are used as power sources, this target value is calculated by searching a map according to the vehicle speed VP, whereas when the engine 3 and the first and second generator-motors 20 and 30 are used as power sources, the target value is calculated by searching a map other than the above-mentioned map according to the engine speed NE and the vehicle speed VP. Further, in these maps, the target value is set to a value that will make it possible to obtain the high efficiency of the second generator-motor 30 with respect to the vehicle speed VP (and engine speed NE) assumed then. Furthermore, in parallel with the control of the transmission 80 as described above, the second magnetic field rotational speed VMF2 is controlled to the above-described target value. Thus, according to the present embodiment, during traveling of the vehicle, it is possible to obtain the high efficiency of the second generator-motor 30.

Further, when the vehicle is running using the engine 3 as a power source, e.g. as in the battery input/output zero mode, during the speed-changing operation of the transmission 80 (after the input shaft 80a and the output shaft are disconnected from a gear train before being shifted to a desired transmission gear ratio and until the input shaft 80a and the output shaft are connected to a gear train shifted to the desired transmission gear ratio), that is, while the B2 rotor 33 is disconnected from the drive wheels DW and DW by the transmission 80, as is clear from how torque is transmitted, described with reference to FIG. 18, part of the engine torque TENG is transmitted to the drive wheels DW and DW via the A1 rotor 21. As a consequence, according to the present embodiment, during the speed-changing operation of the transmission 80, it is possible to suppress a speed-change shock, which can be caused by interruption of transmission of the engine torque TENG to the drive wheels DW and DW via the transmission 80. This makes it possible to improve marketability. In addition to this, according to the present embodiment, it is possible to obtain the same advantageous effects as provided by the first embodiment.

Figure 36:
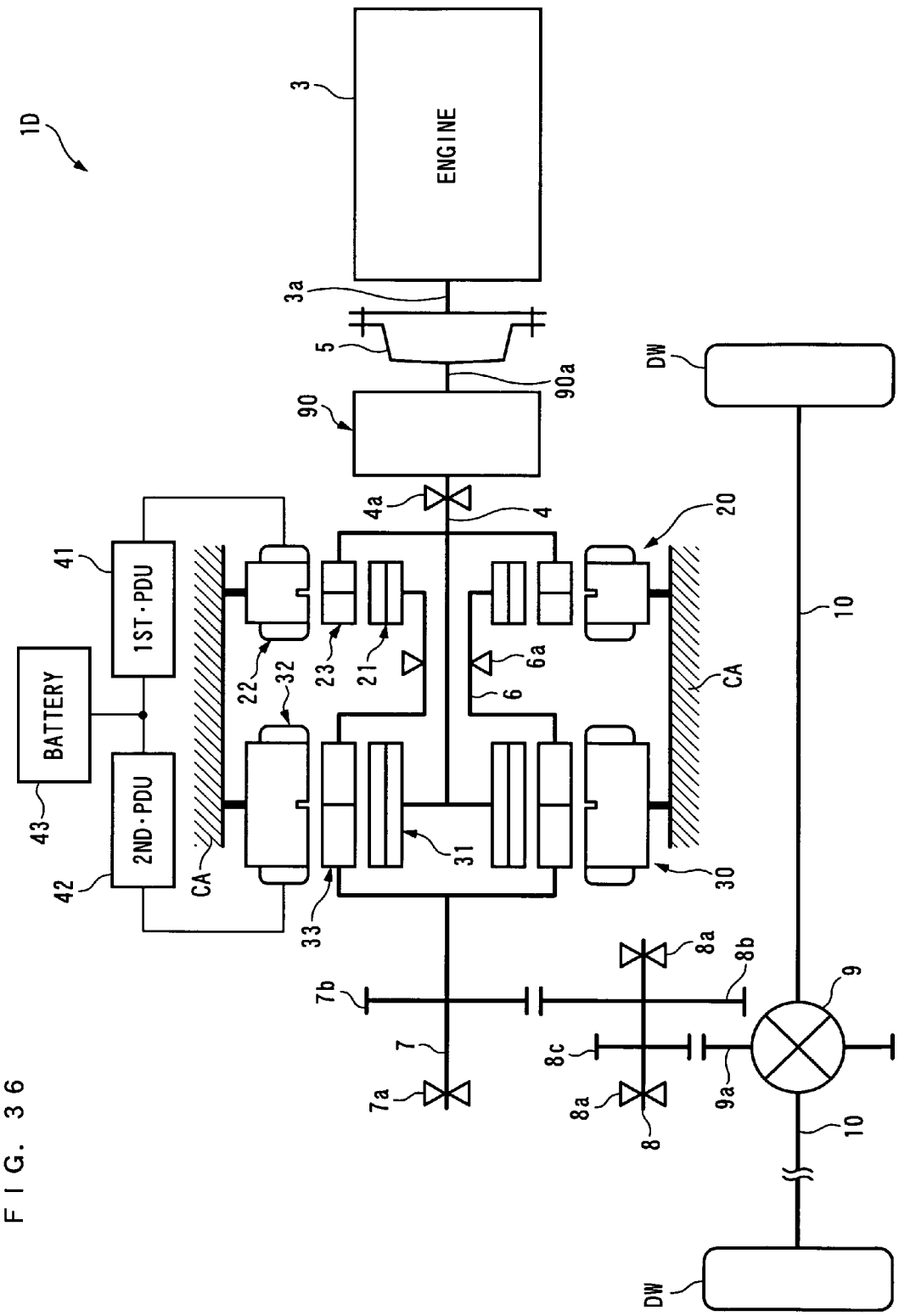
FIG. 36 A schematic diagram of an engine and first and second generator-motors of a power plant according to a fifth embodiment.

In the power plant 1D according to the fifth embodiment shown FIG. 36, the transmission 90 is a gear-type stepped transmission formed by a planetary gear unit and so forth, and includes an input shaft 90a and an output shaft (not shown). In the transmission 90, a total of two speed positions, i.e. a first speed (transmission gear ratio=the rotational speed of the input shaft 90a/the rotational speed of the output shaft=1.0) and a second speed (transmission gear ratio<1.0) are set as speed positions. ECU 2 performs a change between these speed positions. Further, the input shaft 90a of the transmission 90 is directly connected to the flywheel 5, and the output shaft (not shown) thereof is directly connected to the aforementioned first main shaft 4. As described above, the transmission 90 is provided between the crankshaft 3a and the A2 and B1 rotors 23 and 31, for transmitting the engine power WENG to the A2 rotor 23 and the B1 rotor 31 while changing the speed of the engine power WENG. Furthermore, the number of the gear teeth of the gear 9a of the differential gear mechanism 9 is larger than that of the gear teeth of the second gear 8c of the idler shaft 8, whereby power transmitted to the idler shaft 8 is transmitted to the drive wheels DW and DW in a reduced state.

In the power plant 1D configured as above, in such a case as a very large torque is transmitted from the A1 and B2 rotors 21 and 33 to the drive wheels DW and DW, e.g. during the ENG-based standing start, the speed position of the transmission 90 is controlled to the second speed (transmission gear ratio<1.0). Thus, the engine torque TENG input to the A2 and B1 rotors 23 and 31 is made smaller. In accordance therewith, electric power generated by the first generator-motor 20 and electric power supplied to the second generator-motor 30 (generated electric power) are controlled such that the engine torque TENG to be transmitted to the A1 and B2 rotors 21 and 33 becomes smaller. Further, the engine torque TENG transmitted to the A1 and B2 rotors 21 and 33 is transmitted to the drive wheels DW and DW in a state increased by deceleration by the second gear 8c and the gear 9a. From the above, according to the present invention, it is possible to make smaller the maximum value of torque demanded of the first and second generator-motors 20 and 30, thereby making it possible to reduce the sizes and costs of the first and second generator-motors 20 and 30.

Further, when the engine speed NE is very high, the speed position of the transmission 90 is controlled to the first speed (transmission gear ratio=1.0). Thus, according to the present invention, compared with the case of the speed position being the second speed, the A2 and B1 rotor rotational speeds VRA2 and VRB1 can be reduced, whereby it is possible to prevent the first and second generator-motors 20 and 30 from becoming faulty due to an event that the A2 and B1 rotor rotational speeds VRA2 and VRB1 become too high. This is particularly effective since the B1 rotor 31 is formed by magnets and is liable to develop the above-mentioned inconveniences.

Furthermore, when the vehicle is running using the engine 3 as a power source, e.g. as in the battery input/output zero mode, the speed position of the transmission 90 is changed such that the first and second magnetic field rotational speeds VMF1 and VMF2 take respective values that will make it possible to obtain the high efficiencies of the first and second generator-motors 20 and 30 according to the engine speed NE and the vehicle speed VP. Further, in parallel with such a change in the speed position of the transmission 90, the first and second magnetic field rotational speeds VMF1 and VMF2 are controlled to values determined based on the engine speed NE and vehicle speed VP assumed then, the speed position of the transmission 90, and the aforementioned equations (1) and (7). Thus, according to the present embodiment, during traveling of the vehicle, it is possible to obtain the high efficiencies of the first and second generator-motors 20 and 30.

Further, when the vehicle is running using the engine 3 as a power source, e.g. as in the battery input/output zero mode, during the speed-changing operation of the transmission 90, that is, while the engine 3 is disconnected from the A2 and B1 rotors 23 and 31 by the transmission 90, to suppress a speed-change shock, the first and second generator-motors 20 and 30 are controlled as described hereafter. Hereinafter, such control of the first and second generator-motors 20 and 30 is referred to as "the speed-change shock control".

Electric power is supplied to the first and second stators 22 and 32, and both the first and second rotating magnetic fields generated in the first and second stators 22 and 32 in accordance therewith are caused to perform normal rotation. Thus, the first driving equivalent torque TSE1 from the first stator 22 and torque transmitted, as described hereafter, to the A1 rotor 21 are combined, and this combined torque is transmitted to the A2 rotor 23. The torque transmitted to the A2 rotor 23 is transmitted to the B1 rotor 31 without being transmitted to the crankshaft 3a, by the above-mentioned disconnection by the transmission 90. Further, the torque is combined with the second driving equivalent torque TSE2 from the second stator 32, and then is transmitted to the B2 rotor 33. Part of the torque transmitted to the B2 rotor 33 is transmitted to the A1 rotor 21, and the rest thereof is transmitted to the drive wheels DW and DW.

Therefore, according to the present embodiment, during the speed-changing operation, it is possible to suppress a speed-change shock, which can be caused by interruption of transmission of the engine torque TENG to the drive wheels DW and DW, thereby making it possible to improve marketability. It should be noted that this speed-change shock control is performed only during the speed-changing operation of the transmission 90. In addition to this, according to the present embodiment, it is possible to obtain the same advantageous effects as provided by the first embodiment.

It should be noted that although in the third to fifth embodiments, the transmissions 70, 80 and 90 are gear-type stepped transmissions, belt-type stepless transmissions and toroidal-type stepless transmissions may be employed.

Figure 37:
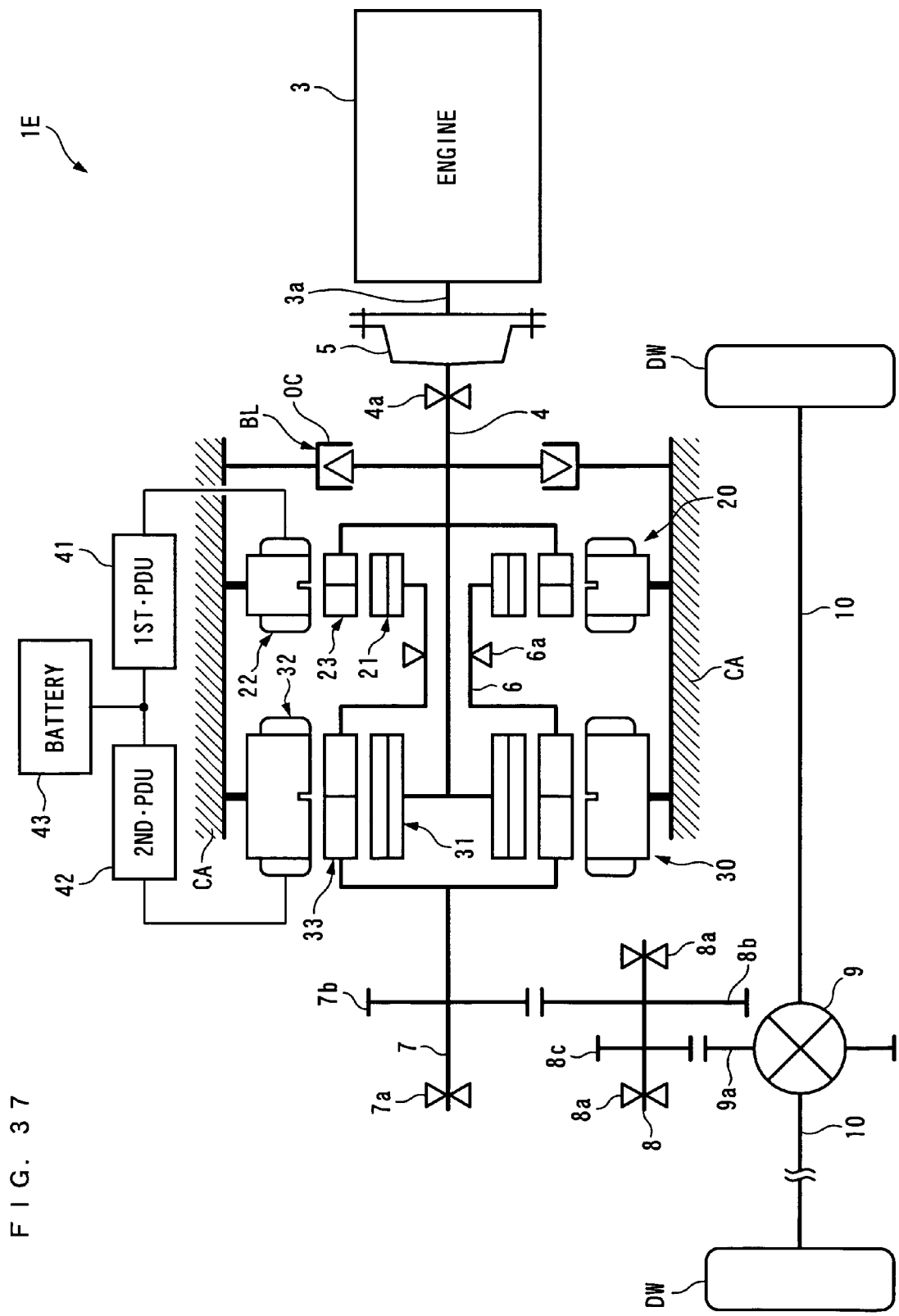
FIG. 37 A schematic diagram of an engine and first and second generator-motors of a power plant according to a sixth embodiment.

Next, a power plant 1E according to a sixth embodiment will be described with reference to FIG. 37. As shown in the figure, this power plant 1E is constructed by adding a brake mechanism BL to the power plant 1 according to the first embodiment. Hereinafter, a description will be given mainly of different points from the first embodiment.

This brake mechanism BL includes a one-way clutch OC connected to the aforementioned first main shaft 4 and case CA. The one-way clutch OC is configured such that it connects between the first main shaft 4 and the case CA configured to be unrotatable, when such power as causes the crankshaft 3a having the first main shaft 4 connected thereto to perform reverse rotation, acts on the crankshaft 3a, whereas when such power as causes the crankshaft 3a to perform normal direction acts on the crankshaft 3a, the one-way clutch OC disconnects between the first main shaft 4 and the casing CA. In other words, the brake mechanism BL formed by the one-way clutch OC and the casing CA permits the first main shaft 4 to rotate only when it performs normal rotation together with the crankshaft 3a, the A2 rotor 23 and the B1 rotor 31, but blocks rotation of the first main shaft 4 when it performs reserve rotation together with the crankshaft 3a and so forth.

The power plant 1E configured as above performs the aforementioned EV creep operation and EV standing start as follows: The power plant 1E supplies electric power to the first and second stators 22 and 32 and causes first and second rotating magnetic fields generated by the first stator 22 in accordance with the supply of the electric power to perform reverse rotation, while causing first and second rotating magnetic fields generated by the second stator 32 to perform normal rotation. Further, the power plant 1E controls the first and second magnetic field rotational speeds VMF1 and VMF2 such that 2·|VMF1|=|VMF2| holds. Furthermore, the power plant 1E controls the electric power supplied to the first and second generator-motors 20 and 30 such that sufficient torque is transmitted to the drive wheels DW and DW.

While the first and second rotating magnetic fields of the first stator 22 perform reverse rotation as described above, the A2 rotor 23 is blocked from performing reverse rotation by the brake mechanism BL as described above, so that as described heretofore using the aforementioned equation (3), torque having the same magnitude as that of the first driving equivalent torque TSE1 is transmitted from the first stator 22 to the A1 rotor 21, and acts such that the A1 rotor 21 is caused to perform normal rotation. Further, while the first and second rotating magnetic fields of the second stator 32 perform normal rotation as described above, the B1 rotor 31 is blocked from performing reverse rotation by the brake mechanism BL as described above, so that as described heretofore using the aforementioned equation (8), torque having a magnitude twice as large as that of the second driving equivalent torque TSE2 is transmitted from the second stator 32 to the B2 rotor 33, and acts such that the B2 rotor 33 is caused to perform normal rotation. Furthermore, the torques transmitted to the A1 and B2 rotors 21 and 33 are transmitted to the drive wheels DW and DW, for causing the drive wheels DW and DW to perform normal rotation.

Further, in this case, on the A2 and B1 rotors 23 and 31, which are blocked from performing reverse rotation by the brake mechanism BL, torques act from the first and second stators 22 and 32 such that the torques cause the A2 and B1 rotors 23 and 31 to perform reverse rotation, respectively, whereby the crankshaft 3a and the A2 and B1 rotors 23 and 31 are not only blocked from performing reverse rotation but also held in a stopped state.

As described above, according to the present embodiment, it is possible to drive the drive wheels DW and DW by the first and second generator-motors 20 and 30 without using the engine power WENG. Further, during driving of drive wheels DW and DW, the crankshaft 3a is not only blocked from performing reverse rotation but also held in a stopped state, and hence the crankshaft 3a is prevented from dragging the engine 3.

It should be note that the present invention is not limited to the embodiments described above, but it can be practiced in various forms. For example, although in the above-described embodiments, the A2 rotor 23 and the B1 rotor 31 are connected to each other, and the A1 rotor 21 and the B2 rotor 33 are connected to each other, this is not limitative, but the A2 rotor 23 and the B1 rotor 31 are not necessarily required to be connected to each other insofar as they are connected to the crankshaft 3a. Further, the A1 rotor 21 and the B2 rotor 33 are not necessarily required to be connected to each other insofar as they are connected to the drive wheels DW and DW. In this case, the transmission 60 according to the second embodiment may be formed by two transmissions in a manner such that one of the two transmissions is disposed between the A1 rotor 21 and the drive wheels DW and DW and the other thereof is disposed between the B2 rotor 33 and the drive wheels DW and DW. Similarly, the transmission 90 according to the fifth embodiment may be formed by two transmissions in a manner such that one of the two transmissions is disposed between the A2 rotor 23 and the crankshaft 3a and the other thereof is disposed between the B1 rotor 31 and the crankshaft 3a. Further, although in the above-described embodiments, the 1st•PDU 41 and the ECU 2, and the 2nd•PDU 42 and the ECU 2 are used as the first and second controllers of the present invention, respectively, by way of example, the first and second controllers are not limited to these, but any suitable controllers may be used insofar as they are capable of controlling electric power generation by the first and second stators 22 and 32 and electric power supplied thereto. For example, electric circuits having microcomputers mounted thereon may be used as the first and second controllers.

Further, although in the above-described embodiments, the battery 43 is used as an electric power storage device in the present invention, the electric power storage device is not limited to this, but any suitable electric power storage device may be used insofar as it is capable of being charged and discharged. For example, a capacitor may be used as the electric power storage device. Further, the brake mechanism BL may be provided in the second to fifth embodiments. Further, although in the above-described embodiments, the brake mechanism BL is comprised of the one-way clutch OC, the brake mechanism BL may be formed by another mechanism, such as a hand brake, insofar as it is capable of blocking the reverse rotation of the crankshaft 3a. Further, although in the above-described embodiments, the internal combustion engine is employed as a prime mover for the present invention, an external combustion engine and other engines may be employed. Moreover, although in the above-described embodiments, the present invention is applied to the vehicle, this is not limitative, but the present invention can be applied to ships or boats and aircrafts, by way of example. It is to be further understood that various changes and modifications may be made without departing from the spirit and scope thereof.

INDUSTRIAL APPLICABILITY

The power plant according to the present invention is very useful in enhancing efficiency for driving driven parts.

We claim:

1. A power plant for driving driven parts, comprising:
a prime mover including an output shaft;
a first generator-motor including an immovable first stator for generating a first rotating magnetic field, a first rotor formed by magnets, said first rotor being provided in a manner opposed to said first stator, and a second rotor formed by soft magnetic material elements and disposed between said first stator and said first rotor, said first generator-motor inputting and outputting energy between said first stator, said first rotor and said second rotor, via magnetic circuits formed along with generation of the first rotating magnetic field, the first rotating magnetic field and said first and second rotors rotating in accordance with the input and output of the energy while holding such a linear speed relationship in which a difference between a rotational speed of the first rotating magnetic field and a rotational speed of said second rotor, and a difference between a rotational speed of said second rotor and a rotational speed of said first rotor become equal to each other;
a first controller electrically connected to said first stator, for controlling electric power generated by said first stator and electric power supplied to said first stator;

a second generator-motor including an immovable second stator for generating a second rotating magnetic field, a third rotor formed by magnets, said third rotor being provided in a manner opposed to said second stator, and a fourth rotor formed by soft magnetic material elements and disposed between said second stator and said third rotor, said second generator-motor inputting and outputting energy between said second stator, said third rotor and said fourth rotor, via magnetic circuits formed along with generation of the second rotating magnetic field, the second rotating magnetic field and said third and fourth rotors rotating in accordance with the input and output of the energy while holding such a linear speed relationship in which a difference between a rotational speed of the second rotating magnetic field and a rotational speed of said fourth rotor, and a difference between a rotational speed of said fourth rotor and a rotational speed of said third rotor become equal to each other; and a second controller electrically connected to said second stator, for controlling electric power generated by said second stator and electric power supplied to said second stator;

wherein said first and fourth rotors are mechanically connected to the driven parts, said second and third rotors being mechanically connected to said output shaft of said prime mover, and said first and second stators being mechanically connected to each other via said first and second controllers.

2. A power plant as claimed in claim 1, further comprising an electric power storage device configured to be capable of being charged and discharged, said electric power storage device being electrically connected to said first and second stators via said first and second controllers, respectively.

3. A power plant as claimed in claim 1, further comprising a transmission disposed between said first and fourth rotors and the driven parts, for transmitting power from said first and fourth rotors to the driven parts while changing speed of the power.

4. A power plant as claimed in claim 1, further comprising a transmission disposed between said first rotor and the driven parts, for transmitting power from said first rotor to the driven parts while changing speed of the power.

5. A power plant as claimed in claim 1, further comprising a transmission disposed between said fourth rotor and the driven parts, for transmitting power from said fourth rotor to the driven parts while changing speed of the power.

6. A power plant as claimed in claim 1, further comprising a transmission disposed between said output shaft of said prime mover and said second and third rotors, for transmitting power from said output shaft to said second and third rotors while changing speed of the power.

7. A power plant as claimed in claim 1, further comprising a brake mechanism for blocking reverse rotation of said output shaft of said prime mover.

\* \* \* \* \*